US012748401B2

(12) United States Patent
Berry et al.

(10) Patent No.: US 12,748,401 B2
(45) Date of Patent: Sep. 29, 2026

(54) SYSTEMS AND METHODS TO AUTOMATE CNC PROGRAMMING

(71) Applicant: AV GAUGE & FIXTURE INC, Oldcastle (CA)

(72) Inventors: Scott Berry, Leamington (CA); Dan Bayn, Windsor (CA)

(73) Assignee: AV GAUGE & FIXTURE INC, Oldcastle (CA)

( * ) Notice: Subject to any disclaimer, the term of this patent is extended or adjusted under 35 U.S.C. 154(b) by 444 days.

(21) Appl. No.: 18/209,579

(22) Filed: Jun. 14, 2023

(65) Prior Publication Data

US 2024/0069522 A1 Feb. 29, 2024

Related U.S. Application Data

(60) Provisional application No. 63/402,220, filed on Aug. 30, 2022.

(51) Int. Cl.
*G05B 19/414* (2006.01)
*G05B 19/19* (2006.01)

(52) U.S. Cl.
CPC ......... *G05B 19/4145* (2013.01); *G05B 19/19* (2013.01)

(58) Field of Classification Search
None
See application file for complete search history.

(56) References Cited

U.S. PATENT DOCUMENTS

2008/0004745 A1* 1/2008 Nasu .................. G05B 19/4097 700/182
2018/0259935 A1* 9/2018 Saitou ................ G05B 19/4097

* cited by examiner

*Primary Examiner* — Sean Shechtman
(74) *Attorney, Agent, or Firm* — Miller Canfield

(57) ABSTRACT

A method in a data processing system for automating programming of a computer numerical control machine to create a detail from a stock block based on design specifications for the detail. The stock block includes a plurality of sides including a left side, a right side, a front, a back, a top and a bottom. The method comprises creating a stock model from the design specifications, setting leads and links to active datum on the stock model, determining from the design specifications what machine will be used to create the detail, determining from the design specifications what material will be used to create the detail, importing tool templates for the machine and the material that will be used to create the detail, and determining whether stock needs to be removed from the left and right sides of the stock block. If it is determined that stock needs to be removed from the left and right sides of the stock block: activating a top workplane, activating a top toolpath folder, creating a PowerMill block around the stock model, wherein the PowerMill block has an X negative expanded and a Z negative expanded, applying a 12 mmZLevel template, creating a PowerMill block around the stock model, wherein the PowerMill block has an X positive expanded and a Z negative expanded, applying a 12 mmZLevel template, updating the stock model, and resetting the leads and links to the active datum.

26 Claims, 52 Drawing Sheets

FIG. 7A
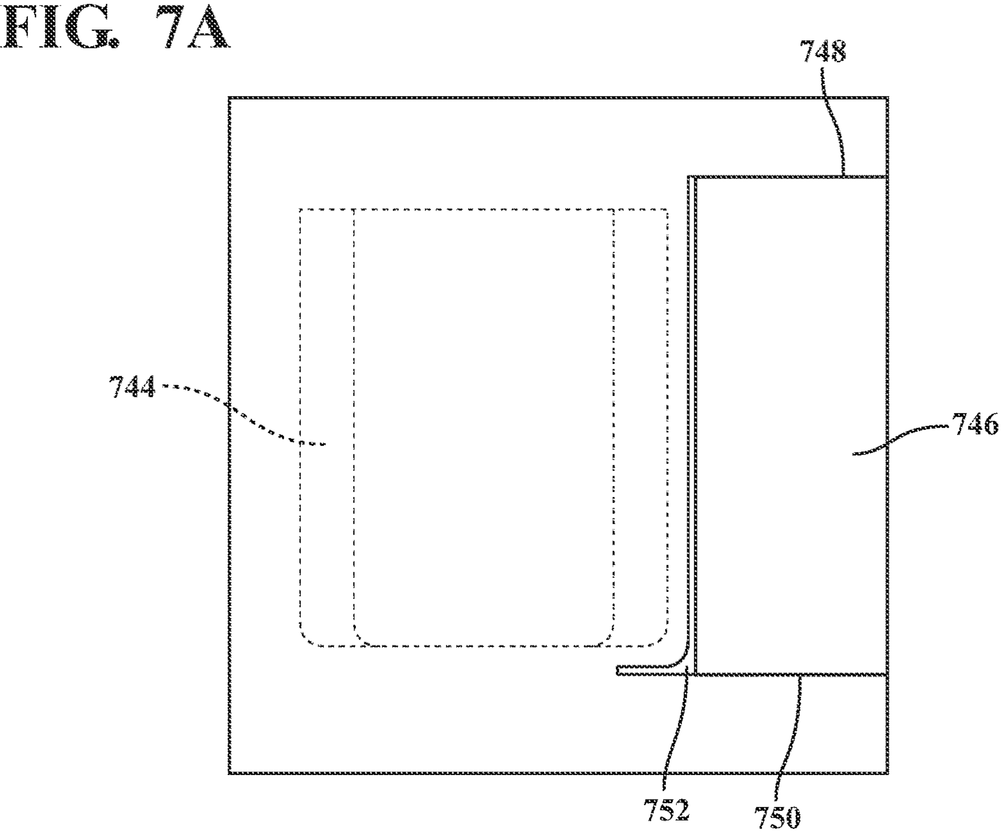
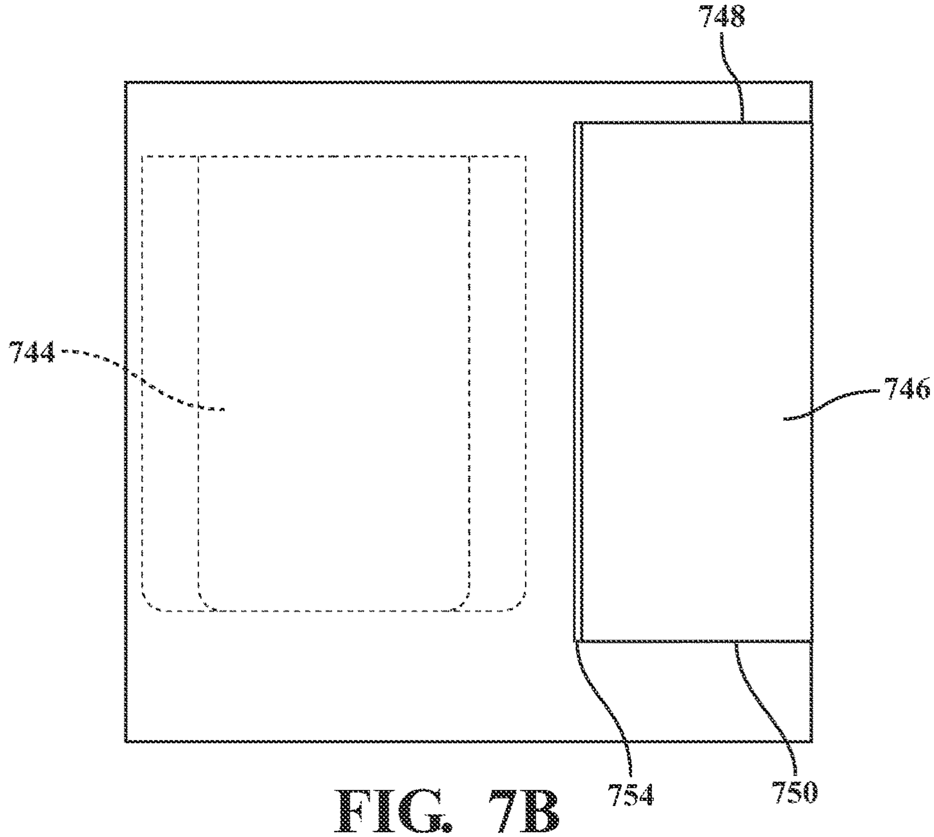
FIG. 7B

SYSTEMS AND METHODS TO AUTOMATE CNC PROGRAMMING

CROSS-REFERENCE TO RELATED APPLICATIONS

This application claims priority to U.S. provisional patent application No. 63/402,220, filed on Aug. 30, 2022, the disclosure of which is incorporated herein by reference.

BACKGROUND OF THE INVENTION

1. Field of the Invention

The present invention relates to methods and systems for automating the programming of Computer Numerical Control (CNC) machines. More particularly, the invention relates to methods and systems for automating the programming of a 3 axis CNC machine.

2. Description of Related Art

Three dimensional (3D) objects may be created from stock material, which is generally a "blank" or "workpiece" that is larger than the 3D object, by cutting away portions of the stock material. Such manufacturing processes typically involve the use of a CNC machine.

Currently, CNC machines are programmed by individuals. The programmers receive design specifications for the detail, and generate the code to instruct the CNC machines which tools to use, what parameters to use when setting up the tools, and which toolpaths the tools should follow to ultimately machine the detail from the stock block. The resulting programming code is often inconsistent because it is created by different programmers. It is desirable to automate the programming of CNC machines not only to save time, but to make the programming more consistent.

SUMMARY OF THE INVENTION

According to one embodiment, there is provided a method in a data processing system for automating programming of a computer numerical control machine to create a detail from a stock block based on design specifications for the detail. The stock block includes a plurality of sides including a left side, a right side, a front, a back, a top and a bottom. The method comprises creating a stock model from the design specifications, setting leads and links to active datum on the stock model, determining from the design specifications what machine will be used to create the detail, determining from the design specifications what material will be used to create the detail, importing tool templates for the machine and the material that will be used to create the detail, and determining whether stock needs to be removed from the left and right sides of the stock block. If it is determined that stock needs to be removed from the left and right sides of the stock block: activating a top workplane, activating a top toolpath folder, creating a PowerMill block around the stock model, wherein the PowerMill block has an X negative expanded and a Z negative expanded, applying a 12 mmZLevel template, creating a PowerMill block around the stock model, wherein the PowerMill block has an X positive expanded and a Z negative expanded, applying a 12 mmZLevel template, updating the stock model, and resetting the leads and links to the active datum.

According to another embodiment, there is provided a method in a data processing system for automating programming of a computer numerical control machine to create a detail from a stock block based on design specifications for the detail. The stock block includes a plurality of sides including a left side, a right side, a front, a back, a top and a bottom. The method comprises creating a stock model from the design specifications, setting leads and links to active datum on the stock model, determining from the design specifications what machine will be used to create the detail, determining from the design specifications what material will be used to create the detail, importing tool templates for the machine and the material that will be used to create the detail, activating a top workplane, activating a top toolpath folder, creating the PowerMill block with a Z minimum set to a maximum surface Z, determining whether stock needs to be removed from the top of the stock block, and if it is determined that stock needs to be removed from the top of the stock block, applying a 12 mm pocketing template. The method further comprises determining whether a raised boss is present. If it is determined that a raised boss is present, the method further comprises creating a PowerMill block with a boss expansion, and if it is determined that a raised boss is not present, the method further comprises creating the PowerMill block without the boss expansion. The method further comprises applying a 12 mm pocketing template and resetting the leads and links.

According to another embodiment, there is provided a method in a data processing system for automating programming of a computer numerical control machine to create a detail from a stock block based on design specifications for the detail. The detail includes a plurality of surfaces and the stock block includes a plurality of sides including a left side, a right side, a front, a back, a top and a bottom. The method comprises creating a PowerMill silhouette boundary with a border from the detail surfaces, creating a list of PowerMill polylines, adding newly created boundary data to the list of PowerMill polylines, and for each polyline, creating a bounding box from the polyline, determining whether the polyline X and Y sizes are equal to the detail X and Y sizes, and if it is determined that the polyline X and Y sizes are equal to the detail X and Y sizes, converting the polyline into a PointCloud.

According to another embodiment, there is provided a non-transitory computer readable medium containing instructions for controlling a data processing system to perform a method for automating programming of a computer numerical control machine to create a detail from a stock block based on design specifications for the detail. The stock block includes a plurality of sides including a left side, a right side, a front, a back, a top and a bottom. The method comprises creating a stock model from the design specifications, setting leads and links to active datum on the stock model, determining from the design specifications what machine will be used to create the detail, determining from the design specifications what material will be used to create the detail, importing tool templates for the machine and the material that will be used to create the detail, and determining whether stock needs to be removed from the left and right sides of the stock block. If it is determined that stock needs to be removed from the left and right sides of the stock block: activating a top workplane, activating a top toolpath folder, creating a PowerMill block around the stock model, wherein the PowerMill block has an X negative expanded and a Z negative expanded, applying a 12 mmZLevel template, creating a PowerMill block around the stock model, wherein the PowerMill block has an X positive expanded and a Z negative expanded, applying a 12 mmZLevel template, updating the stock model, and resetting the leads and links to the active datum.

According to another embodiment, there is provided a non-transitory computer readable medium containing instructions for controlling a data processing system to perform a method for automating programming of a computer numerical control machine to create a detail from a stock block based on design specifications for the detail. The stock block includes a plurality of sides including a left side, a right side, a front, a back, a top and a bottom. The method comprises creating a stock model from the design specifications, setting leads and links to active datum on the stock model, determining from the design specifications what machine will be used to create the detail, determining from the design specifications what material will be used to create the detail, importing tool templates for the machine and the material that will be used to create the detail, activating atop workplane, activating atop toolpath folder, creating the PowerMill block with a Z minimum set to a maximum surface Z, determining whether stock needs to be removed from the top of the stock block, and if it is determined that stock needs to be removed from the top of the stock block, applying a 12 mm pocketing template. The method further comprises determining whether a raised boss is present. If it is determined that a raised boss is present, the method further comprises creating a PowerMill block with a boss expansion, and if it is determined that a raised boss is not present, the method further comprises creating the PowerMill block without the boss expansion. The method further comprises applying a 12 mm pocketing template and resetting the leads and links.

According to another embodiment, there is provided a non-transitory computer readable medium containing instructions for controlling a data processing system to perform a method for automating programming of a computer numerical control machine to create a detail from a stock block based on design specifications for the detail. The detail includes a plurality of surfaces and the stock block includes a plurality of sides including a left side, a right side, a front, a back, a top and a bottom. The method comprises creating a PowerMill silhouette boundary with a border from the detail surfaces, creating a list of PowerMill polylines, adding newly created boundary data to the list of PowerMill polylines, and for each polyline, creating a bounding box from the polyline, determining whether the polyline X and Y sizes are equal to the detail X and Y sizes, and if it is determined that the polyline X and Y sizes are equal to the detail X and Y sizes, converting the polyline into a PointCloud.

BRIEF DESCRIPTION OF THE DRAWINGS

Advantages of the present disclosure will be readily appreciated as the same becomes better understood by reference to the following detailed description when considered in connection with the accompanying drawings, wherein:

FIGS. 7A-7B illustrate the difference between a stock model with all stock removed and a stock model with a portion of the material remaining after being processed with a cutting tool;

DETAILED DESCRIPTION OF THE INVENTION

Figure 1:
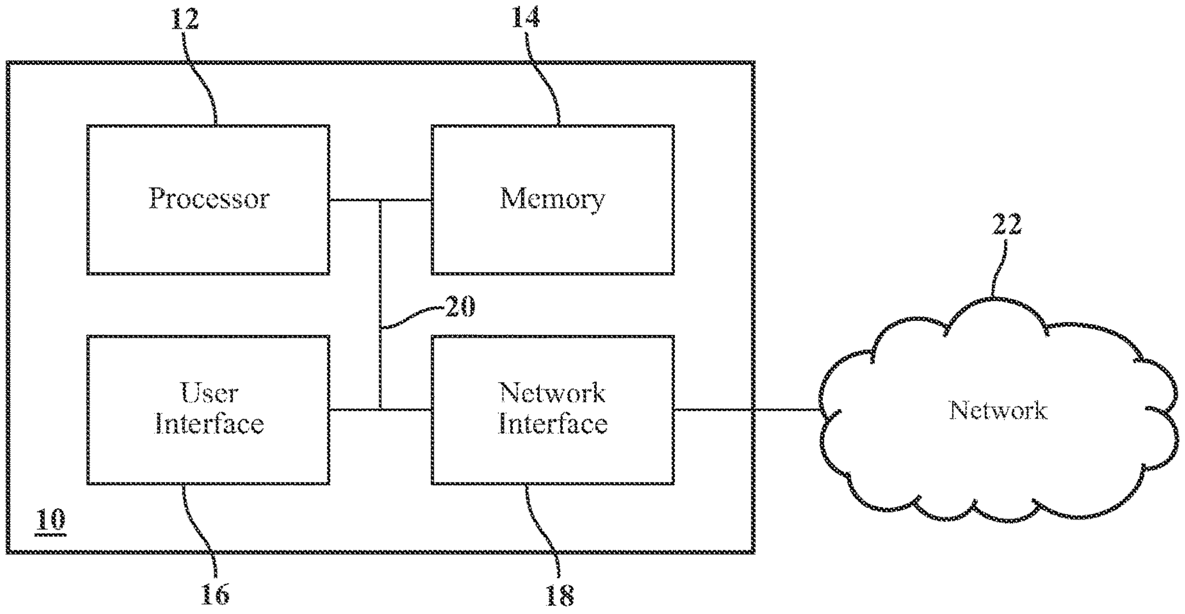
FIG. 1 shows a data processing system suitable for implementing a method for automating CNC programming, in accordance with the present invention.

FIG. 1 depicts an exemplary data processing system 10 suitable for practicing methods and systems consistent with the present invention. Data processing system 10 includes a processor 12, a memory 14, a user interface 16 and a network interface 18. These internal components exchange information via a system bus 20. The components are standard in most computer systems and are suitable to practice methods and systems consistent with the present invention. The processor 12 processes information and executes the computer executable instructions. The memory 14 includes non-transitory computer readable mediums, and stores information and instructions to be executed by the processor. The memory 14 includes computer storage media in the form of volatile and/or nonvolatile memory, such as read only memory (ROM) and random access memory (RAM). The user interface 16 connects the data processing system to various input devices, such as a keyboard, mouse, touch pad, or microphone, and to various output devices, such as a display device or a speaker. The network interface 18 connects the data processing system 10 to a network 22, such as a Local Area Network, a Wide Area Network, or the Internet.

Before initiating the method for automating CNC programming, a number of documents are created, including a digital cover sheet, a text file and a .stp file. The digital cover sheet includes information including the status of the programming, and what material and machine will be used to create the detail. The text file contains information regarding the .stp file, including the name and location of the .stp file, the job number and the detail number. The .stp file includes the design specifications for the detail as well as data regarding the stock block. When a detail is ready to be processed, the user will save these documents into a directory in memory 14.

Figure 2A:
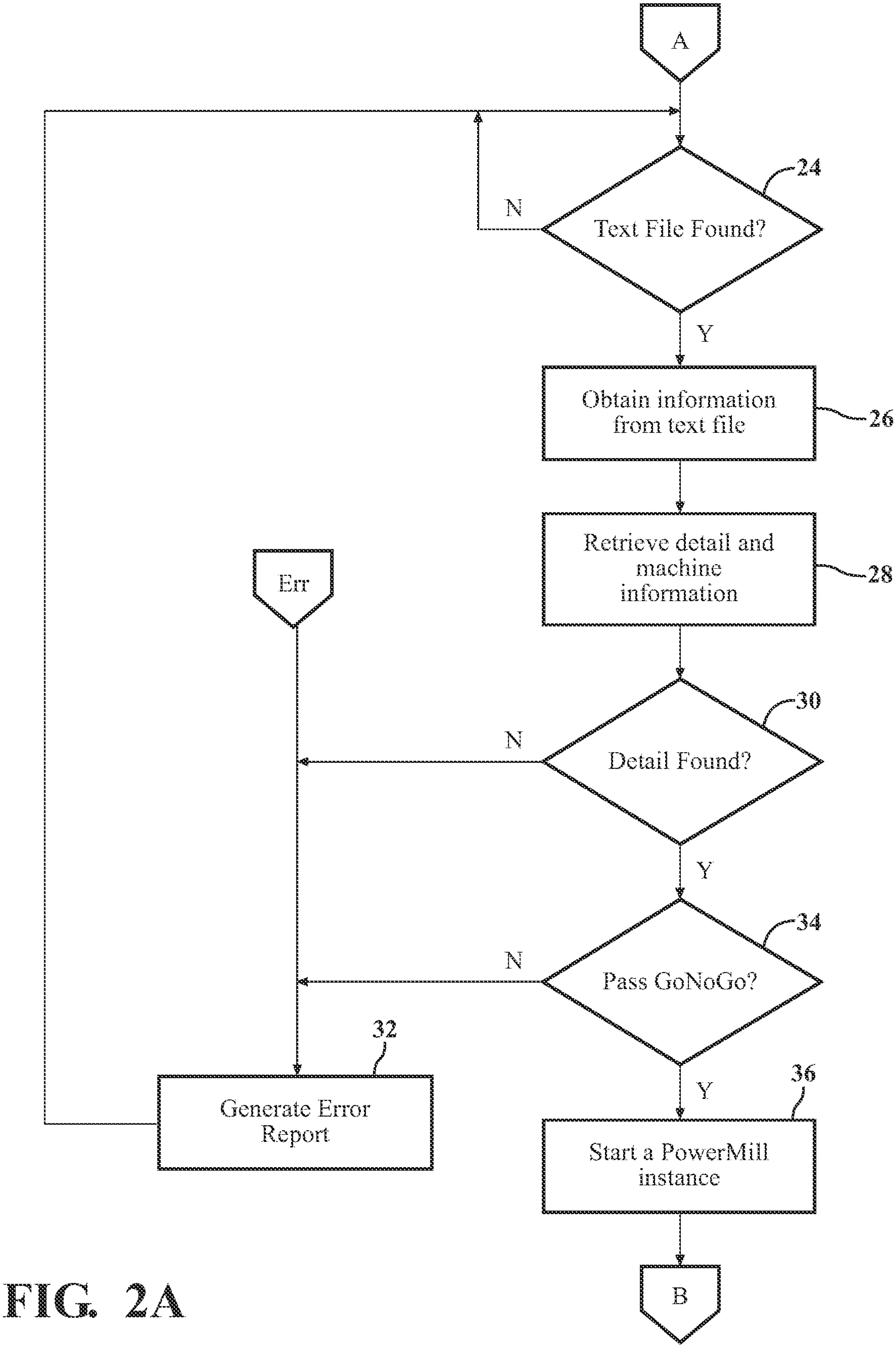
FIGS. 2A-2AB show a flow chart illustrating a method for automating CNC programming, in accordance with the present invention.

FIGS. 2A-2AB show a flow chart illustrating a method for automating CNC programming using PowerMill in accordance with the present invention. PowerMill is an Autodesk 3D computer-aided manufacturing (CAM) solution for programming toolpaths for CNC milling machines. The present invention is specifically directed to programming a 3 axis CNC machine. Referring to FIG. 2A, the system 10 initially waits until the text file is saved onto the directory (step 24). The system 10 may be setup to check the directory on a regular basis, e.g., every 10 seconds. The system 10 then obtains information regarding the .stp file from the text file (step 26). The system 10 uses the job number and the detail number from the text file to retrieve information from the database regarding the detail and the machine on which the detail will be processed (step 28). If the system 10 does not find information regarding the detail on the database (step 30), the system 10 generates an error report (step 32). The error report includes information (e.g., the job and detail number, what the error is, etc.) so the user can determine the cause of the error. The system 10 then returns to step 24 to wait for the next text file to be saved onto the directory.

If at step 30 the system 10 finds the information regarding the detail, the system 10 will determine whether toolpaths and tool templates have been created for the machine on which the detail will be processed (i.e., if it passes the "Go-NoGo" stage) (step 34). If the system 10 determines that the information does not pass the "Go-NoGo" stage (step 34), the detail cannot be processed properly so the system 10 will generate an error report (step 32) and return to step 24 to wait for the next text file to be saved onto the directory.

Figure 2B:
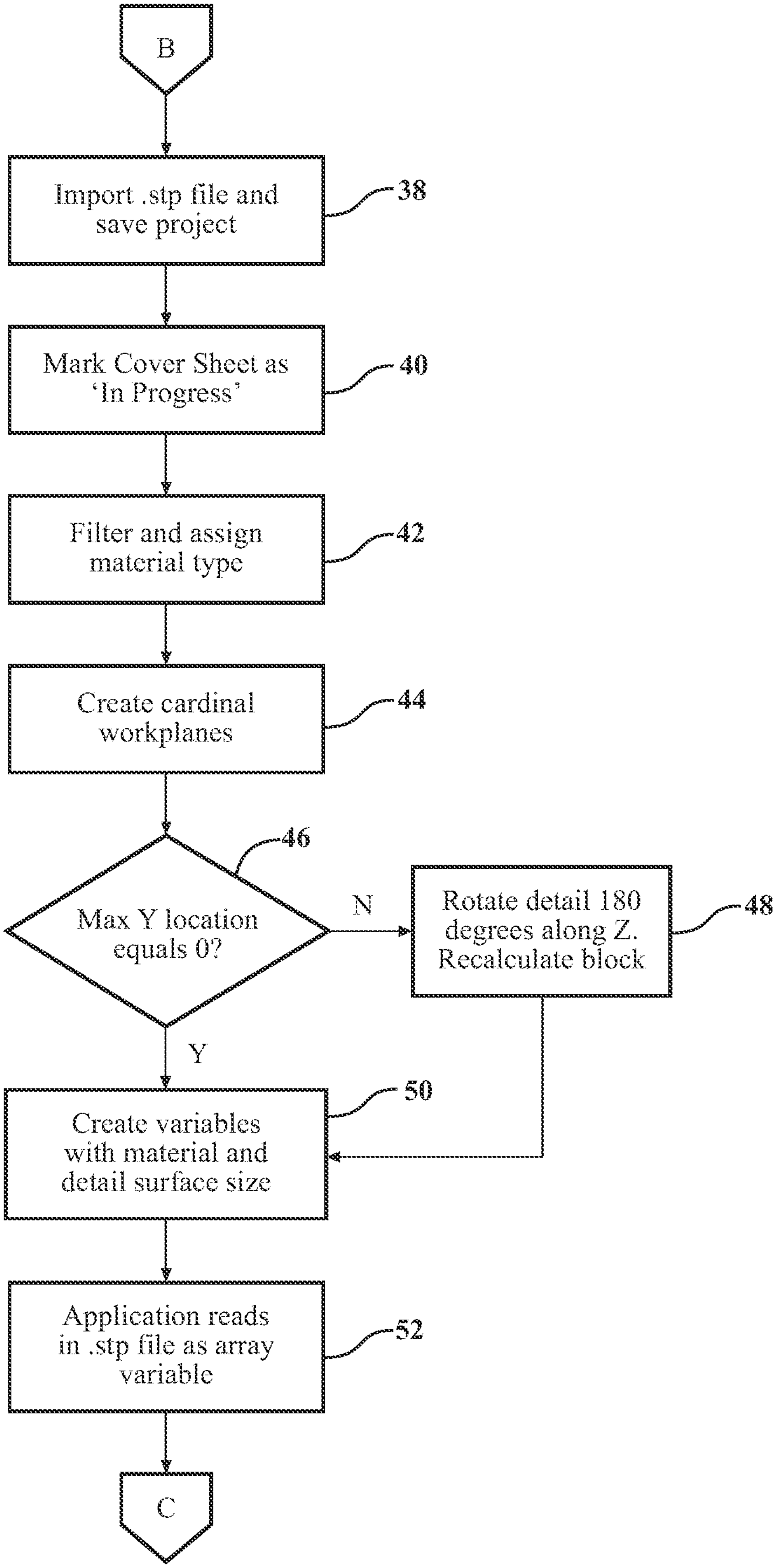
Figure 2C:
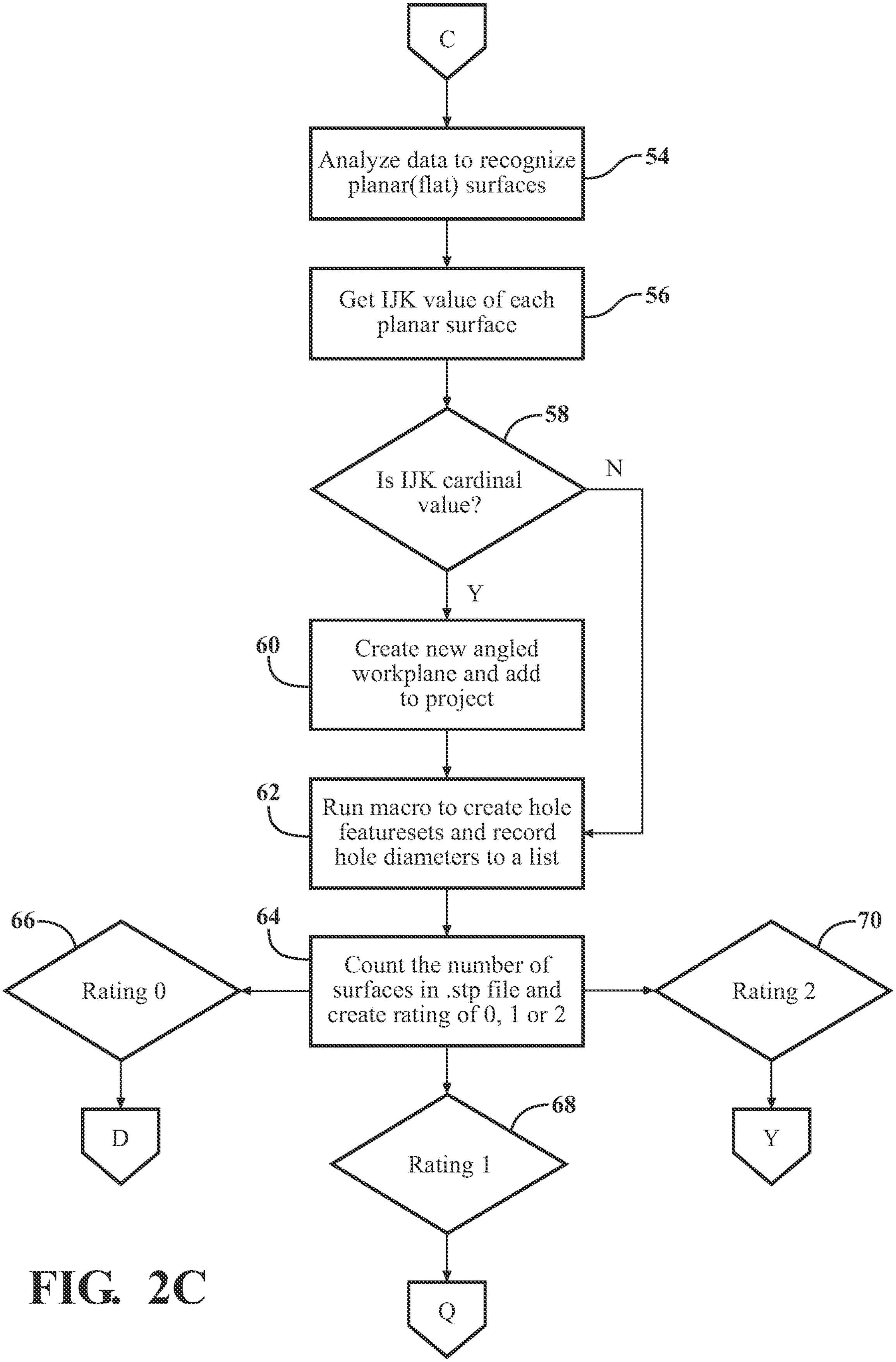
Figure 8:
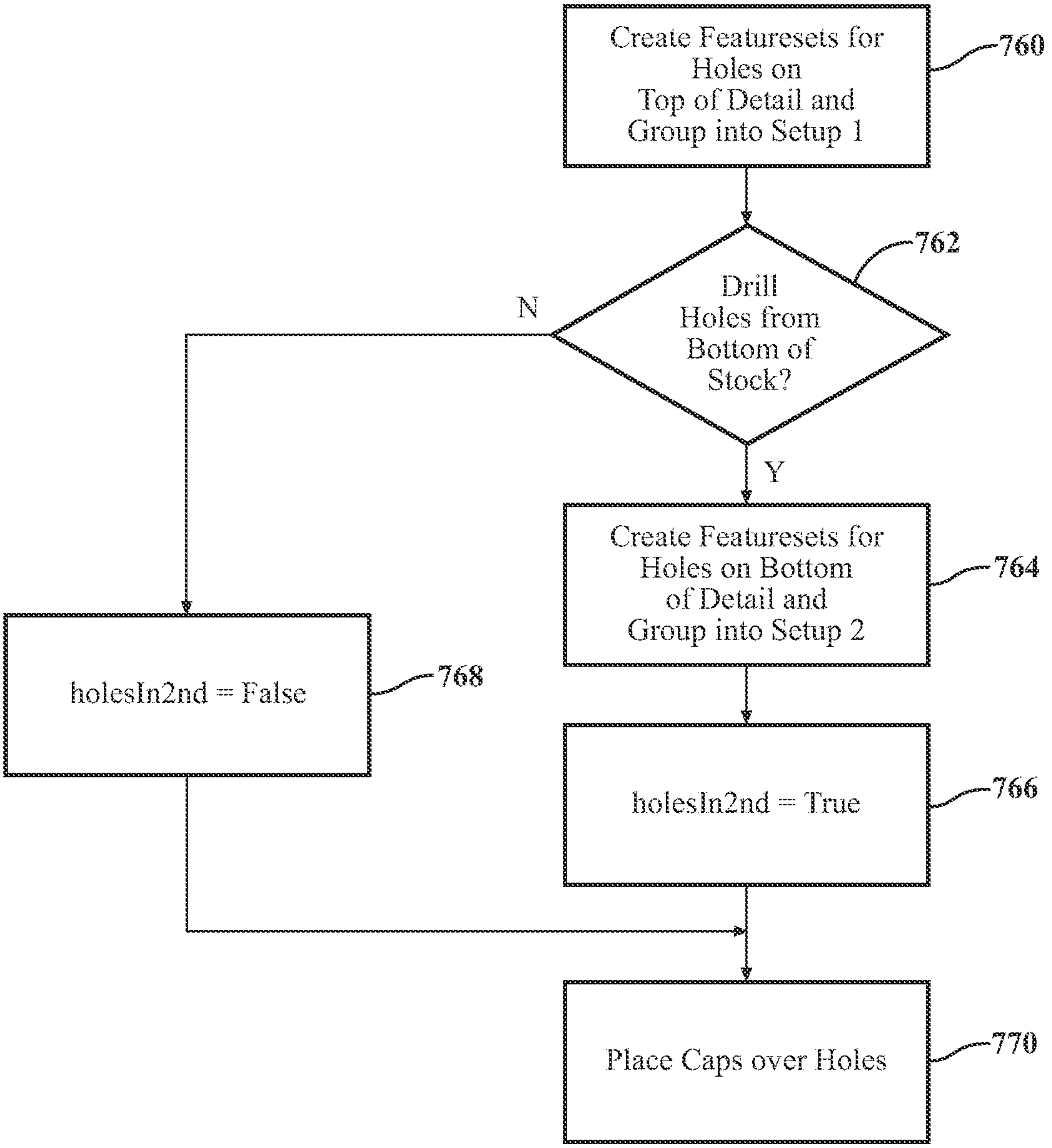
FIG. 8 shows a macro to create feature sets.

If the system 10 determines that the information passes the "Go-NoGo" stage (step 34), the system 10 starts a PowerMill instance (step 36). The system 10 imports the .stp file to PowerMill and saves the project (step 38, FIG. 2B). The system 10 then marks the digital cover sheet as "In Progress" (step 40) to notify others that the system 10 is writing the code to machine the detail, and will filter and assign the type of material that will be used to create the detail (step 42). The system 10 then creates cardinal workplanes for the stock block (step 44) and determines whether the maximum Y location equals 0 (step 46). If the maximum Y location does not equal 0, then the detail was inserted in reverse so the system 10 rotates the detail 180 degrees along the Z axis and recalculates the block (step 48). After recalculating the block at step 48 or if at step 46 the system 10 determines that the maximum Y location equals 0, the system 10 creates variables with the material and detail surface size (step 50), and reads in the .stp file as an array variable (step 52). The system 10 then analyzes the data to recognize the planar, flat surfaces (step 54, FIG. 2C). The system 10 obtains IJK values for each of the planar surfaces (step 56), and determines whether the IJK is a cardinal value (step 58). If the IJK is a cardinal value, the system 10 creates a new angled workplane and adds it to the project (step 60). After creating anew angled workplane or if at step 58 the system 10 determines that the IJK is not a cardinal value, then the system 10 runs a macro to create hole feature sets and records the hole diameters to a list (step 62). A macro is a file that contains a sequence of commands to automate recurrent operations. Because some PowerMill commands are not accessible through the PowerMill API, they can only be executed one command at a time. Accordingly, loops and conditional statements cannot be written for these commands unless a macro is created. The macro to create feature sets is shown in FIG. 8.

After running the macro to create hole feature sets, the system 10 counts the number of surfaces in the .stp file (step 64), and categorizes the detail based on its complexity. If the number of surfaces equals 6, the system 10 creates a rating of 0 (step 66), and proceeds with step 72 in FIG. 2D. If the number of surfaces is between 7 and about 12, the system 10 creates a rating of 1 (step 68), and proceeds with step 436 in FIG. 2Q. And if the number of surfaces is more than about 12, the system 10 creates a rating of 2 (step 70), and proceeds with step 608 in FIG. 2Y.

Figure 2D:
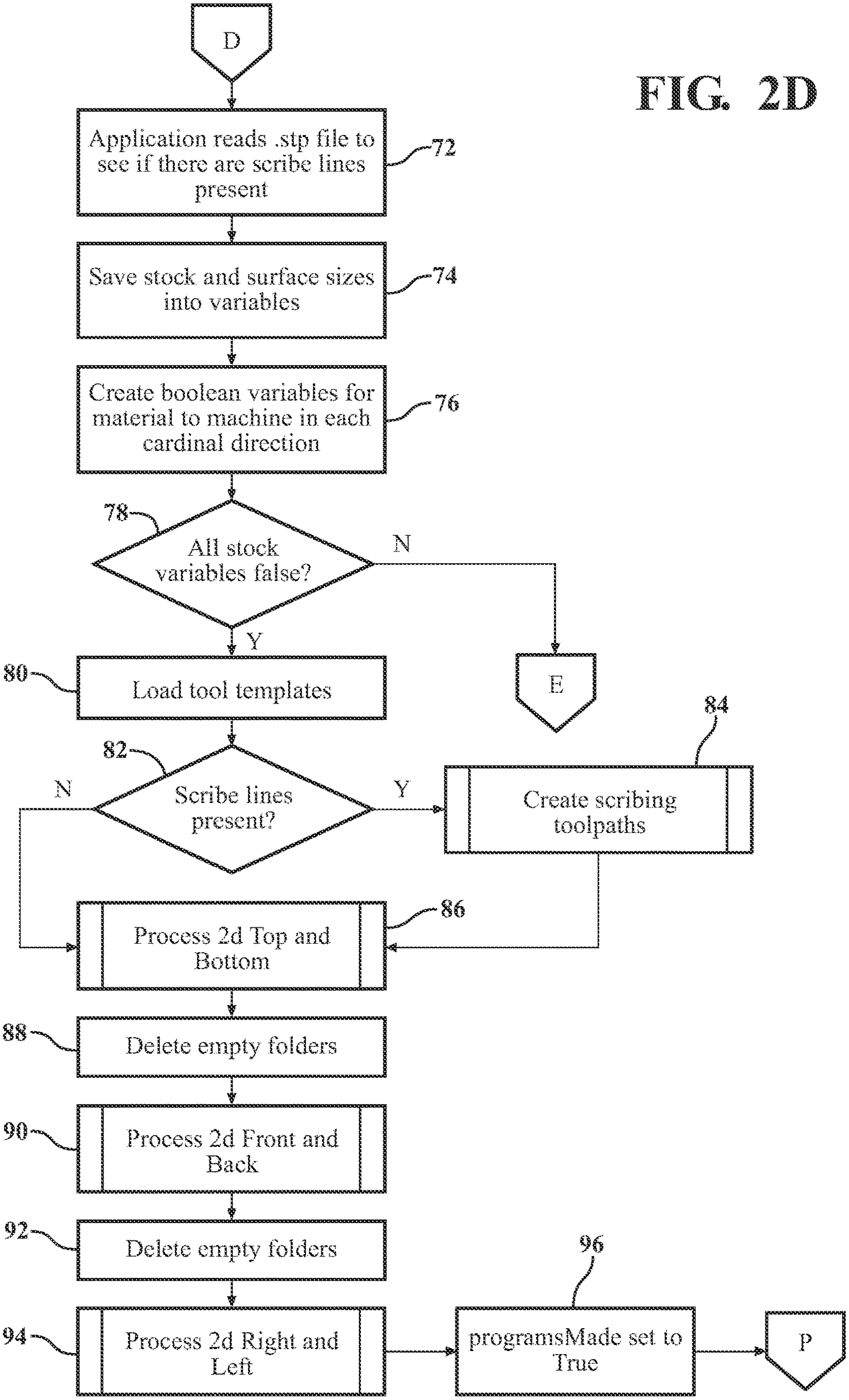

After creating a rating of 0 at step 66, the system 10 reads the .stp file to determine whether there are any scribe lines present (step 72, FIG. 2D). The system 10 saves the stock and surface sizes into variables (step 74), and creates Boolean variables for the material to machine in each cardinal direction (step 76). The system 10 determines whether all stock variables are False (step 78). When a stock variable is True, material needs to be removed off one the corresponding surface on the stock block. Thus, if all stock variables are False, no extra material needs to be machined off of the periphery of the stock block. If the system 10 determines that all stock variables are False, the system 10 loads the tool templates for the machine and the material being processed (step 80).

Figure 3:
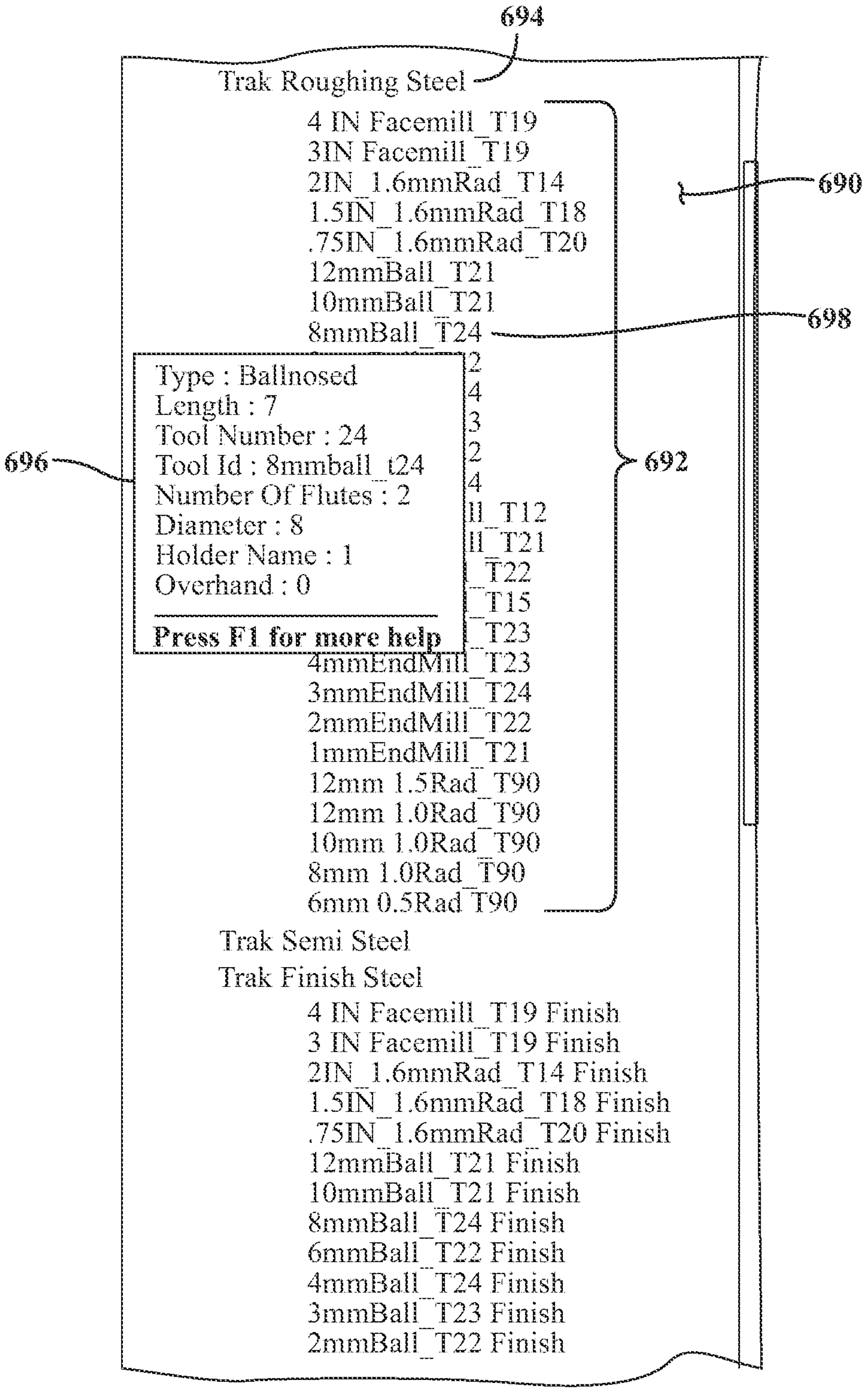
FIG. 3 shows an exemplary file directory of tool templates.
Figure 4:
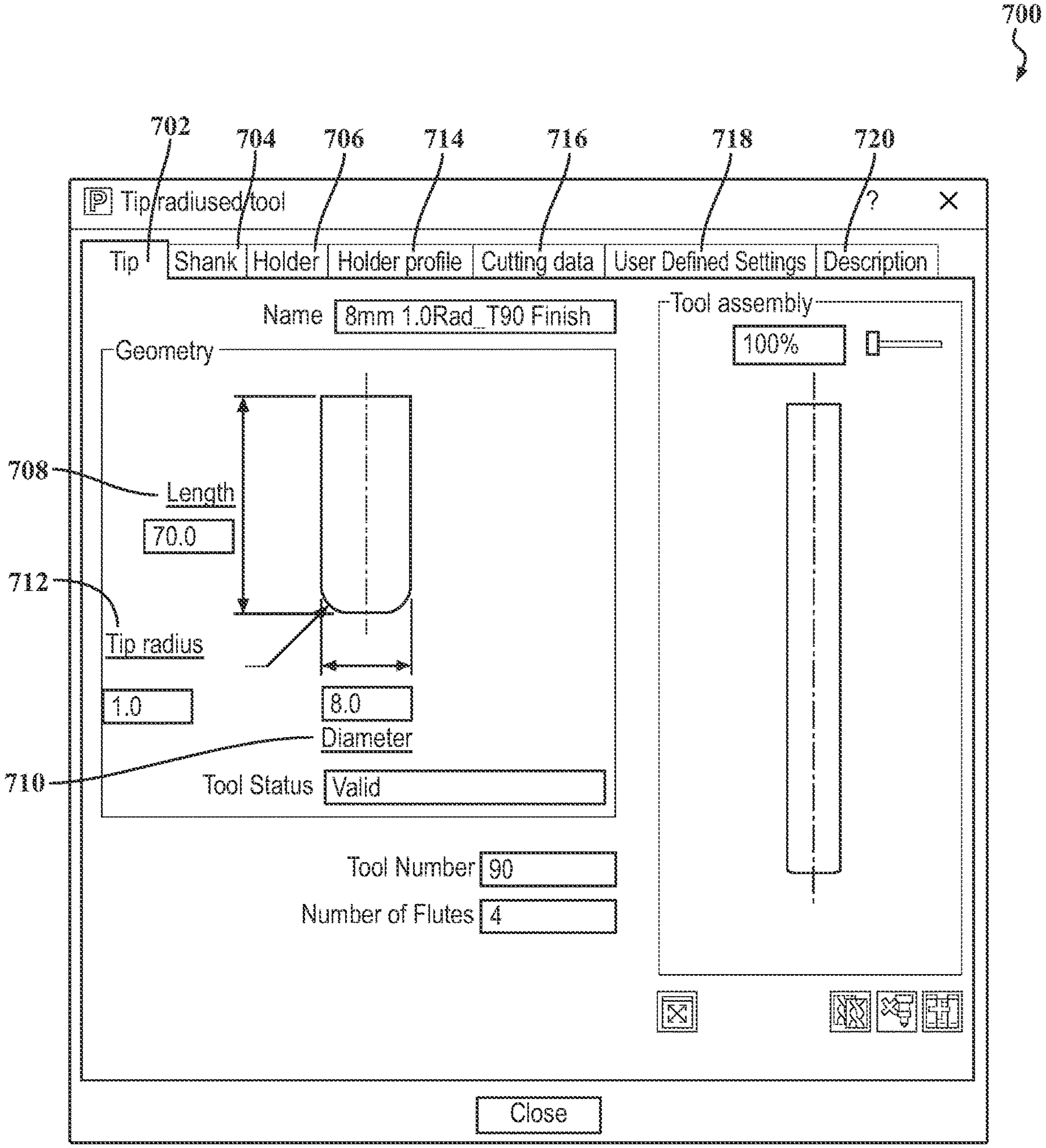
FIG. 4 shows an exemplary tool template.

The tool templates are a library of tools that are available for a particular machine to use on a particular material. For example, FIG. 3 shows an exemplary file directory 690 for a given machine that includes the tool templates 692 that are appropriate if the material to be cut is Trak Roughing Steel 694. Menu 696 summarizes the information available for one of those tools: an 8 mm Ballnosed drill assigned tool number 24 ("8 mmBall_T24") 698. Referring to FIG. 4, each tool template 700 includes information regarding the tool components, such as the tip 702, the shank 704 and the holder 706. For example, the tool template 700 will identify the length 708, diameter 710 and tip radius 712 for the tip 702. The tool template 700 will also include information regarding the holder profile 714 and cutting data 716, such as how fast to rotate the tool, how fast to move from point to point, and how much material can be removed at a time. The tool template 700 may also include user defined settings 718 and a description 720 of the tool.

Figure 9A:
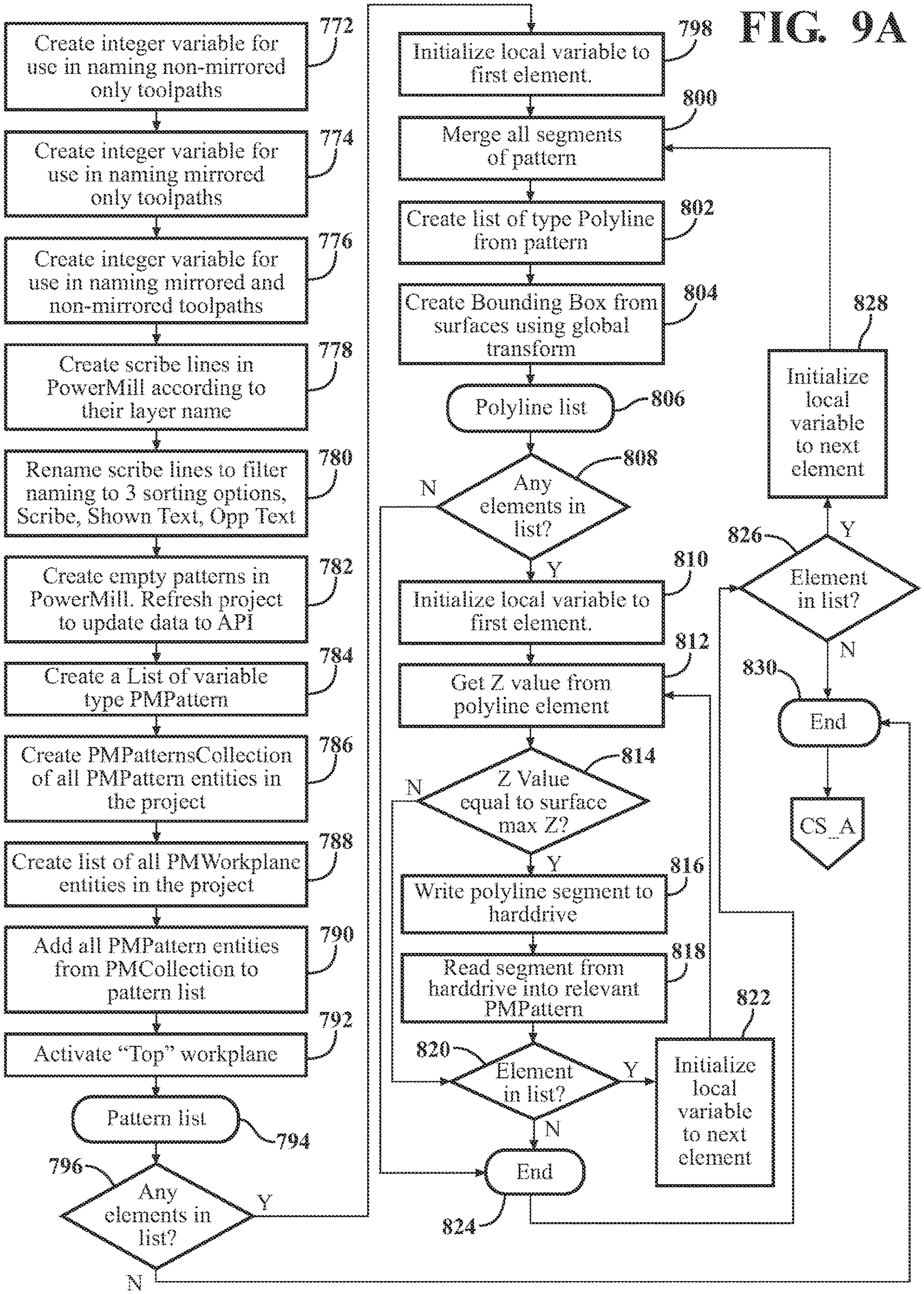
FIGS. 9A-9B show an exemplary method for creating scribing toolpaths.
Figure 9B:
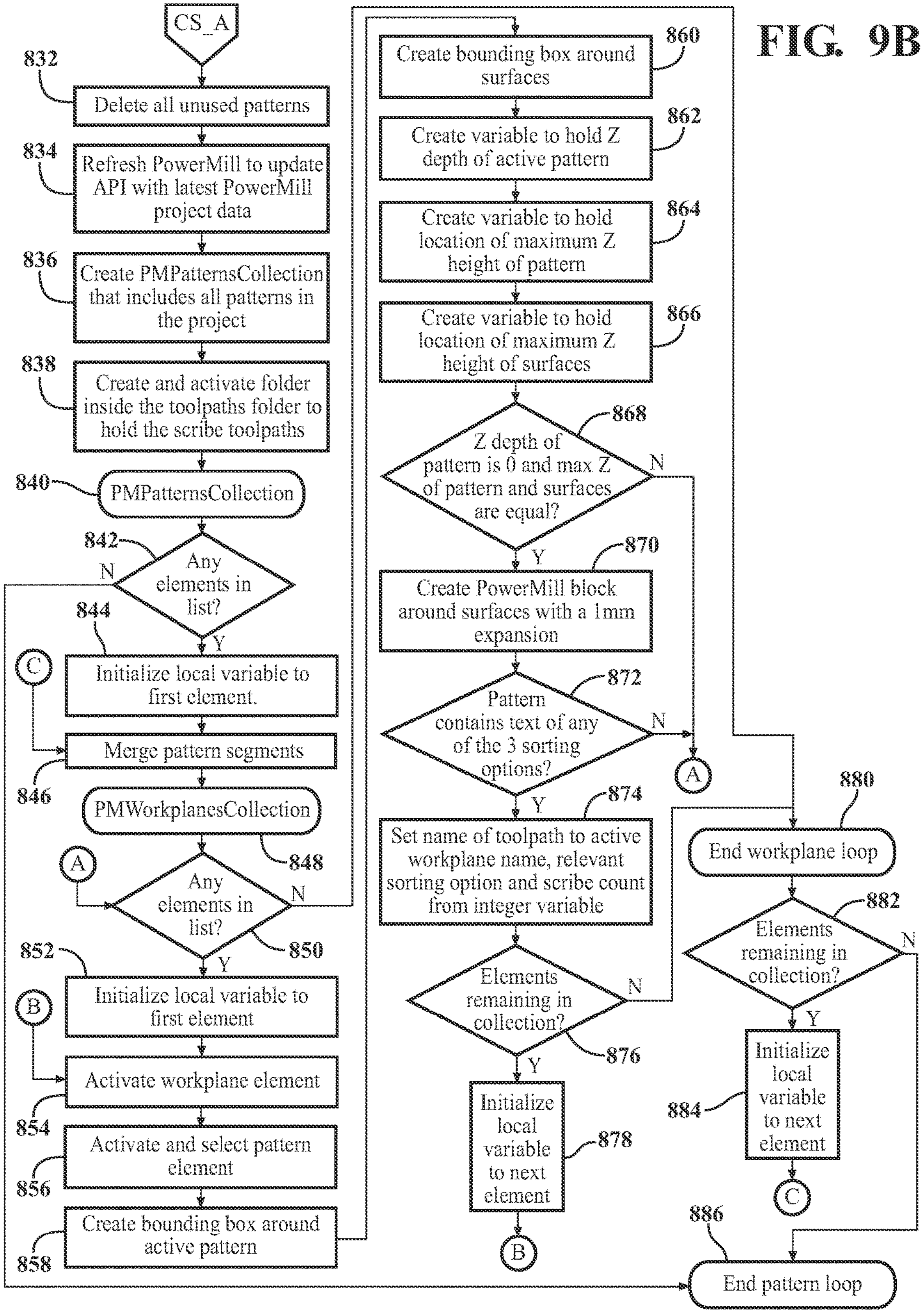
Figure 10A:
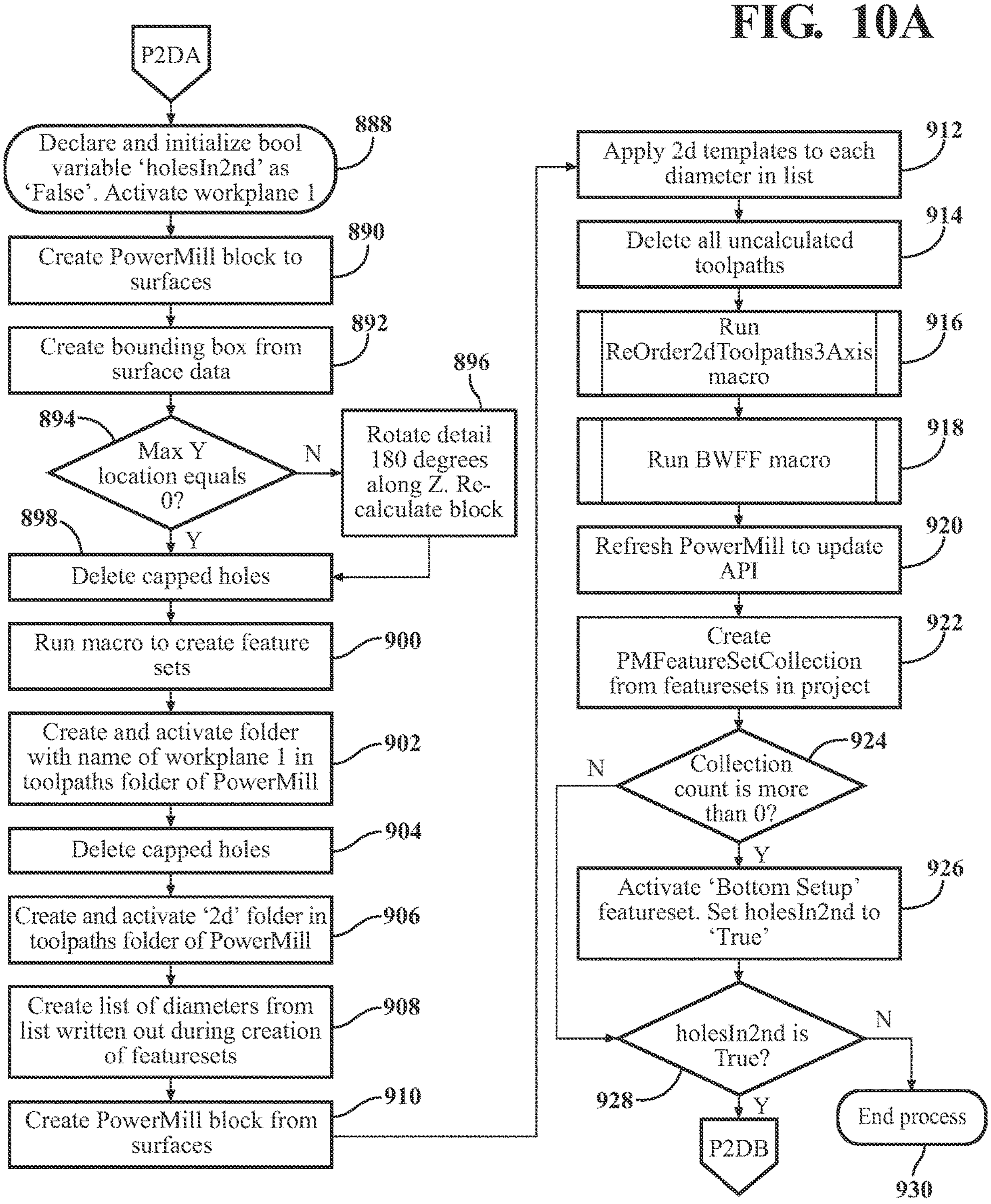
FIGS. 10A-10B show an exemplary method to process 2d templates.
Figure 10B:
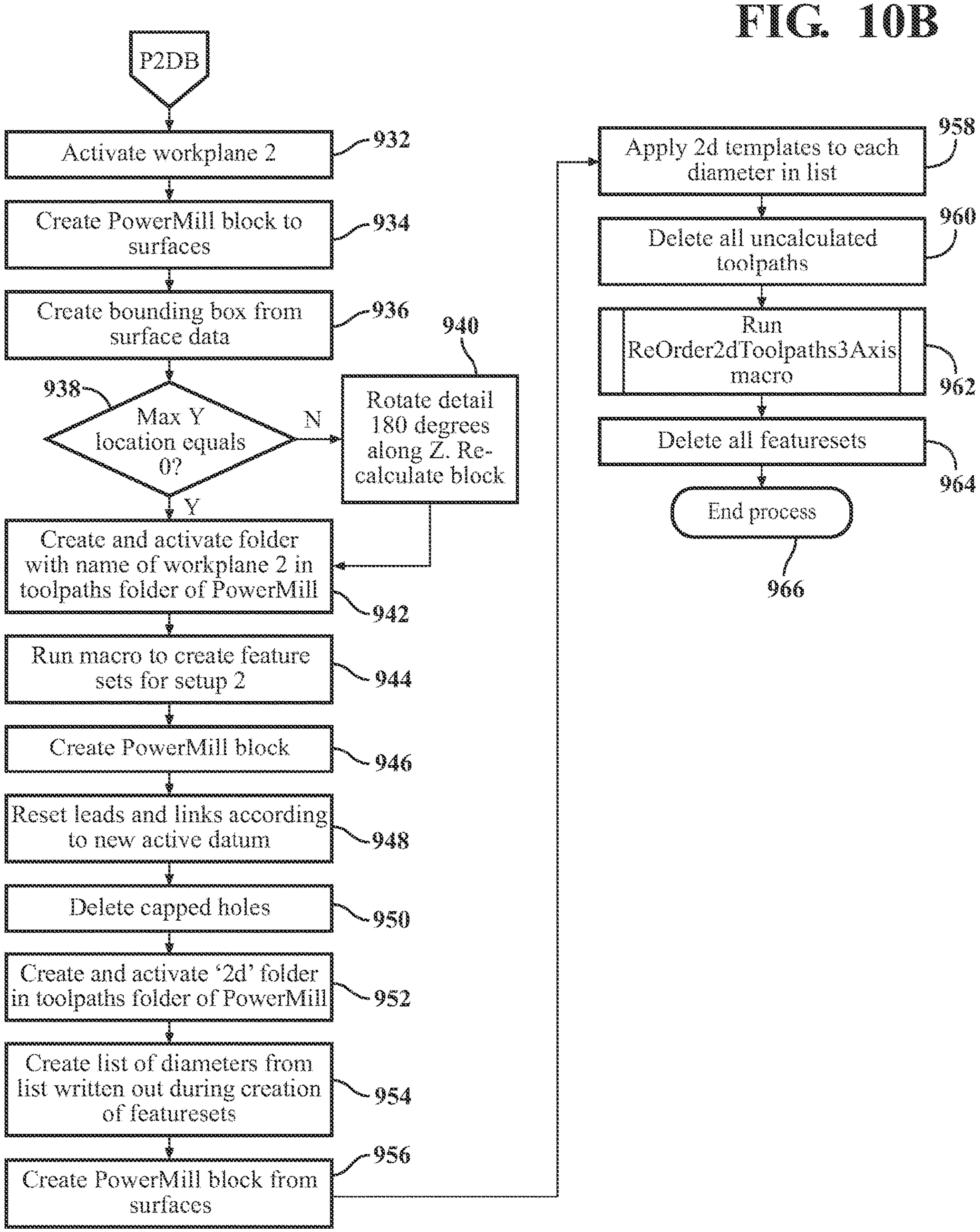

Returning to FIG. 2D, after loading the tool templates, the system 10 determines whether any scribe lines are present (step 82). If scribe lines are present, the system 10 runs a method to create scribing toolpaths (step 84). The method to create scribing toolpaths is shown in FIGS. 9A-9B. After running the method to create scribing toolpaths or if at step 82, the system 10 determines that there are no scribe lines present, the system 10 runs a method to process 2d templates on the top and bottom of the stock block (step 86). The method to process 2d templates is shown in FIGS. 10A-10B. The system 10 deletes the empty folders (step 88) and runs the method to process 2d templates on the front and back of the stock block (step 90). The system 10 deletes the empty folders (step 92) and runs the method to process 2d templates on the right and left of the stock block (step 94). The system 10 sets programs Made to True (step 96), and proceeds to step 396 in FIG. 2P.

Figure 2E:
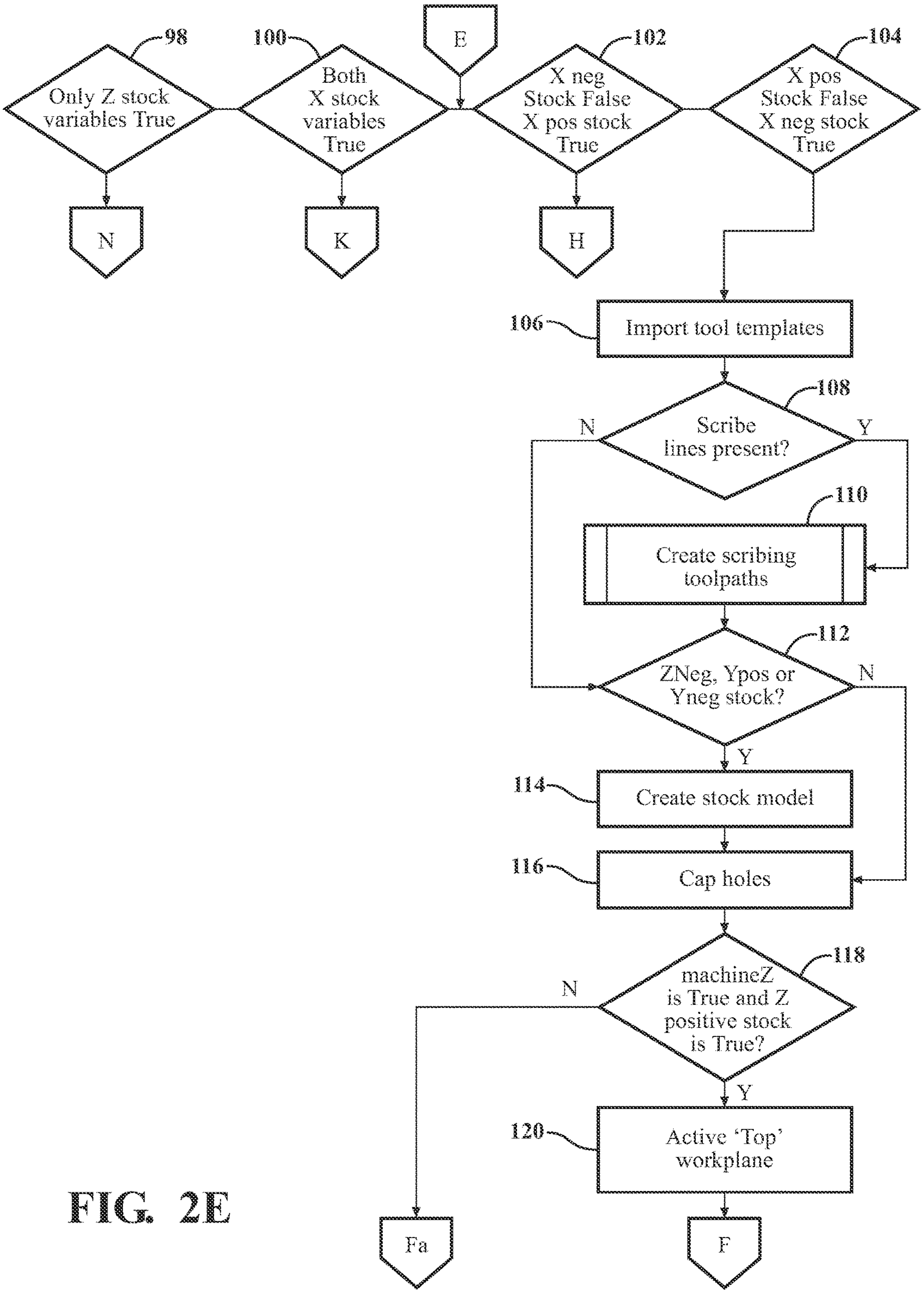
Figure 2F:
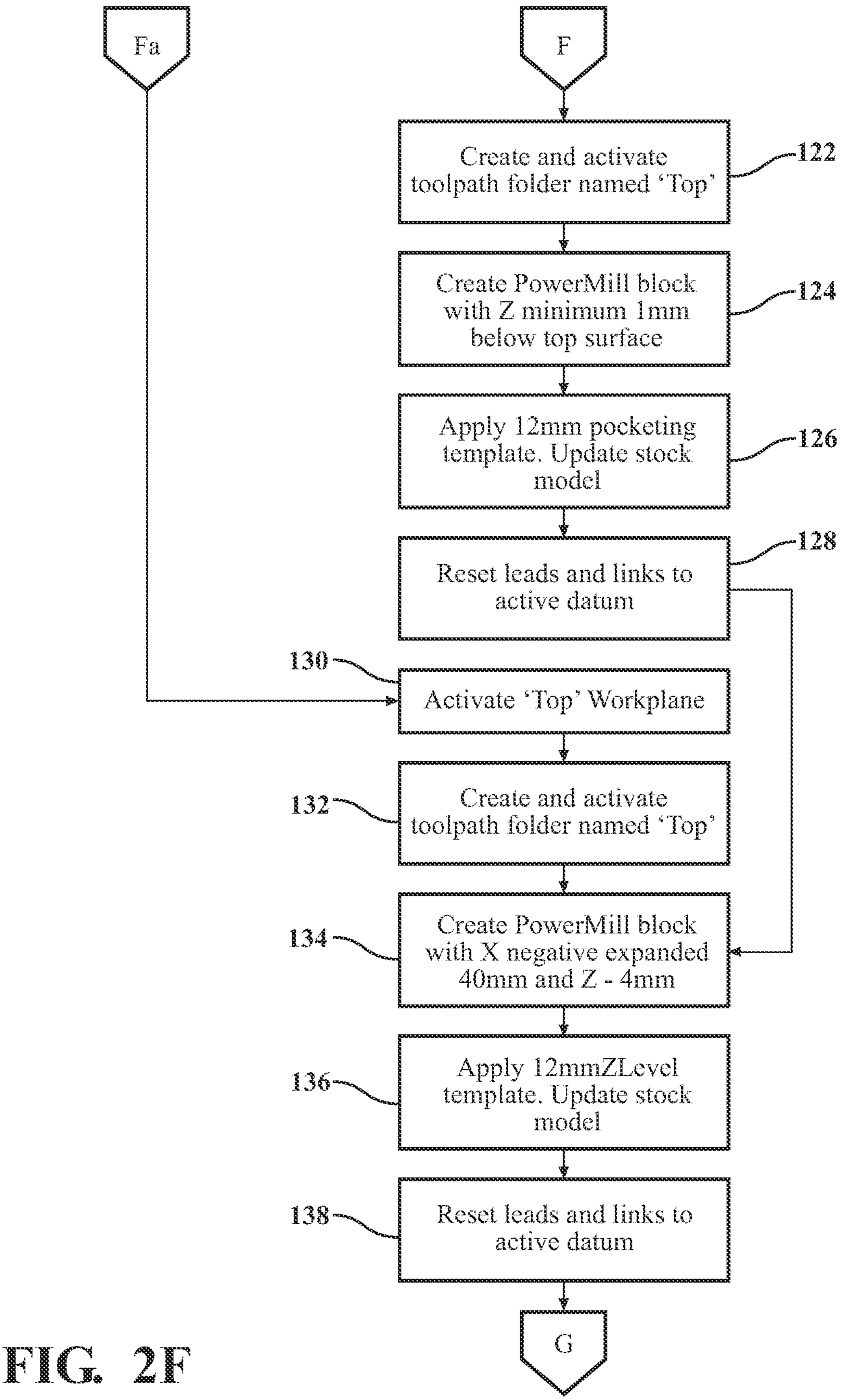
Figure 5A:
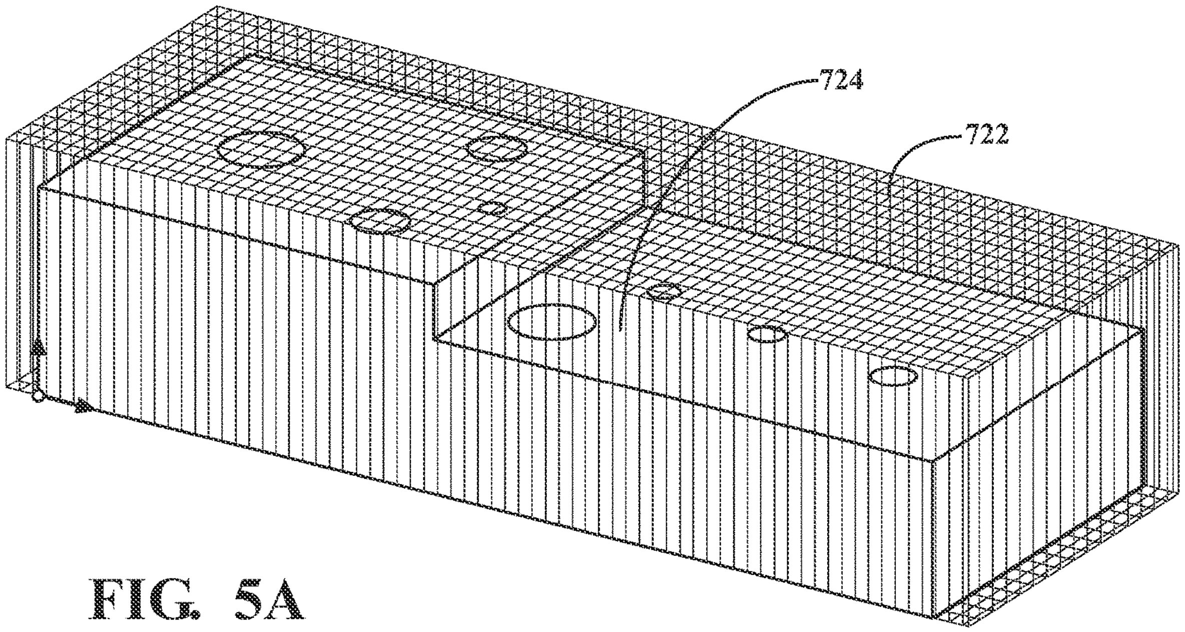
FIGS. 5A-5B show a stock model and corresponding detail before and after applying a tool template.
Figure 6:
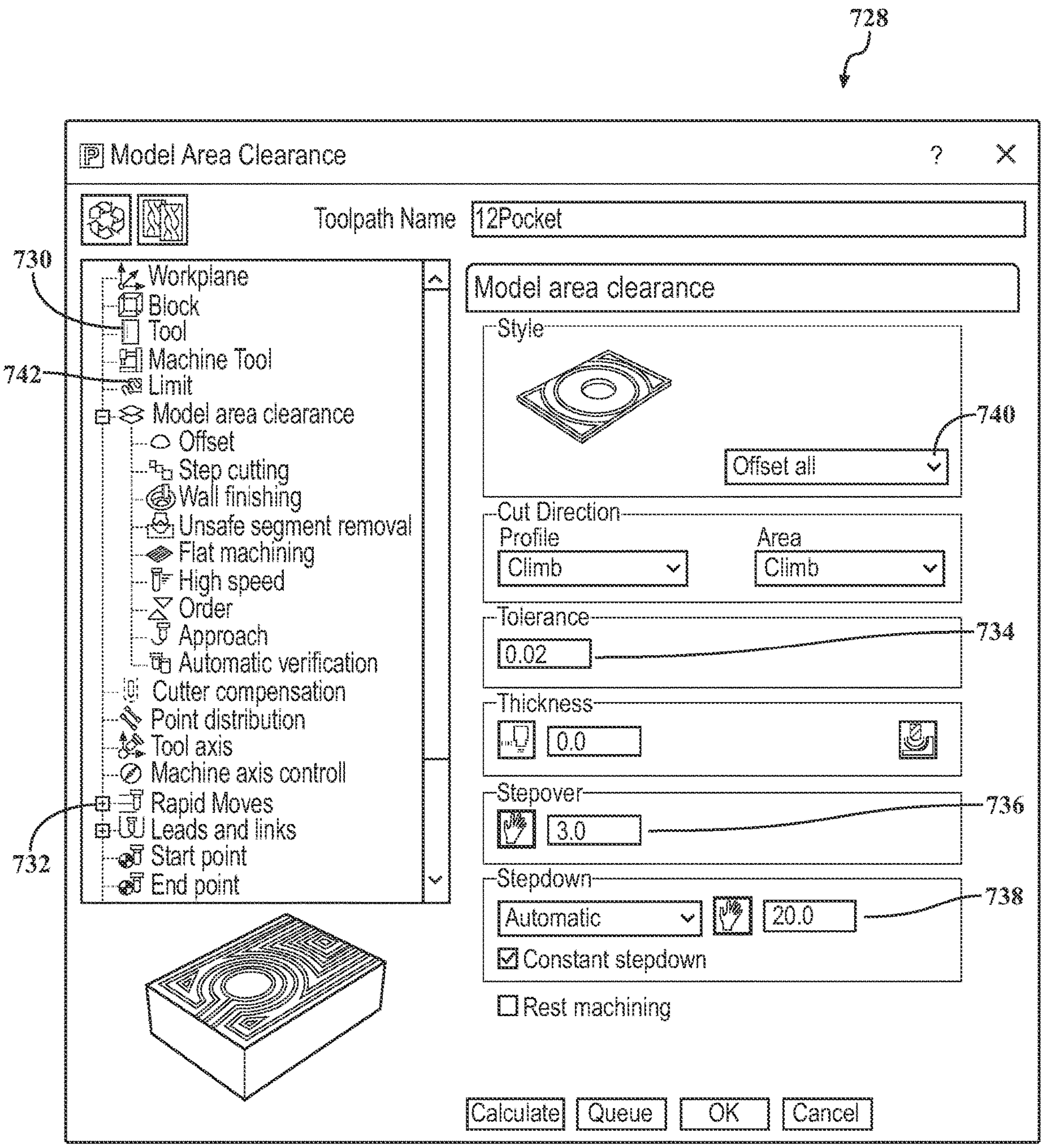
FIG. 6 shows an exemplary pocketing template.

If at step 78, the system 10 determines that all stock variables are not False, the system 10 proceeds to FIG. 2E to determine which stock variables are True and which are False. If the system 10 determines that only Z stock variables are True (step 98), the system 10 only needs to remove additional material from the top and/or bottom of the stock block, and proceeds to step 356 in FIG. 2N. If the system 10 determines that both X stock variables are True (step 100), then the system 10 needs to remove material from both the left and right sides of the stock block, and proceeds to step 270 in FIG. 2K. If the system 10 determines that X negative stock is False and the X positive stock is True (step 102), the system 10 needs to remove material from the right side of the stock block and not the left side of the stock block, and proceeds to step 188 in FIG. 2H. If the system 10 determines that the X positive Stock is False and the X negative stock is True (step 104), the system 10 needs to remove material from the left side of the stock block and not the right side of the stock block. The system 10 imports the tool templates (step 106) and determines whether any scribe lines are present (step 108). If any scribe lines are present, the system 10 runs the method to create scribing toolpaths, shown in FIGS. 9A-9B (step 110). After creating scribing toolpaths or if at step 108 no scribe line are present, the system 10 determines whether the Z negative, Y positive or Y negative stock variables are True (step 112). If the Z negative, Y positive or Y negative stock variables are True, the system 10 creates a stock model (step 114). As reflected in FIG. 5A, the stock model 722 is a digital representation of the physical material to be machined. After the system 10 creates the stock model, the system 10 caps the holes (step 116). The system 10 also caps the holes (step 116) if at step 112 the system 10 determines that the Z negative, Y positive or Y negative stock variables are not True. The system 10 determines whether machineZ is True and Z positive stock is True (step 118). machineZ is an optional flag that may be set to False to prevent material from being removed from the top of the stock block. If machineZ is True and Z positive stock is True, the system 10 activates the "Top" workplane (step 120). The system 10 then creates and activates a toolpath folder named "Top" (step 122, FIG. 2F), and creates a PowerMill block with Z minimum 1 mm below the top surface (step 124). The measurements provided throughout the detailed description are exemplary and not intended to limit the scope of the claims. A PowerMill block is a wireframe bounding box around the stock model, and includes information regarding the height, width and depth of the stock material as well as the location of the block relative to the Datum Reference Frame. The system 10 then applies a 12 mm pocketing template (step 126). The pocketing template identifies which tool to use in certain circumstances and what parameters to follow during the machining process. An exemplary pocketing template 728 is depicted in FIG. 6. The template 728 contains information such as which tool to use 730, how fast to move the tool 732, the tolerance 734, the stopover amount 736 (i.e., the amount of overlap through each pass), the stepdown amount 738 (i.e., the depth of material to remove through each pass), and what style of toolpath that should be produced 740. It also contains boundaries and information regarding which geometric space to move in 742.

Figure 5B:
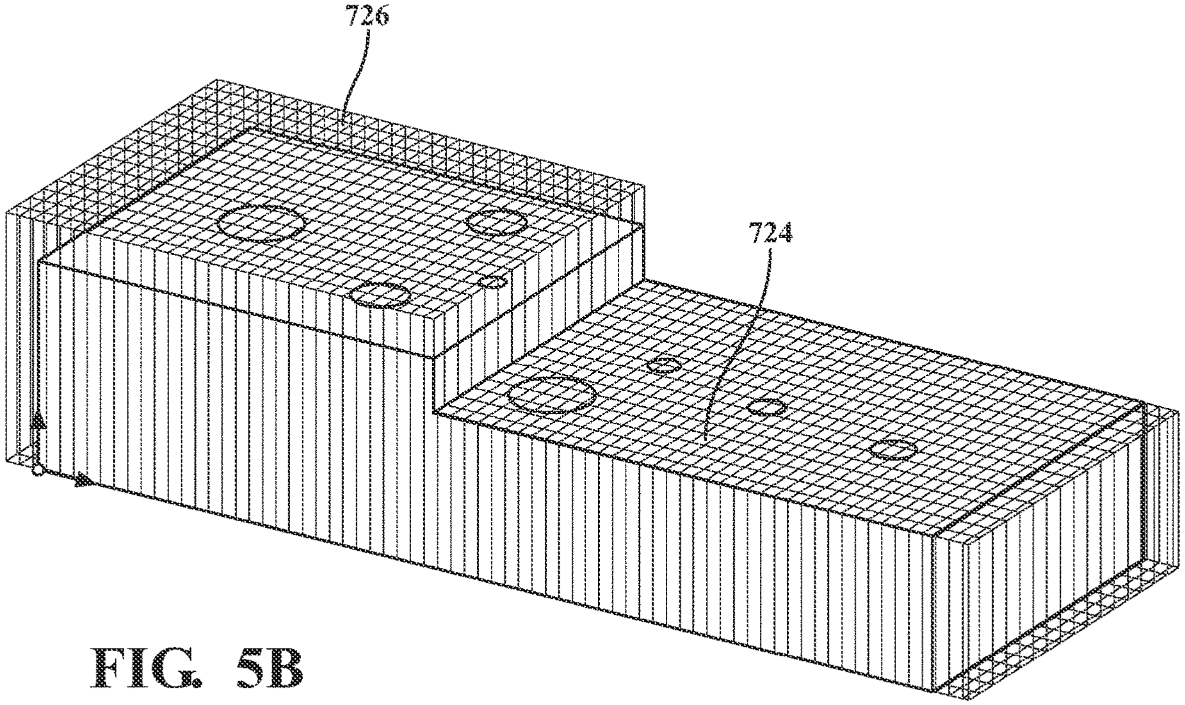

When applying the 12 mm pocketing template, PowerMill processes the information it obtains from the template and attempts to "calculate" the most efficient and safe path to process the stock based on the information from the design specifications. If an appropriate path is found, PowerMill successfully used the tools identified in the 12 mm pocketing template to remove material from the stock. The system 10 therefore updates the stock model (step 126) so that PowerMill knows where the remaining material is. For example, FIG. 5A illustrates the stock model 722 and the final detail 724 before the 12 mm pocketing template is applied. FIG. 5B illustrates the material remaining on the stock model 726 after the 12 mm pocketing template is applied.

Returning to FIG. 2F, after applying the 12 mm pocketing template, the system 10 updates the stock model (step 126) and resets leads and links to active datum (step 128).

If at step 118 in FIG. 2E, the system 10 determines that machineZ is not True or that Z positive stock is not True, the system 10 activates the "Top" workplane (step 130, FIG. 2F) and creates and activates a toolpath folder named "Top" (step 132). The system 10 then creates a PowerMill block with X negative expanded and Z expanded (step 134). For example, the system 10 may create a PowerMill block with X negative expanded 40 mm and Z −4 mm. The system 10 also creates a PowerMill block with X negative expanded 40 mm and Z −4 mm (step 134) after resetting the leads and links to the active datum in step 128 When a detail is being machined, the cutting tool quickly moves toward the stock block and slows down to machine the detail. To ensure that the cutting tool does not accidentally plunge into the detail, the PowerMill blocks are created with expansions. In this case, the block is created with the X negative expanded 40 mm, so that when the cutting tool approaches the detail from the left, the speed at which it approaches the detail begins to slow down 40 mm before it is expected to reach the detail. In addition, the PowerMill block is created with the Z expanded −4 mm so that the cutting tool goes 4 mm past the bottom of the block to ensure that no material is left dangling from the side of the detail. For example, as reflected in FIG. 7A, if the PowerMill block does not include the −4 mm expansion, the cutting tool 744 will move from the top 748 of the stock material 746 and stop when it reaches the bottom 750 of the stock material 746, which may result in a strip of material 752 dangling from the bottom 750 of the stock material 746. To ensure that the cutting tool 744 continues cutting the material after it reaches the bottom 750 of the stock material 746, the PowerMill block is created with the Z expanded −4 mm. When the cutting tool 744 cuts past the bottom 750 of the stock model 746, it creates a clean corner 754 at the bottom 750 of the stock model 746, as reflected in FIG. 7B.

Returning to FIG. 2F, after creating a PowerMill block with X negative expanded 40 mm and Z −4 mm, the system 10 applies a 12 mmZLevel template and updates the stock model (step 136). The system 10 also resets the leads and links to active datum (step 138).

Figure 2G:
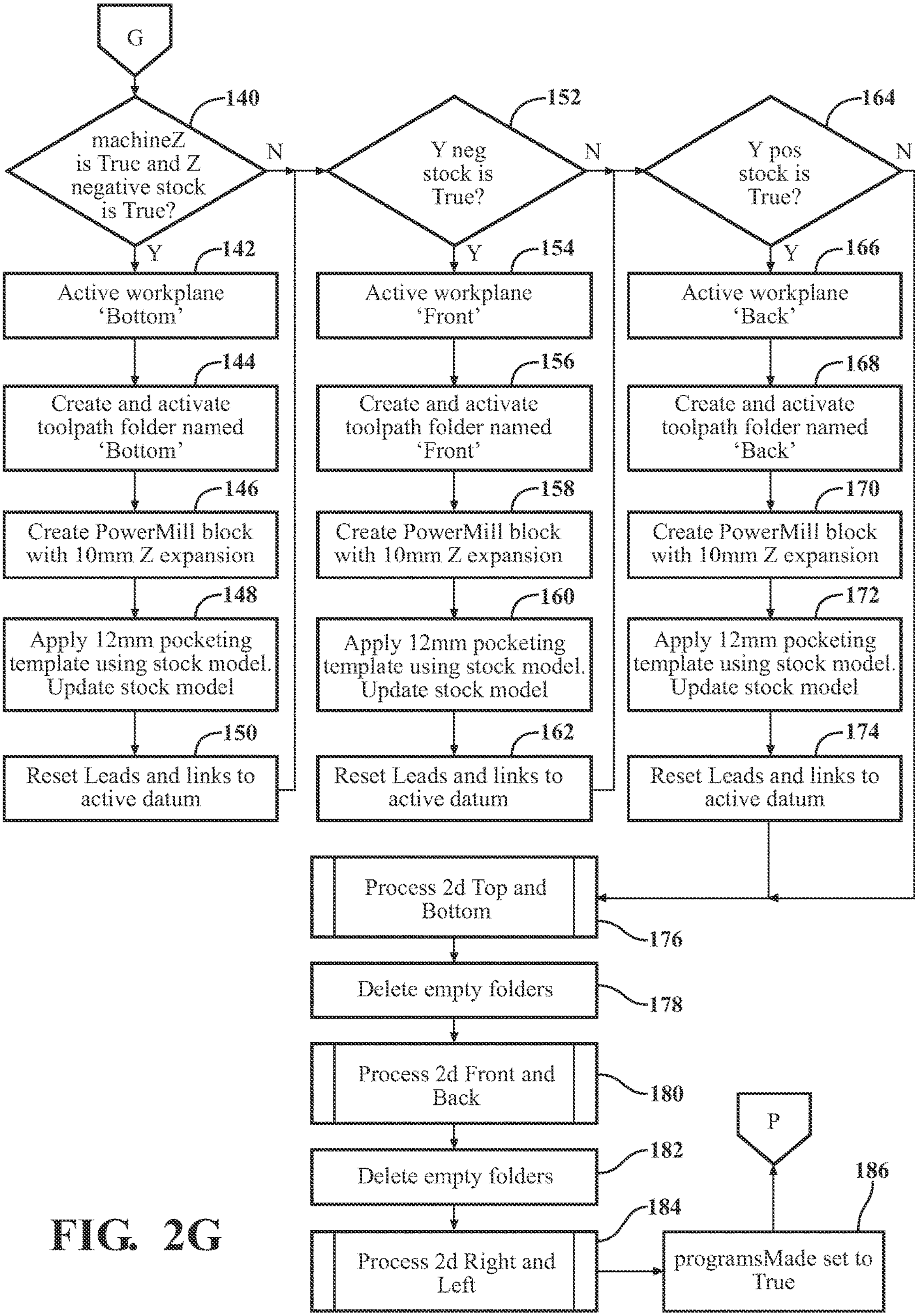
Figure 2H:
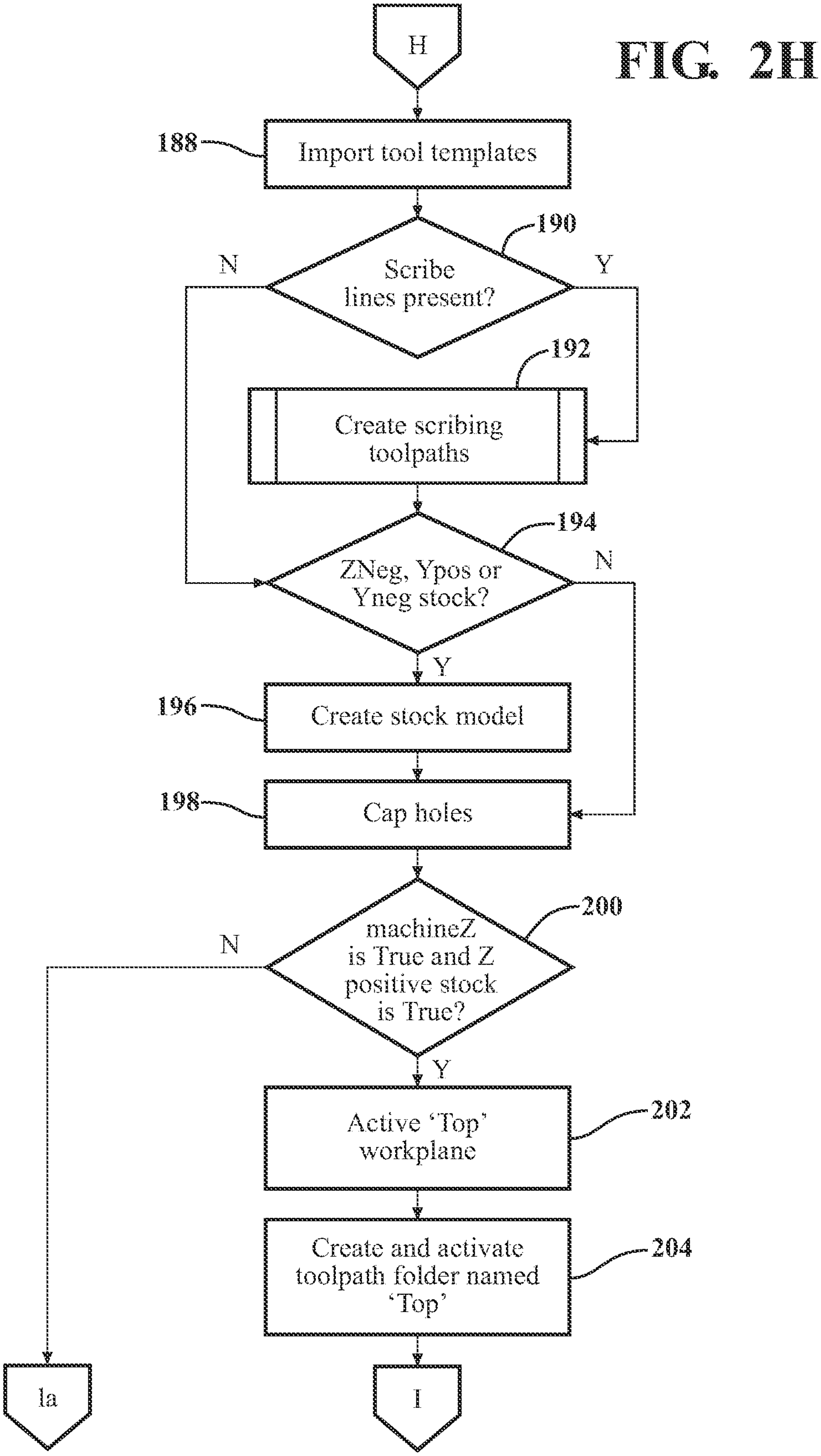

The system 10 then determines whether machineZ is True and Z negative stock is True (step 140, FIG. 2G). If machineZ is True and Z negative stock is True, the system 10 activates workplane "Bottom" (step 142), and creates and activates a toolpath folder named "Bottom" (step 144). The system 10 creates a PowerMill block with a 10 mm Z expansion (step 146), applies a 12 mm pocketing template using the stock model and updates the stock model (step 148). The system 10 then resets the leads and links to the active datum (step 150).

The system 10 then determines whether Y negative stock is True (step 152). The system 10 also determines whether Y negative stock is True (step 152) if at step 140 it determined that machineZ was False or Z negative stock was False. If Y negative stock is True, the system 10 activates workplane "Front" (step 154), and creates and activates a toolpath folder named "Front" (step 156). The system 10 creates a PowerMill block with a 10 mm Z expansion (step 158), applies a 12 mm pocketing template using the stock model and updates the stock model (step 160). The system 10 then resets the leads and links to the active datum (step 162).

The system 10 then determines whether Y positive stock is True (step 164). The system 10 also determines whether Y positive stock is True (step 164) if at step 152 it determined that Y negative stock was False. If Y positive stock is True, the system 10 activates workplane "Back" (step 166), and creates and activates a toolpath folder named "Back" (step 168). The system 10 creates a PowerMill block with a 10 mm Z expansion (step 170), applies a 12 mm pocketing template using the stock model and updates the stock model (step 172). The system 10 then resets the leads and links to the active datum (step 174).

The system 10 then runs the method to process 2d templates, shown in FIGS. 10A-10B, on the top and bottom of the stock block (step 176). The system 10 also runs the method to process 2d templates on the top and bottom of the stock block (step 176) if at step 164 it determined that Y positive stock was False. The system 10 then deletes the empty folders (step 178) and runs the method to process 2d templates on the front and back of the stock block (step 180). The system 10 again deletes the empty folders (step 182), runs the method to process 2d templates on the right and left of the stock block (step 184), and sets programsMade to True (step 186). The system 10 then proceeds to step 396 in FIG. 2P.

Returning to FIG. 2E, if at step 102, the system 10 determines that X negative stock is False and the X positive stock is True, the system 10 imports the tool templates (step 188, FIG. 2H) and determines whether any scribe lines are present (step 190). If any scribe lines are present, the system 10 runs the method to create scribing toolpaths shown in FIGS. 9A-9B (step 192). After creating scribing toolpaths or if at step 190 no scribe line were present, the system 10 determines whether Z negative, Y positive or Y negative stocks are True (step 194). If Z negative, Y positive or Y negative stocks are True, the system 10 creates a stock model (step 196) and caps the holes (step 198). The system 10 also caps the holes (step 198) if at step 194 Z negative, Y positive and Y negative stocks are not True. The system 10 determines whether machineZ is True and Z positive stock is True (step 200). If machineZ is True and Z positive stock is True, the system 10 activates the "Top" workplane (step 202), and creates and activates a toolpath folder named "Top" (step 204).

Figure 2I:
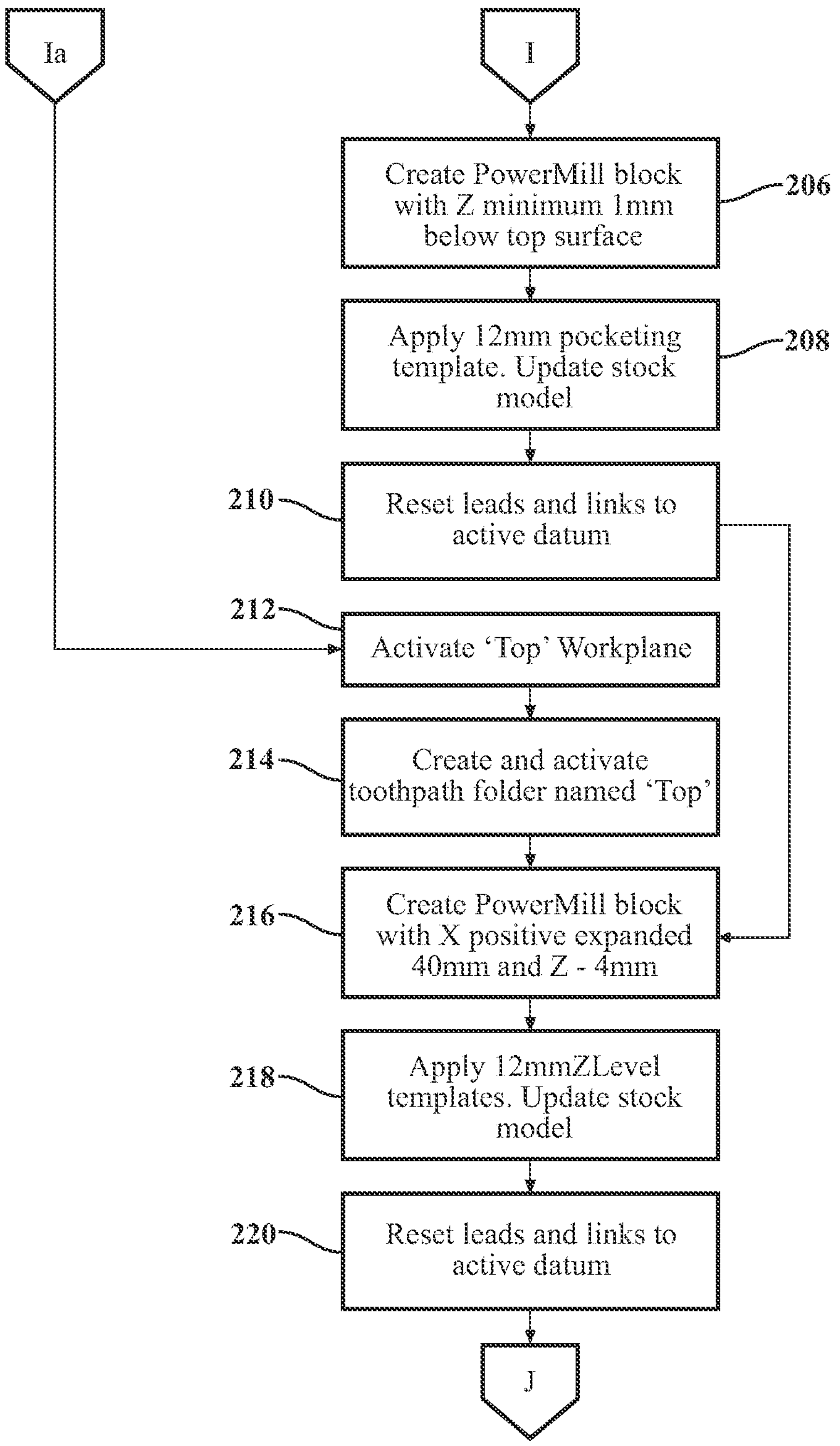

The system 10 creates a PowerMill block with Z minimum 1 mm below the top surface (step 206, FIG. 2I), applies a 12 mm pocketing template and updates the stock model (step 208). The system 10 then resets leads and links to active datum (step 210). The system 10 then creates a PowerMill block with X positive expanded 40 mm and Z −4 mm (step 216). If at step 200 in FIG. 2H, the system 10 determines that machineZ is not True or Z positive stock is not True, the system 10 activates the "Top" workplane (step 212, FIG. 2I) and creates and activates a toolpath folder named "Top" (step 214) before creating a PowerMill block with X positive expanded 40 mm and Z −4 mm (step 216). The system 10 then applies a 12 mmZLevel template and updates the stock model (step 218). The system 10 also resets the leads and links to active datum (step 220).

Figure 2J:
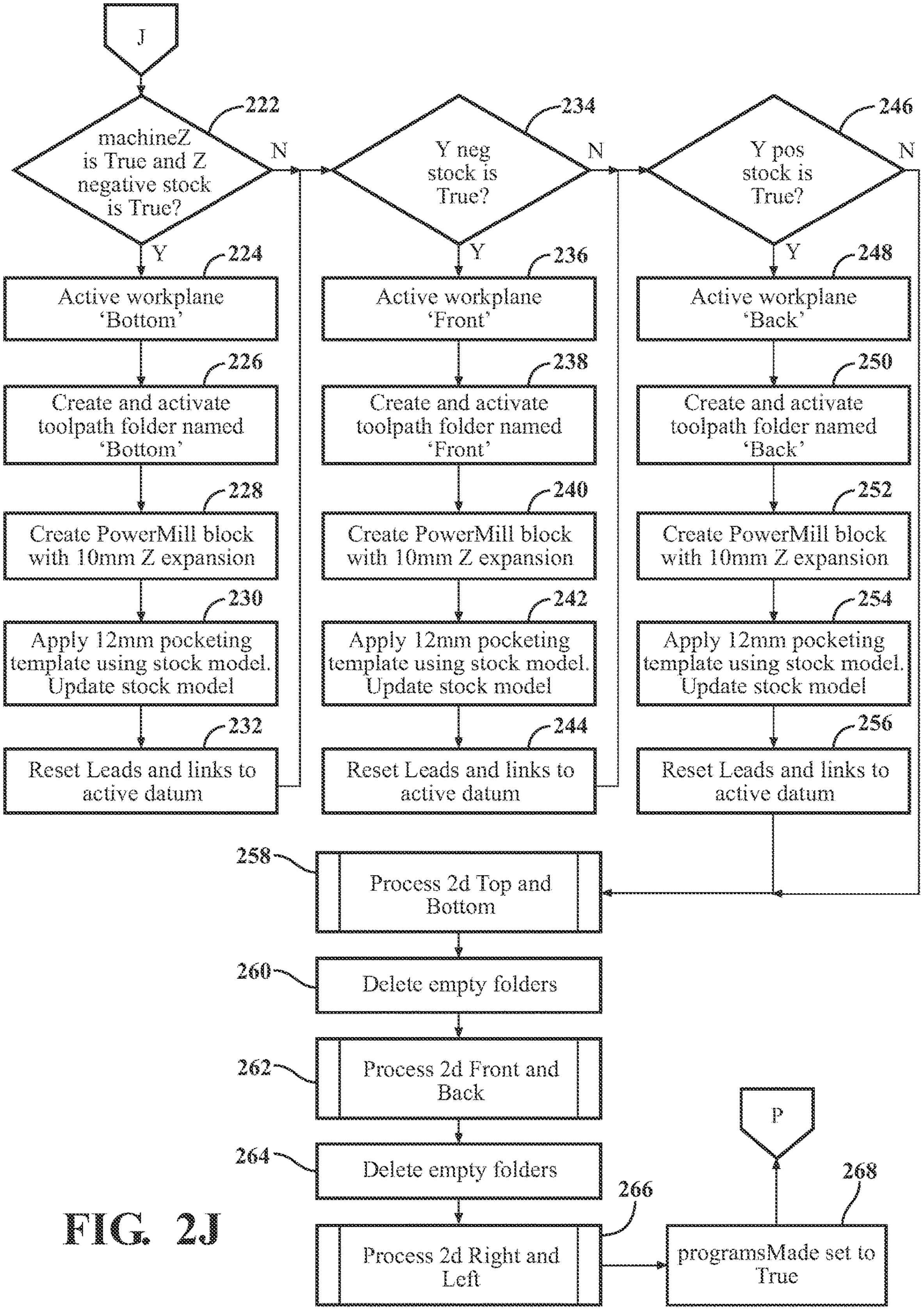
Figure 2K:
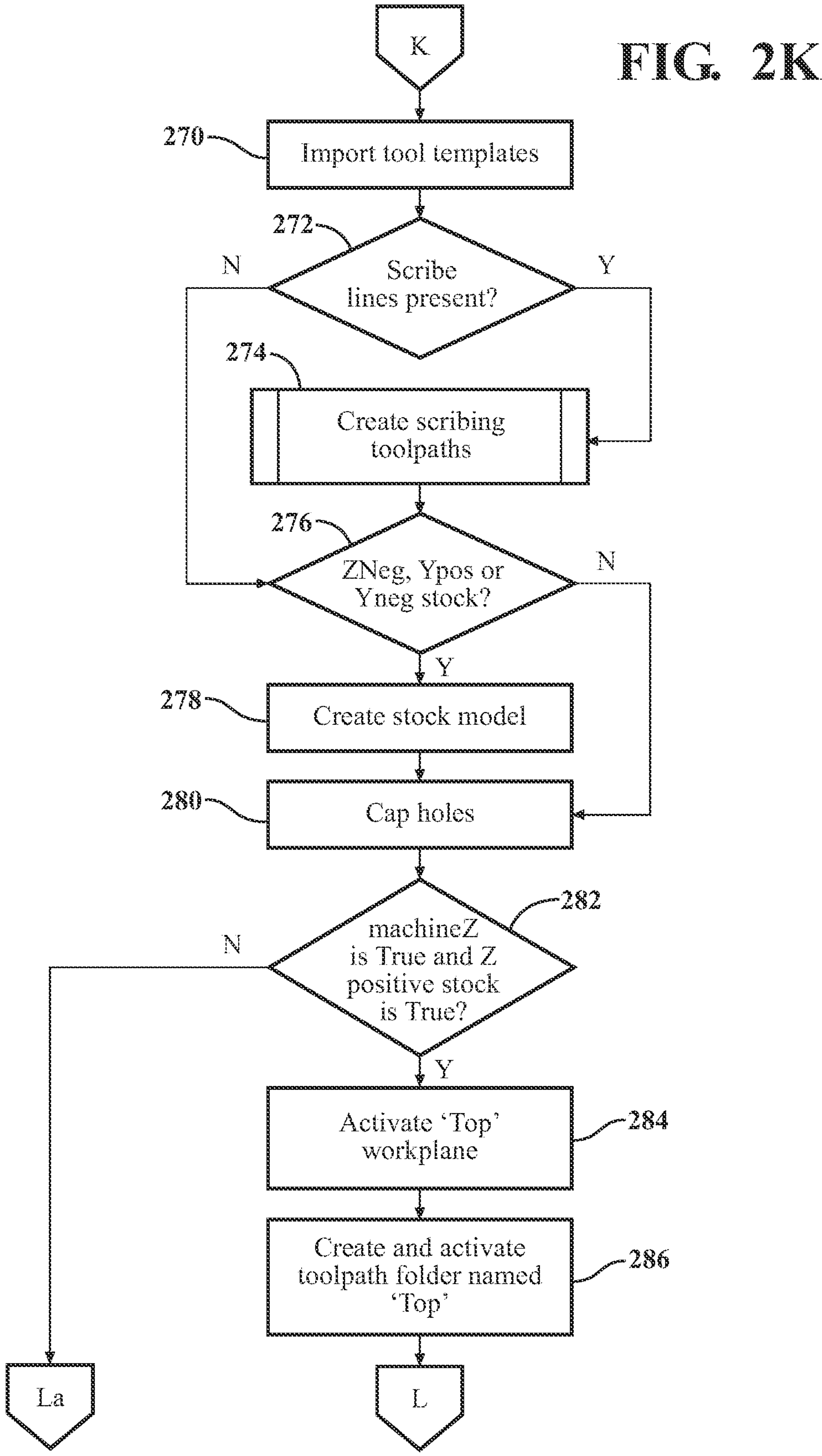

The system 10 then determines whether machineZ is True and Z negative stock is True (step 222, FIG. 2J). If machineZ is True and Z negative stock is True, the system 10 activates workplane "Bottom" (step 224), and creates and activates a toolpath folder named "Bottom" (step 226). The system 10 creates a PowerMill block with a 10 mm Z expansion (step 228), applies a 12 mm pocketing template using the stock model and updates the stock model (step 230). The system 10 then resets the leads and links to the active datum (step 232).

The system 10 then determines whether Y negative stock is True (step 234). The system 10 also determines whether Y negative stock is True (step 234) if at step 222 it determined that machineZ was False or Z negative stock was False. If Y negative stock is True, the system 10 activates workplane "Front" (step 236), and creates and activates a toolpath folder named "Front" (step 238). The system 10 creates a PowerMill block with a 10 mm Z expansion (step 240), applies a 12 mm pocketing template using the stock model and updates the stock model (step 242). The system 10 then resets the leads and links to the active datum (step 244).

The system 10 then determines whether Y positive stock is True (step 246). The system 10 also determines whether Y positive stock is True (step 246) if at step 234 it determined that Y negative stock was False. If Y positive stock is True, the system 10 activates workplane "Back" (step 248), and creates and activates a toolpath folder named "Back" (step 250). The system 10 creates a PowerMill block with a 10 mm Z expansion (step 252), applies a 12 mm pocketing template using the stock model and updates the stock model (step 254). The system 10 then resets the leads and links to the active datum (step 256).

The system 10 then runs the method to process 2d templates, shown in FIGS. 10A-10B, on the top and bottom of the stock block (step 258). The system 10 also runs the method to process 2d templates on the top and bottom of the stock block (step 258) if at step 246 it determined that Y positive stock was False. The system 10 then deletes the empty folders (step 260) and runs the method to process 2d templates on the front and back of the stock block (step 262). The system 10 again deletes the empty folders (step 264), runs the method to process 2d templates on the right and left of the stock block (step 266), and sets programsMade to True (step 268). The system 10 then proceeds to step 396 in FIG. 2P.

Returning to FIG. 2E, if at step 100, the system 10 determines that both X stock variables are True, the system 10 imports the tool templates (step 270, FIG. 2K) and determines whether any scribe lines are present (step 272). If any scribe lines are present, the system 10 runs the method to create scribing toolpaths shown in FIGS. 9A-9B (step 274). After creating scribing toolpaths or if at step 272 no scribe line were present, the system 10 determines whether Z negative, Y positive or Y negative stocks are True (step 276). If Z negative, Y positive or Y negative stocks are True, the system 10 creates a stock model (step 278) and caps the holes (step 280). The system 10 also caps the holes (step 280) if at step 276 Z negative, Y positive and Y negative stocks are not True. The system 10 determines whether machineZ is True and Z positive stock is True (step 282). If machineZ is True and Z positive stock is True, the system 10 activates the "Top" workplane (step 284), and creates and activates a toolpath folder named "Top" (step 286).

Figure 2L:
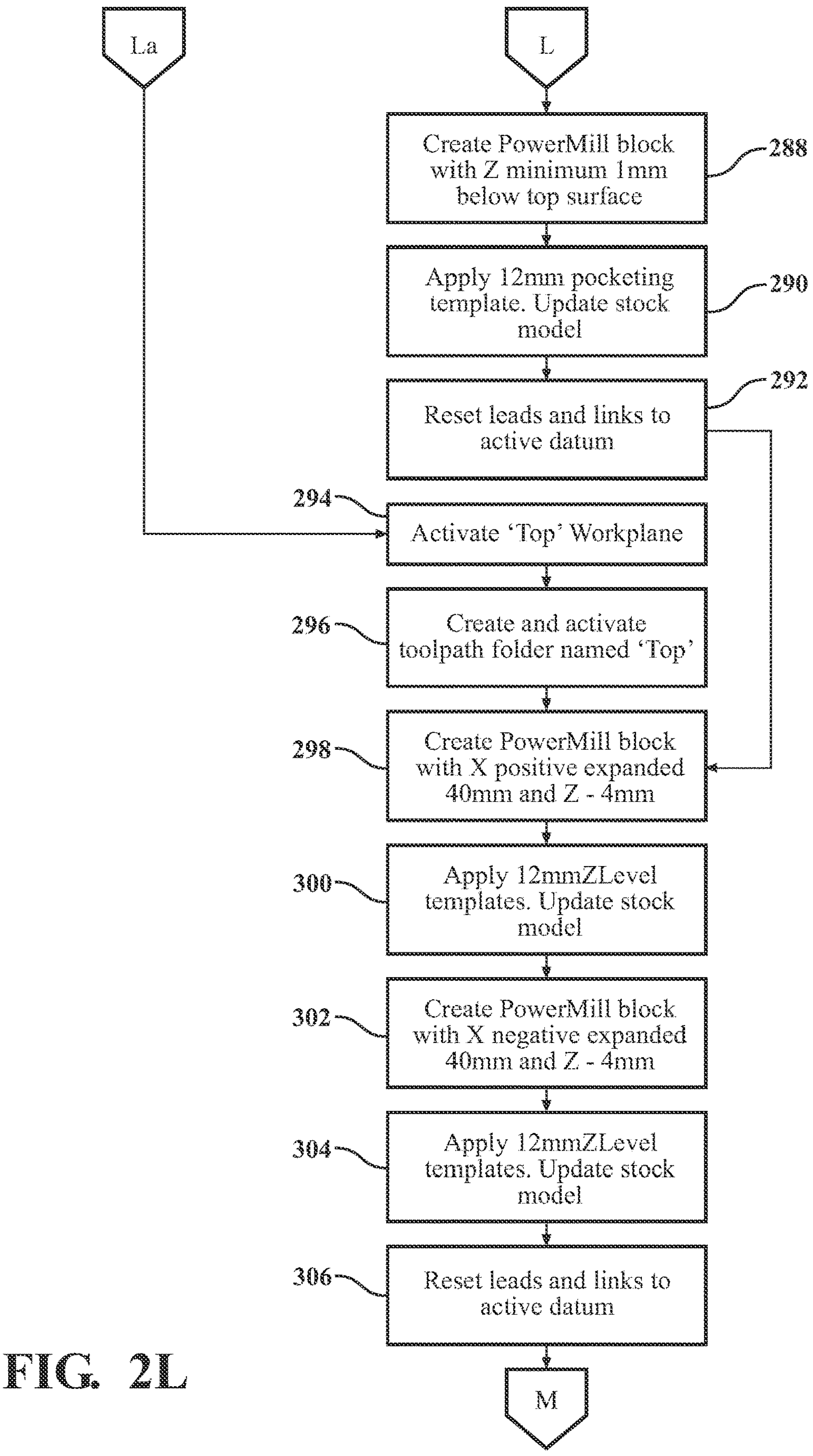

The system 10 creates a PowerMill block with Z minimum 1 mm below the top surface (step 288, FIG. 2L), applies a 12 mm pocketing template and updates the stock model (step 290). The system 10 then resets leads and links to active datum (step 292). The system 10 then creates a PowerMill block with X positive expanded 40 mm and Z −4 mm (step 298). If at step 282 in FIG. 2K, the system 10 determines that machineZ is not True or Z positive stock is not True, the system 10 activates the "Top" workplane (step 294, FIG. 2L) and creates and activates a toolpath folder named "Top" (step 296) before creating a PowerMill block with X positive expanded 40 mm and Z −4 mm (step 298). The system 10 then applies a 12 mmZLevel template and updates the stock model (step 300). The system 10 also creates a PowerMill block with X negative expanded 40 mm and Z −4 mm (step 302). The system 10 then applies a 12 mmZLevel template and updates the stock model (step 304). The system 10 also resets the leads and links to active datum (step 306).

Figure 2M:
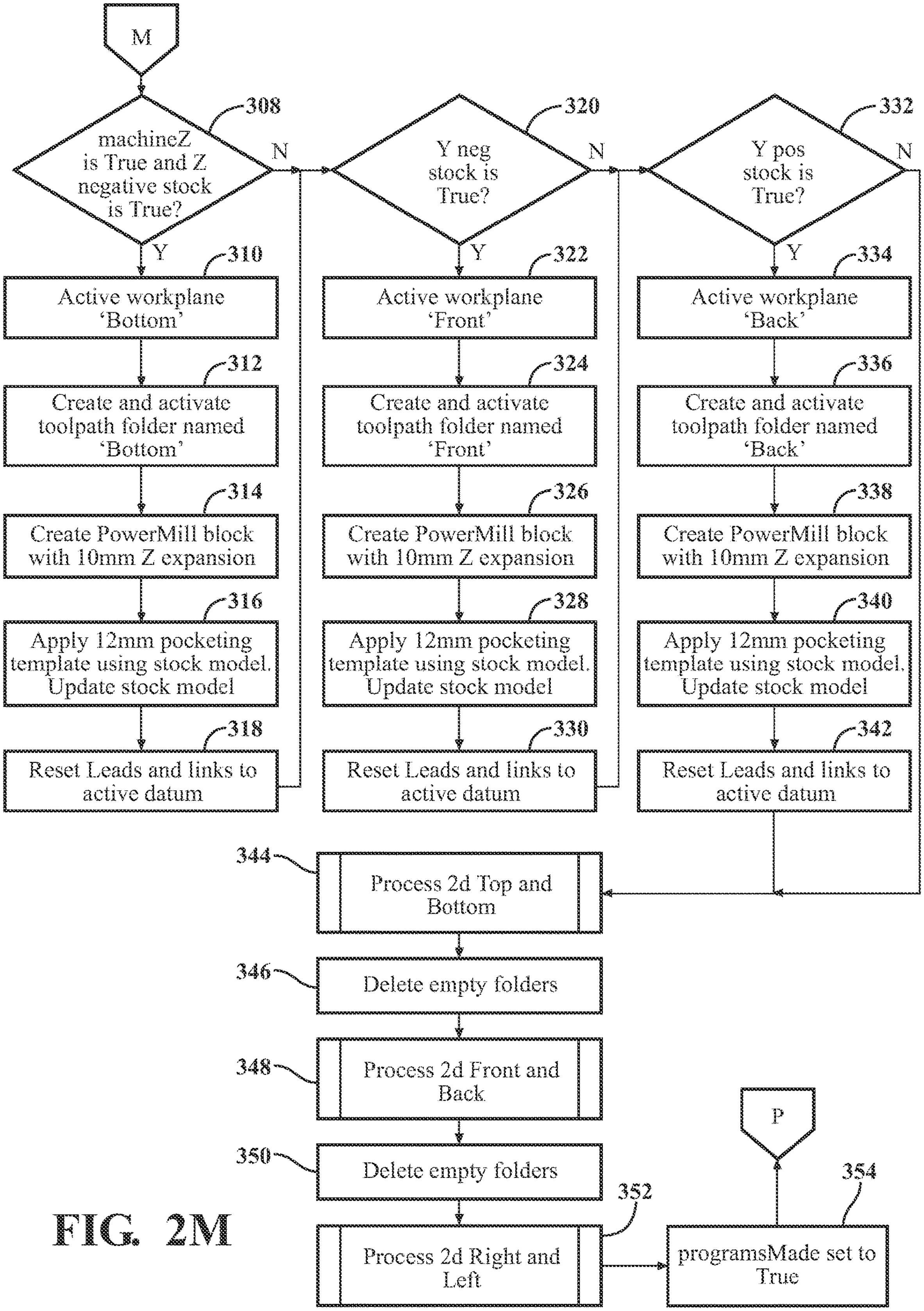
Figure 2N:
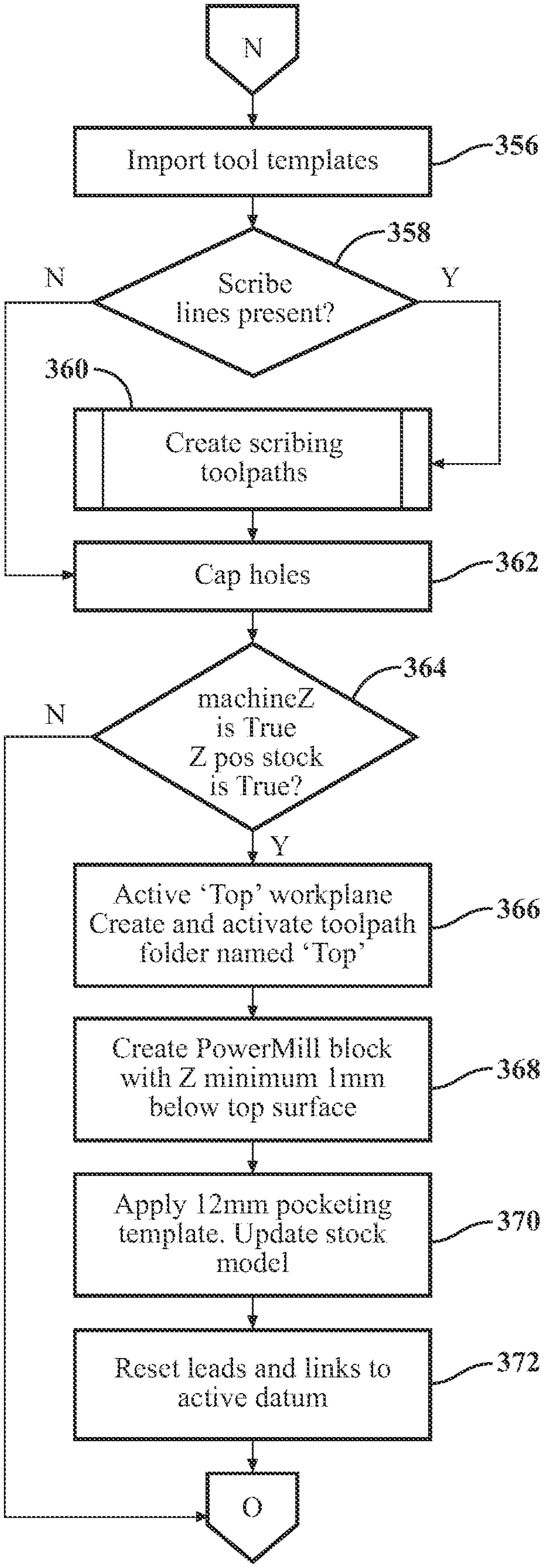

The system 10 then determines whether machineZ is True and Z negative stock is True (step 308, FIG. 2M). If machineZ is True and Z negative stock is True, the system 10 activates workplane "Bottom" (step 310), and creates and activates a toolpath folder named "Bottom" (step 312). The system 10 creates a PowerMill block with a 10 mm Z expansion (step 314), applies a 12 mm pocketing template using the stock model and updates the stock model (step 316). The system 10 then resets the leads and links to the active datum (step 318).

The system 10 then determines whether Y negative stock is True (step 320). The system 10 also determines whether Y negative stock is True (step 320) if at step 308 it determined that machineZ was False or Z negative stock was False. If Y negative stock is True, the system 10 activates workplane "Front" (step 322), and creates and activates a toolpath folder named "Front" (step 324). The system 10 creates a PowerMill block with a 10 mm Z expansion (step 326), applies a 12 mm pocketing template using the stock model and updates the stock model (step 328). The system 10 then resets the leads and links to the active datum (step 330).

The system 10 then determines whether Y positive stock is True (step 332). The system 10 also determines whether Y positive stock is True (step 332) if at step 320 it determined that Y negative stock was False. If Y positive stock is True, the system 10 activates workplane "Back" (step 334), and creates and activates a toolpath folder named "Back" (step 336). The system 10 creates a PowerMill block with a 10 mm Z expansion (step 338), applies a 12 mm pocketing template using the stock model and updates the stock model (step 340). The system 10 then resets the leads and links to the active datum (step 342).

The system 10 then runs the method to process 2d templates, shown in FIGS. 10A-10B, on the top and bottom of the stock block (step 344). The system 10 also runs the method to process 2d templates on the top and bottom of the stock block (step 344) if at step 332 it determined that Y positive stock was False. The system 10 then deletes the empty folders (step 346) and runs the method to process 2d templates on the front and back of the stock block (step 348). The system 10 again deletes the empty folders (step 350), runs the method to process 2d templates on the right and left of the stock block (step 352), and sets programsMade to True (step 354). The system 10 then proceeds to step 396 in FIG. 2P.

Returning to FIG. 2E, if at step 98, the system 10 determines that only Z stock variables are True, the system 10 imports the tool templates (step 356, FIG. 2N) and determines whether any scribe lines are present (step 358). If any scribe lines are present, the system 10 runs the method to create scribing toolpaths shown in FIGS. 9A-9B (step 360). After creating scribing toolpaths or if at step 358 no scribe line were present, the system 10 caps the holes (step 362). The system 10 determines whether machineZ is True and Z positive stock is True (step 364). If machineZ is True and Z positive stock is True, the system 10 activates the "Top" workplane, and creates and activates a toolpath folder named "Top" (step 366). The system 10 creates a PowerMill block with Z minimum 1 mm below the top surface (step 368), applies a 12 mm pocketing template and updates the stock model (step 370). The system 10 then resets leads and links to active datum (step 372).

Figure 2O:
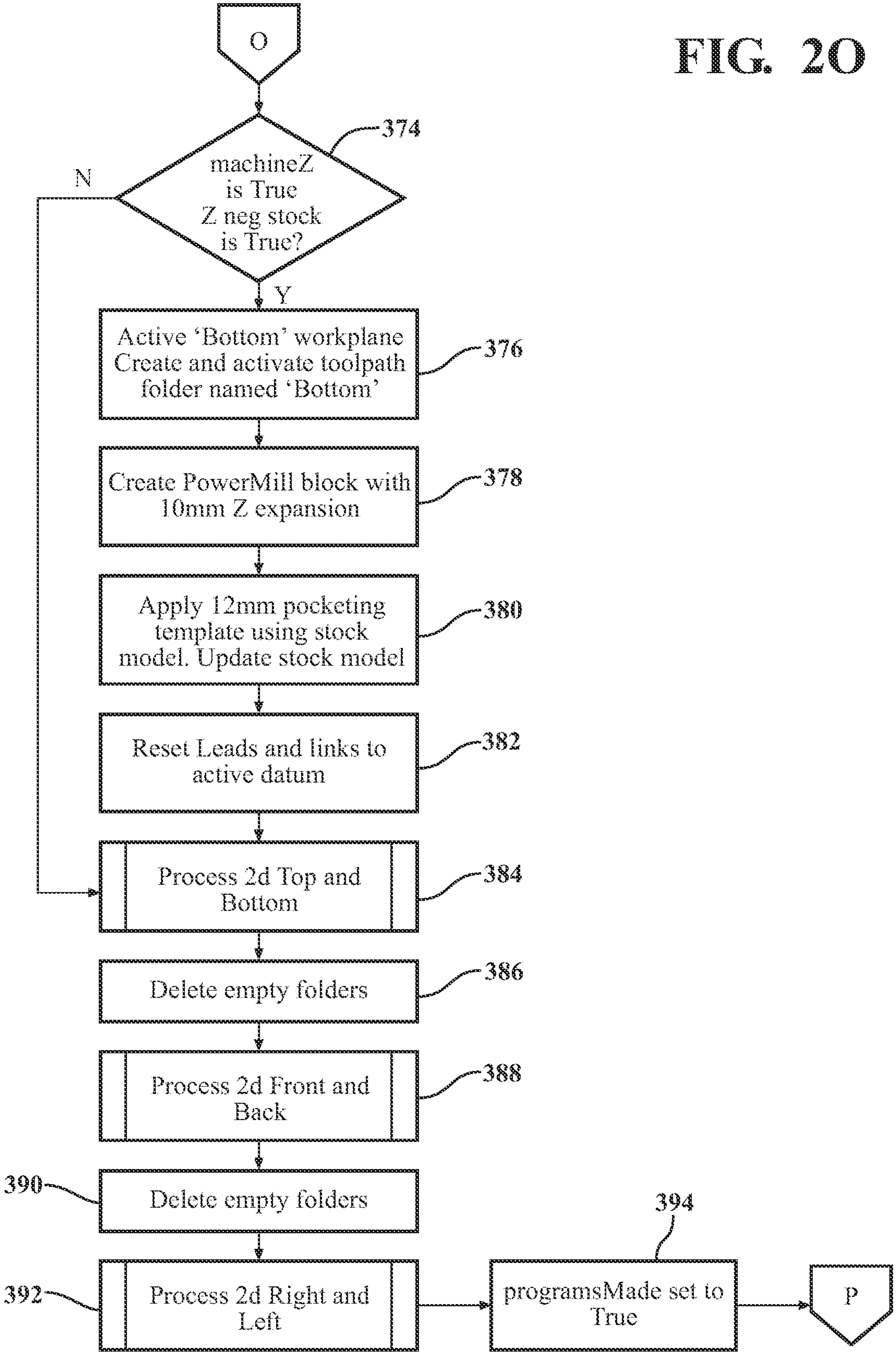
Figure 2P:
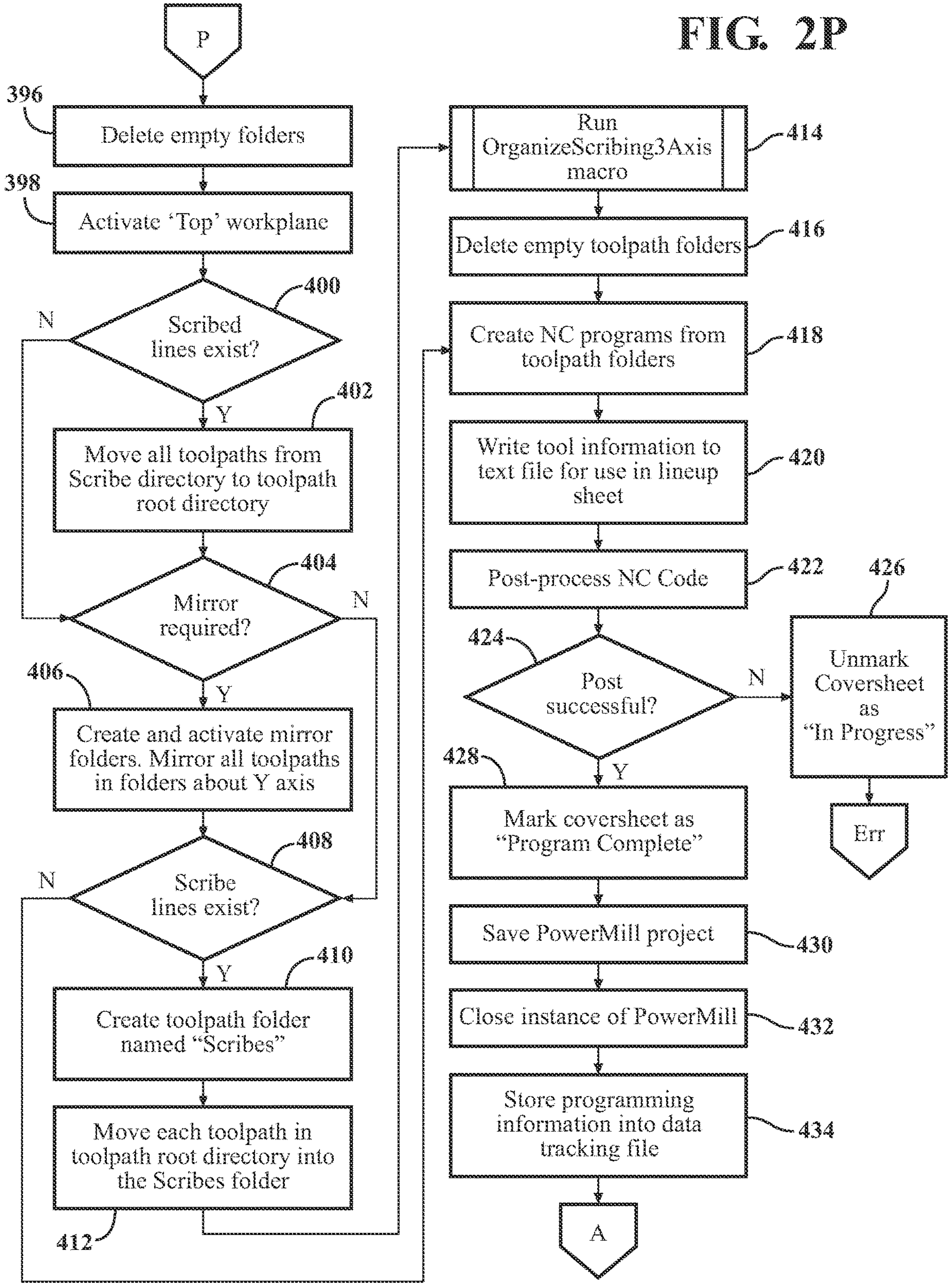

The system 10 then determines whether machineZ is True and Z negative stock is True (step 374, FIG. 2O). The system 10 also determines whether machineZ is True and Z negative stock is True (step 374) if at step 364 (FIG. 2N) it determined that machineZ was False or Z positive stock was False. If machineZ is True and Z negative stock is True, the system 10 activates workplane "Bottom," and creates and activates a toolpath folder named "Bottom" (step 376). The system 10 creates a PowerMill block with a 10 mm Z expansion (step 378), applies a 12 mm pocketing template using the stock model and updates the stock model (step 380). The system 10 then resets the leads and links to the active datum (step 382).

The system 10 then runs the method to process 2d templates, shown in FIGS. 10A-10B, on the top and bottom of the stock block (step 384). The system 10 also runs the method to process 2d templates on the top and bottom of the stock block (step 384) if at step 374 it determined that machineZ was False or Z negative stock was False. The system 10 then deletes the empty folders (step 386) and runs the method to process 2d templates on the front and back of the stock block (step 388). The system 10 again deletes the empty folders (step 390), runs the method to process 2d templates on the right and left of the stock block (step 392), and sets programsMade to True (step 394). The system 10 then proceeds to step 396 in FIG. 2P.

Figure 12:
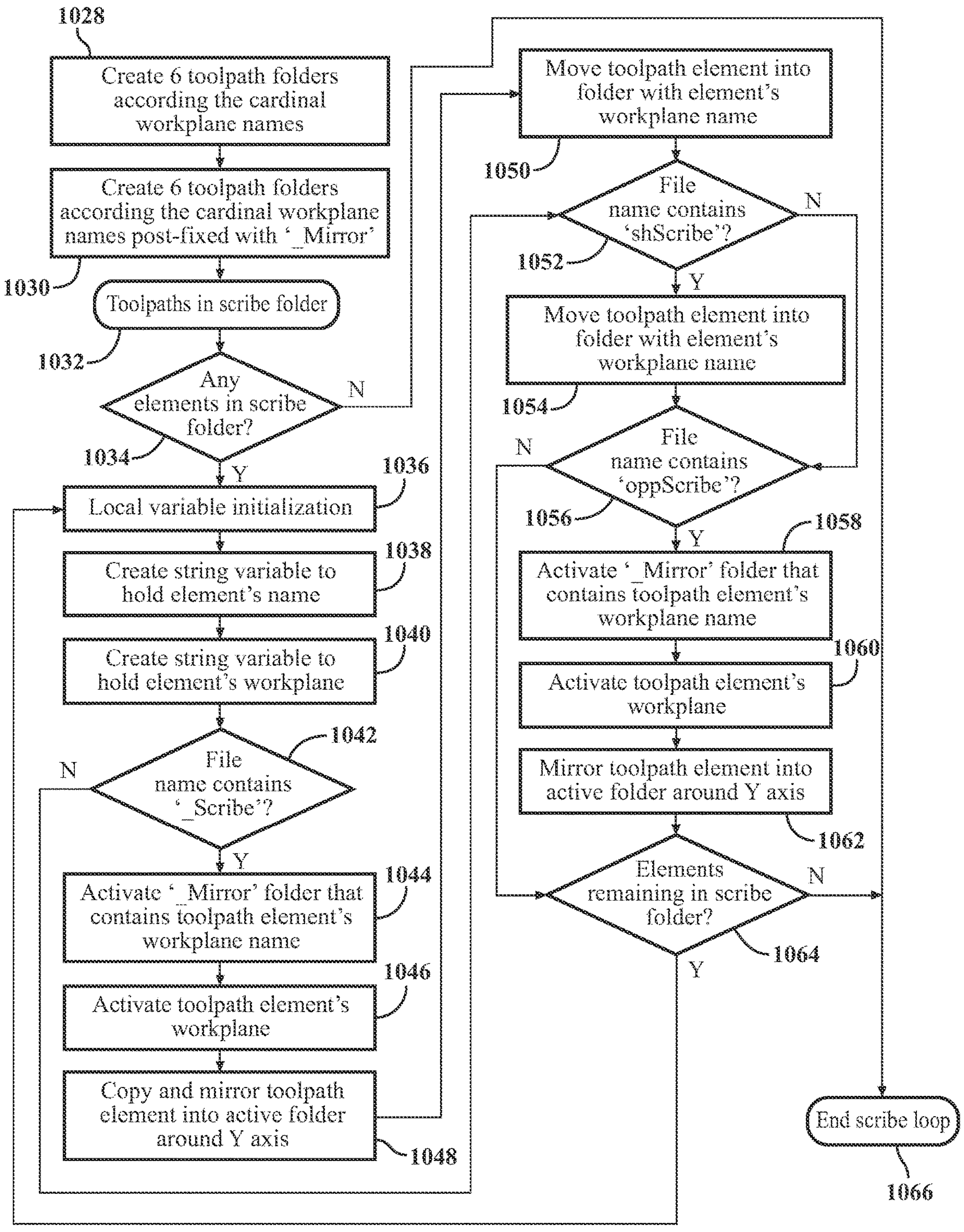
FIG. 12 shows an exemplary macro for organizing the scribing toolpaths.

After setting the programsMade to True in steps 96 (FIG. 2D), 186 (FIG. 2G), 268 (FIG. 2J), 354 (FIG. 2M) and 394 (FIG. 2O), the system 10 deletes the empty folders (step 396, FIG. 2P) and activates the "Top" workplane (step 398). The system 10 then determines whether scribed lines exist (step 400). If scribed lines exist, the system 10 moves all toolpaths from the Scribe directory to the toolpath root directory (step 402). The system 10 then determines whether a mirror image of the detail is required (step 404). The system 10 also determines whether a mirror image is required (step 404) if at step 400, scribe lines did not exist. If a mirror image is required, the system 10 creates and activates mirror folders, and mirrors all toolpaths in the folders about the Y axis (step 406). The system 10 then determines whether scribe lines exist (step 408). The system 10 also determines whether scribe lines exist (step 408) if at step 404, no mirror image was required. If scribe lines exist, the system 10 creates a toolpath folder named "Scribes" (step 410), and moves each toolpath in the toolpath root directory into the Scribes folder (step 412). The system 10 then runs an OrganizeScribing3Axis macro (step 414). The OrganizeScribing3Axis macro is illustrated in FIG. 12. The system 10 then deletes empty toolpath folders (step 416), and creates Numeric Control (NC) programs from the toolpath folders (step 418). The system 10 writes tool information to a text file for use in the lineup sheet (step 420). The system 10 then post-processes the NC code (step 422). Post processing compiles the NC code into G code, which the CNC machine can understand. The system 10 then determines whether the post processing was successful (step 424). If the post processing was successful, the system 10 marks the cover sheet as "Program Complete" (step 428), which notifies the operator on the shop floor that the detail is ready to be machined. The system 10 then saves the PowerMill project (step 430) and closes the instance of PowerMill (step 432). The system 10 also stores the programming information into a data tracking file (step 434). The data tracking file tracks metrics related to each programming job, including the amount of time the system 10 took to write the code. The system 10 then returns to step 24 in FIG. 2A and waits for the next text file. If, at step 424, the system 10 determines that the post processing was not successful, the system 10 unmarks the cover sheet as "In Progress" (step 426) and generates an error report (step 32, FIG. 2A) before returning to step 24 to wait for the next text file.

Figure 2Q:
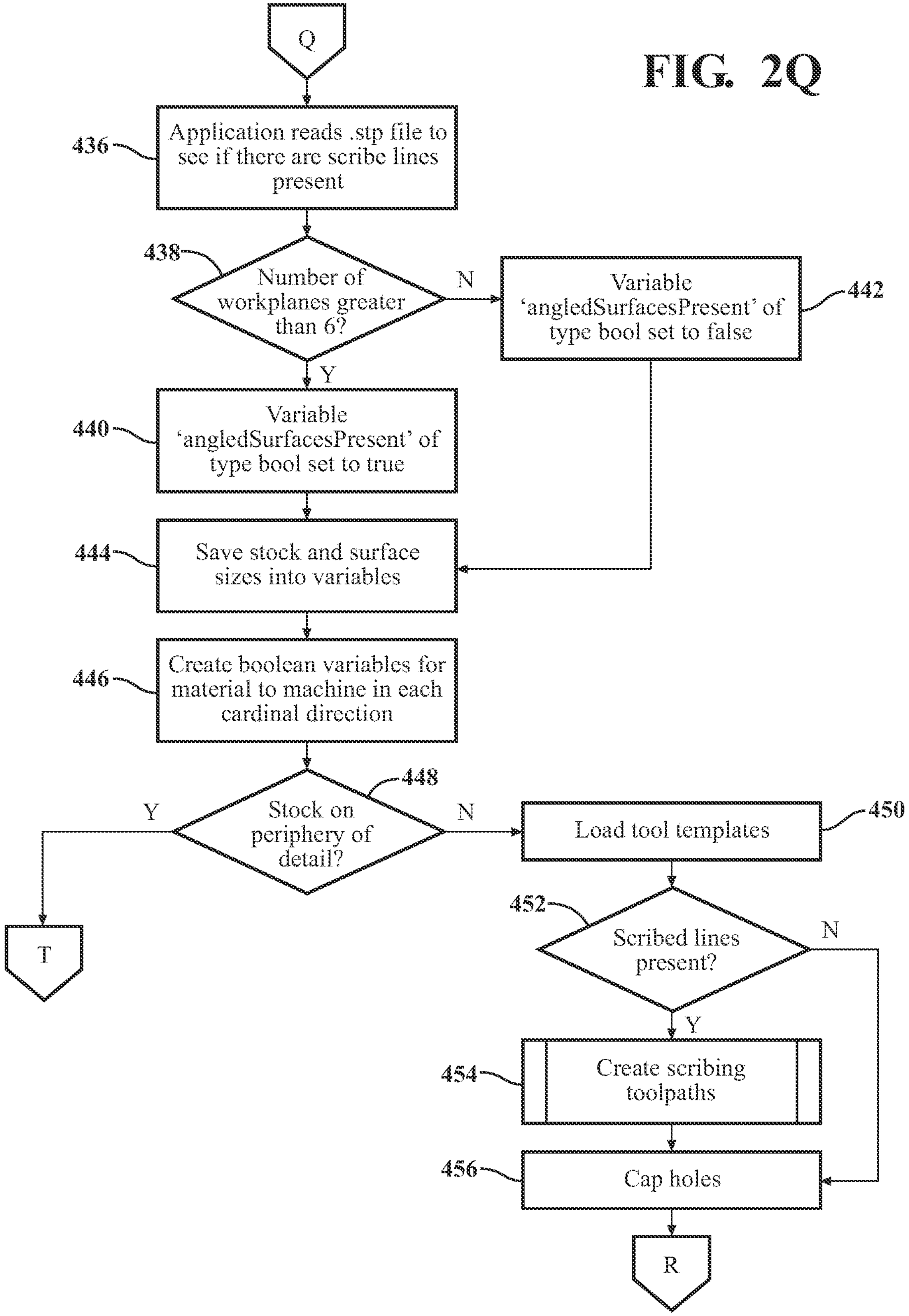
Figure 2R:
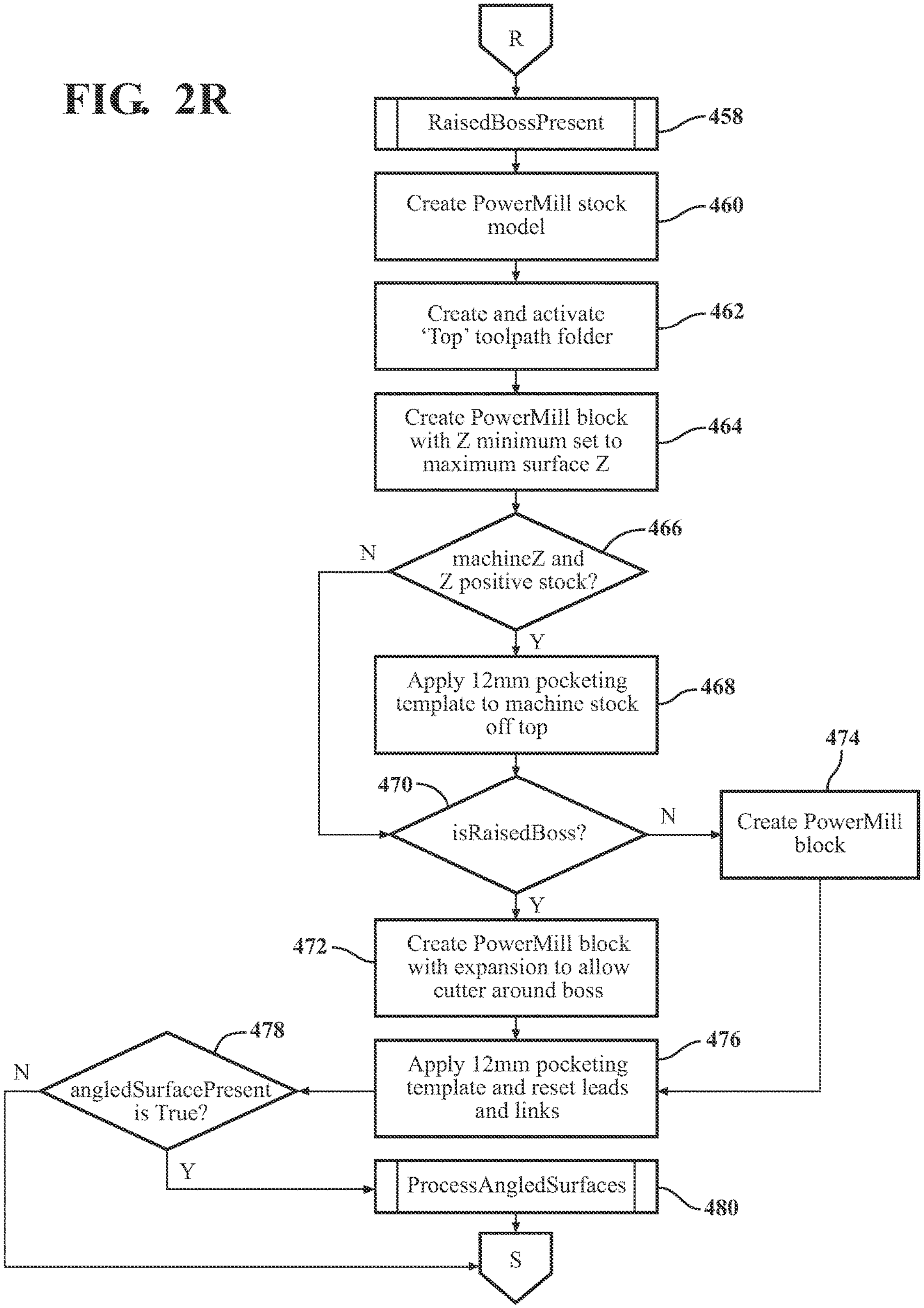
Figure 2S:
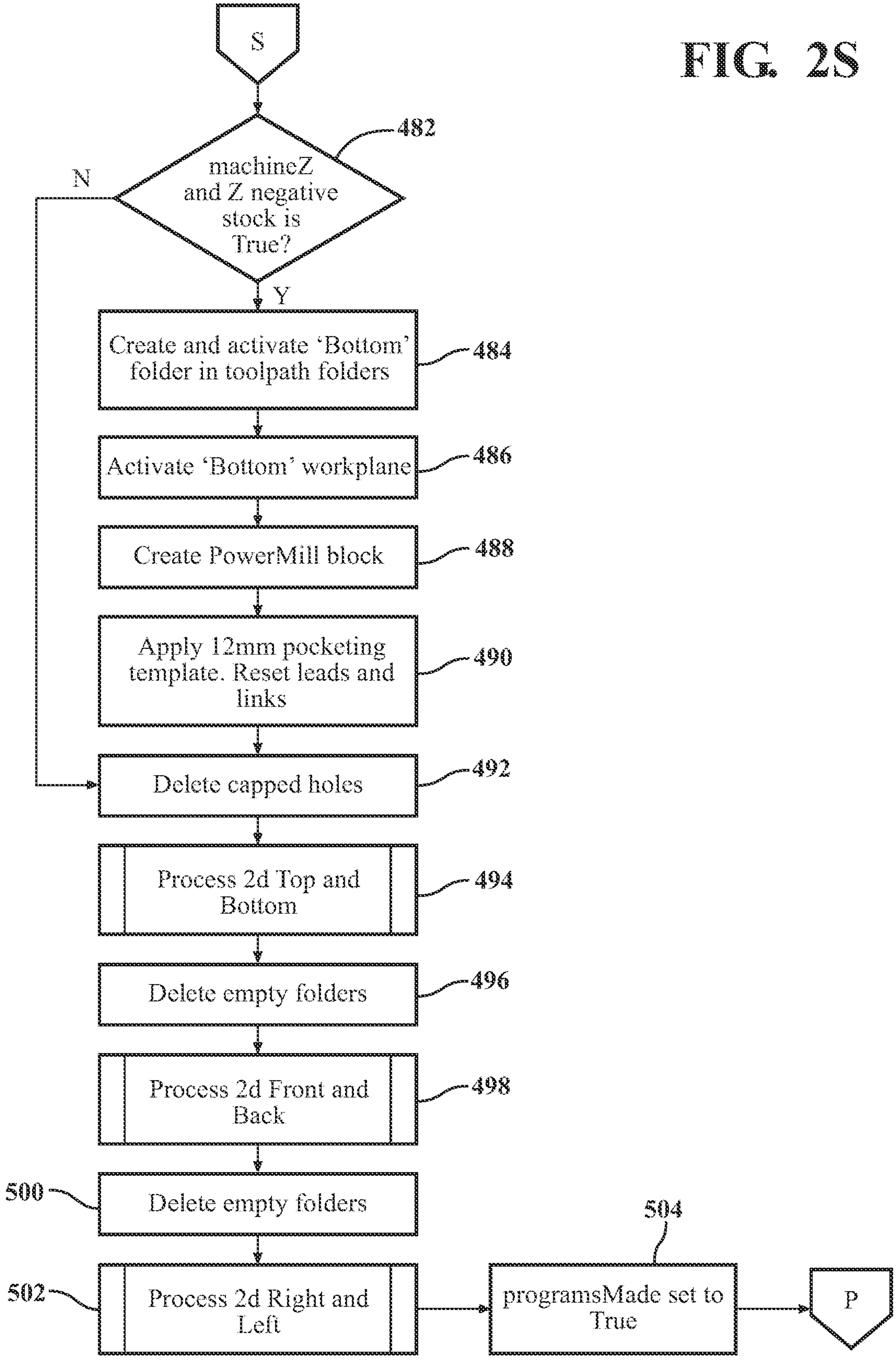
Figure 2T:
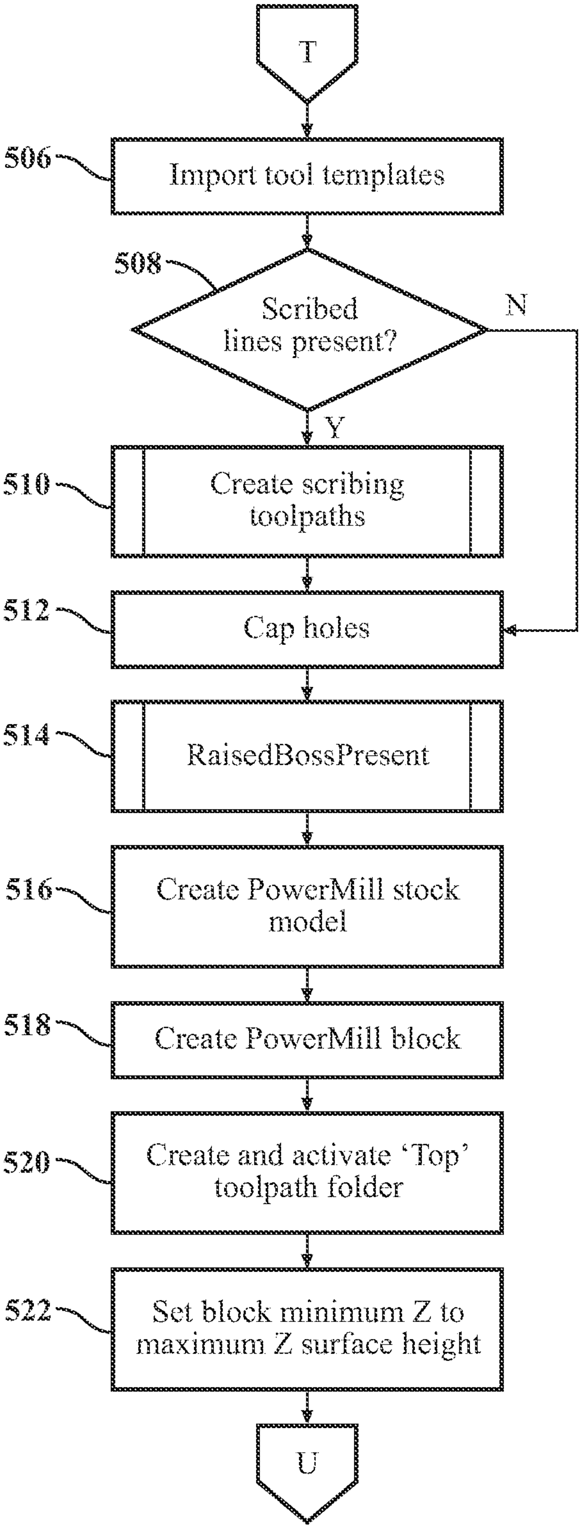
Figure 13:
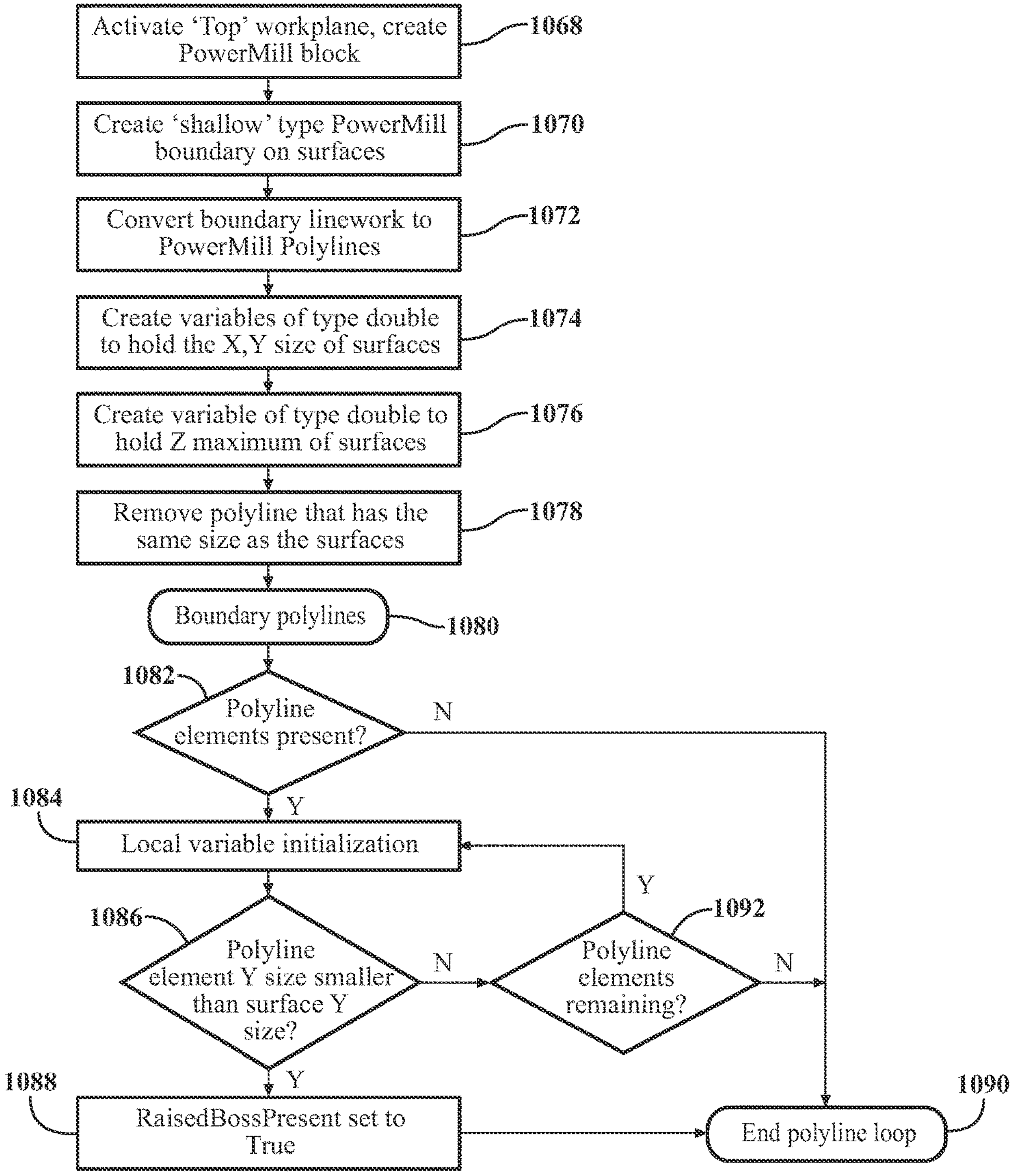
FIG. 13 shows an exemplary method to determine whether a raised boss is present on the detail.
Figure 14:
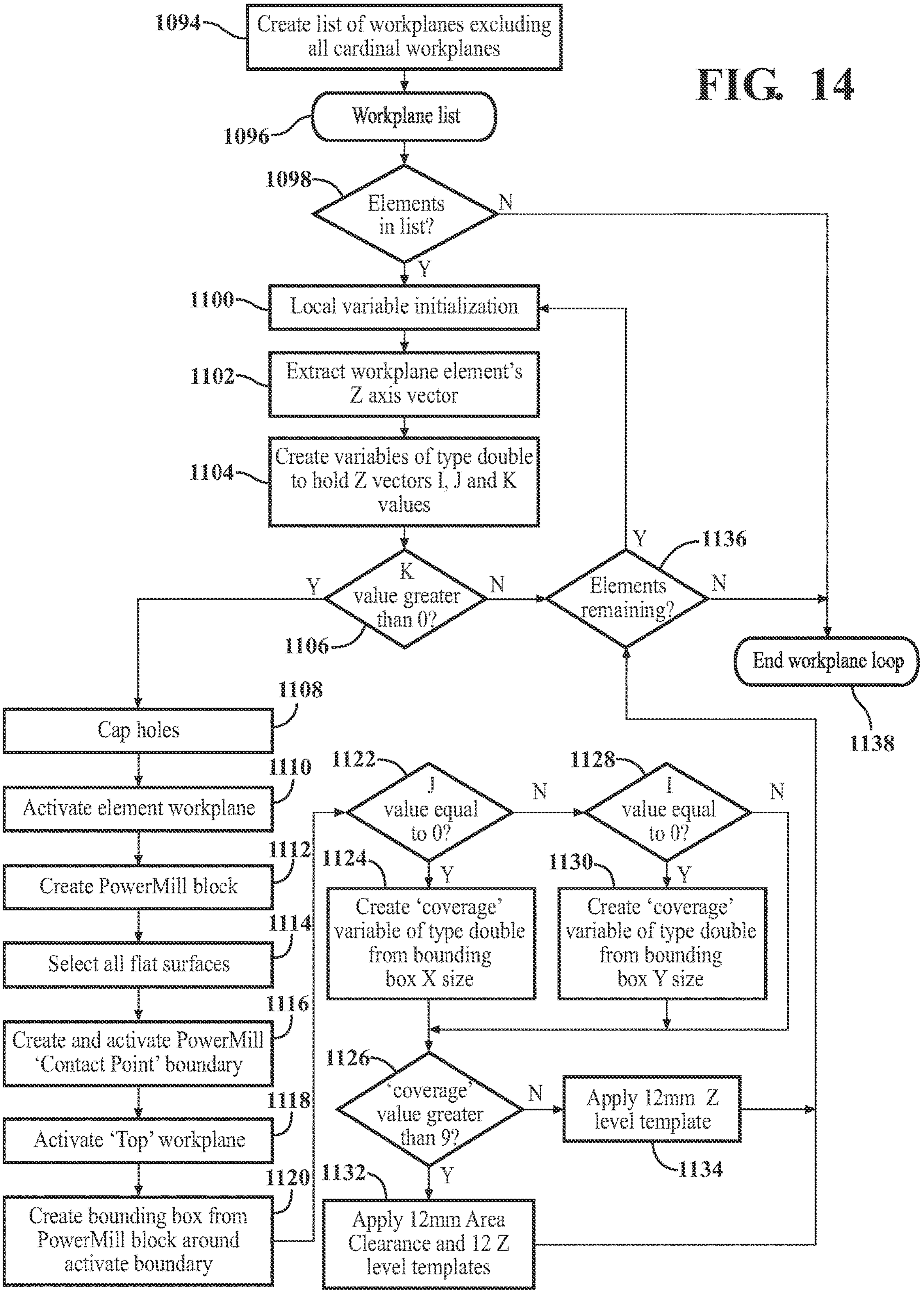
FIG. 14 shows an exemplary method to process angled surfaces.

Returning to FIG. 2C, if at step 64, the system 10 creates a rating of 1 (step 68), the system 10 reads the .stp file to see if there are any scribe lines present (step 436, FIG. 2Q). The system 10 then determines whether the number of workplanes is greater than 6 (step 438). If the number of workplanes is greater than 6, the system 10 sets the Boolean variable angledSurfacesPresent to True (step 440). Otherwise, the system 10 sets angledSurfacesPresent to False (step 442). The system 10 then saves the stock and surface sizes into variables (step 444), and creates Boolean variables for the material to machine in each cardinal direction (step 446). The system 10 determines whether there is stock on the periphery of the detail (step 448). If there is stock on the periphery of the detail, the system 10 proceeds to step 506 in FIG. 2T. Otherwise, the system 10 loads the tool templates (step 450) and determines whether any scribed lines are present (step 452). If scribed lines are present, the system 10 runs the method to create scribing toolpaths, shown in FIGS. 9A-9B (step 454). The system 10 then caps the holes (step 456). The system 10 also caps the holes (step 456) if at step 452 it determines that there are no scribed lines present. The system 10 then runs a RaisedBossPresent method (step 458). The RaisedBossPresent method is illustrated in FIG. 13. The system 10 creates a PowerMill stock model (step 460), creates and activates a "Top" toolpath folder (step 462), and creates a PowerMill block with Z minimum set to maximum surface Z (step 464). The system 10 determines whether machineZ is True and Z positive stock is True (step 466). If machineZ is True and Z positive stock is True, the system 10 applies a 12 mm pocketing template to the machine stock off the top of the stock model (step 468), and determines whether RaisedBoss is True (step 470). The system 10 also determines whether RaisedBoss is True (step 470) if at step 466, it determines that machineZ is not True or Z positive stock is not True. If RaisedBoss is True, the system 10 creates a PowerMill block with expansion to allow the cutter around the boss (step 472). Otherwise, the system 10 simply creates a PowerMill block (step 474). The system 10 applies a 12 mm pocketing template and resets the leads and links (step 476), and determines whether angledSurfacePresent is True (step 478). If angledSurfacePresent is True, the system 10 runs a ProcessAngledSurfaces method (step 480). The ProcessAngledSurfaces method is illustrated in FIG. 14. The system 10 then determines whether machineZ and Z negative stock are both True (step 482, FIG. 2S). The system 10 also determines whether machineZ and Z negative stock are both True (step 482) if at step 478 angledSurfacePresent is False. If machineZ and Z negative stock are both True, the system 10 creates and activates the "Bottom" folder in the toolpath folders (step 484), and activates the "Bottom" workplane (step 486). The system 10 creates a PowerMill block (step 488). The system 10 then applies a 12 mm pocketing template, and resets the leads and links (step 490). The system 10 then deletes the capped holes (step 492). The system 10 also deletes the capped holes (step 492) if at step 482 it determines that either machineZ or Z negative stock is False. The system 10 then runs the method to process 2d templates, shown in FIGS. 10A-10B, on the top and bottom of the stock block (step 494). The system 10 deletes the empty folders (step 496) and runs the method to process 2d templates on the front and back of the stock block (step 498). The system 10 again deletes the empty folders (step 500), runs the method to process 2d templates on the right and left of the stock block (step 502), and sets programsMade to True (step 504). The system 10 then proceeds to step 396 in FIG. 2P.

Figure 2U:
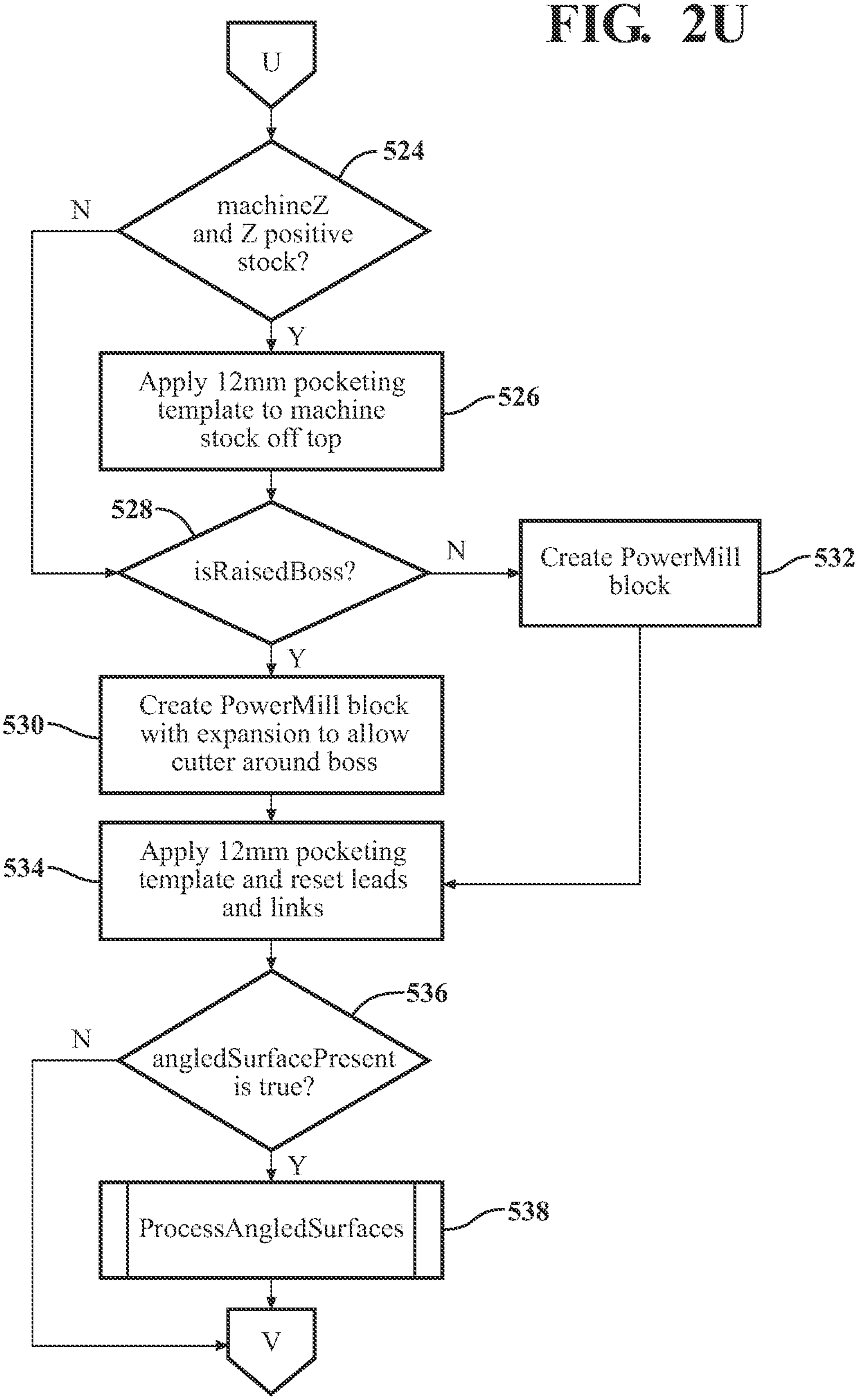
Figure 2V:
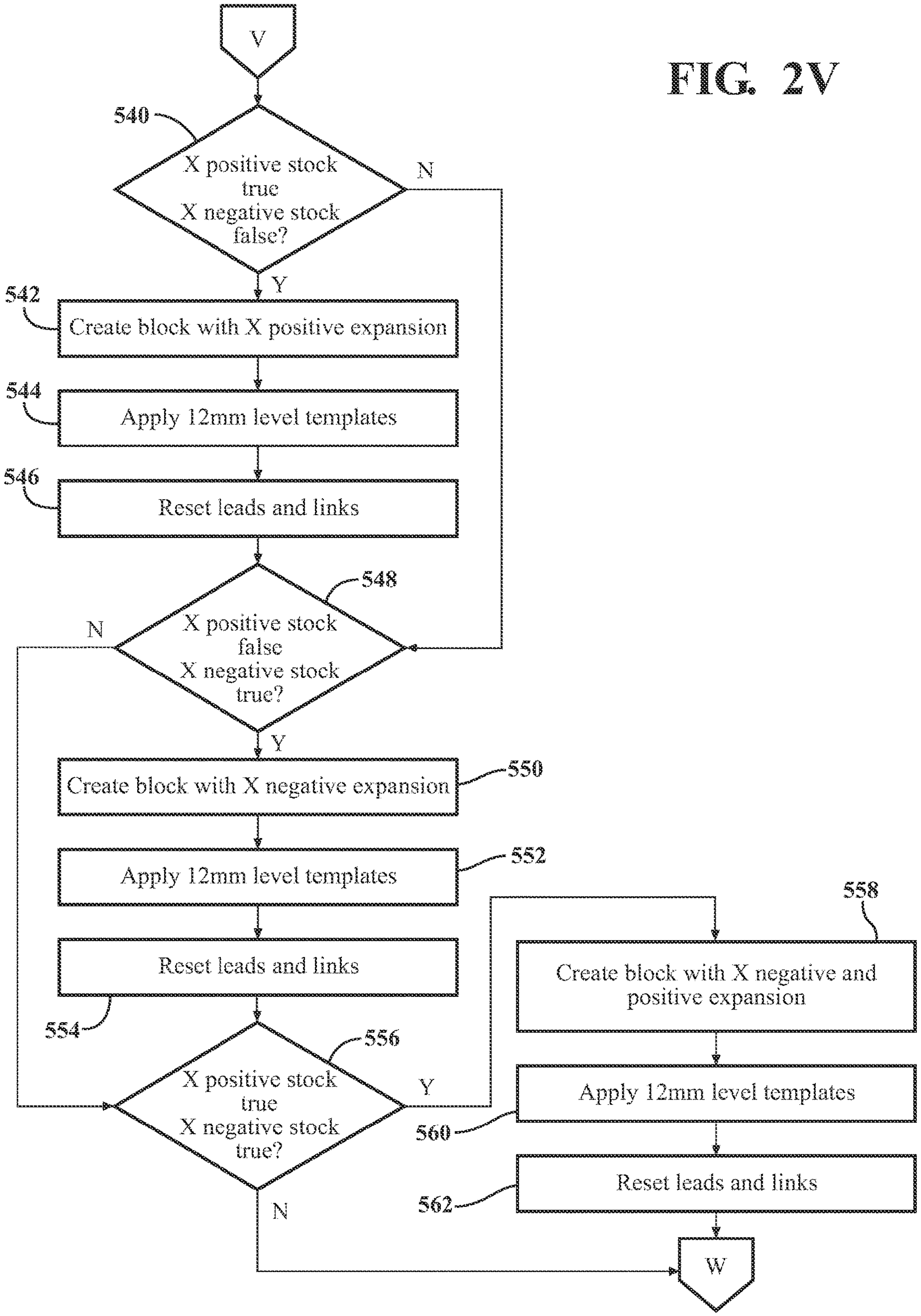
Figure 2W:
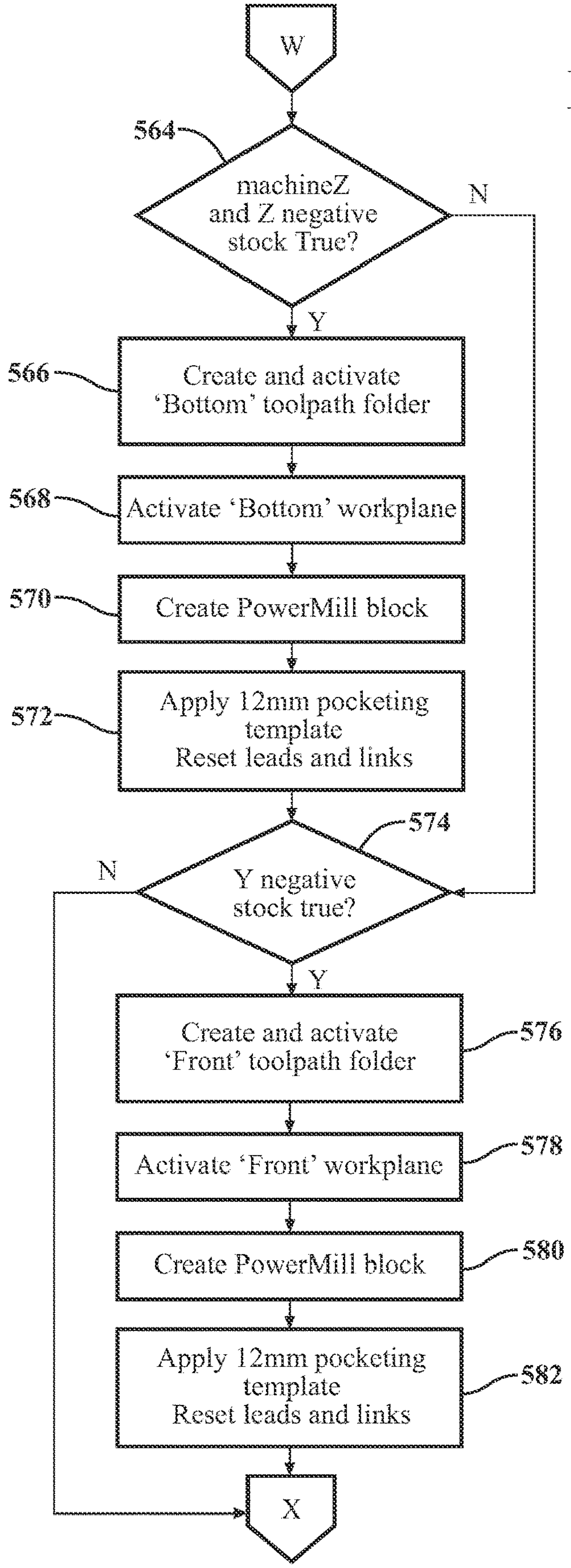
Figure 2X:
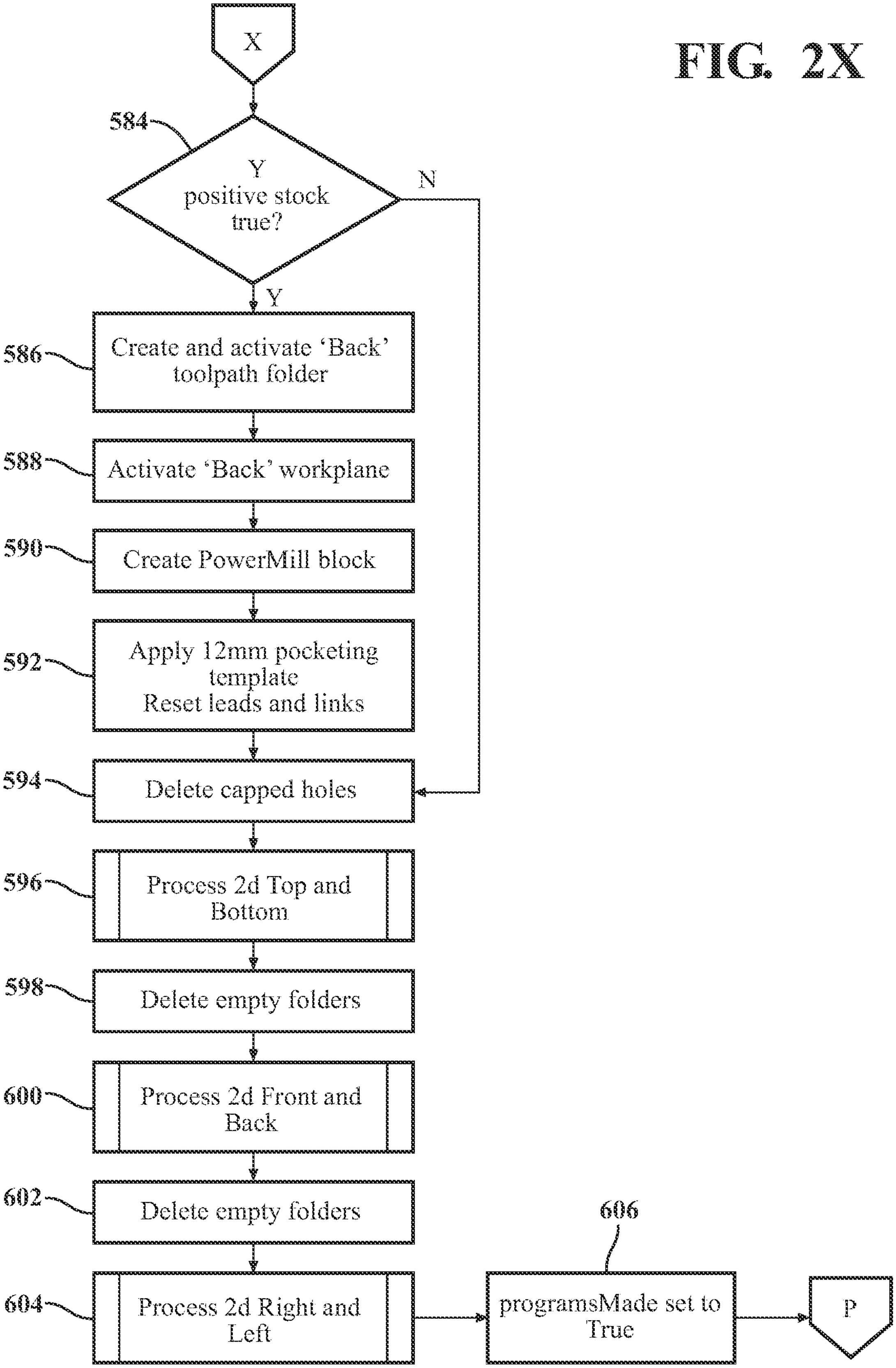

If at step 448 (FIG. 2Q), there is stock on the periphery of the detail, the system 10 imports the tool templates (step 506, FIG. 2T) and determines whether any scribed lines are present (step 508). If any scribed lines are present, the system 10 runs the method to create scribing toolpaths, shown in FIGS. 9A-9B (step 510). After creating scribing toolpaths or if at step 508 no scribe line are present, the system 10 caps the holes (step 512). The system 10 then runs the RaisedBossPresent method, shown in FIG. 13 (step 514). The system 10 creates a PowerMill stock model (step 516), creates a PowerMill block (step 518), creates and activates a "Top" toolpath folder (step 520), and sets block minimum Z to the maximum Z surface height (step 522). The system 10 then determines whether machineZ and Z positive stock are both True (step 524, FIG. 2U). If machineZ and Z positive stock are both True, the system 10 applies a 12 mm pocketing template to machine stock off the top of the stock model (step 526), and determines whether RaisedBoss is True (step 528). The system 10 also determines whether RaisedBoss is True (step 528) if at step 524, it determines that either machineZ or Z positive stock is not True. If RaisedBoss is True, the system 10 creates a PowerMill block with expansion to allow the cutter around the boss (step 530). Otherwise, the system 10 simply creates a PowerMill block (step 532). The system 10 applies a 12 mm pocketing template and resets the leads and links (step 534), and determines whether angledSurfacePresent is True (step 536). If angledSurfacePresent is True, the system 10 runs the ProcessAngledSurfaces method, shown in FIG. 14 (step 538), and determines whether X positive stock is True and X negative stock is False (step 540, FIG. 2V). The system 10 also determines whether X positive stock is True and X negative stock is False (step 540) if at step 536, it determines that angledSurfacePresent is not True. If X positive stock is True and X negative stock is False, the system 10 creates a block with X positive expansion (step 542), applies 12 mm level templates (step 544), and resets the leads and links (step 548). The system 10 then determines whether X positive stock is False and X negative stock is True (step 548). The system 10 also determines whether X positive stock is False and X negative stock is True (step 548) if at step 540, it determines that X positive stock is not True or X negative stock is not False. If X positive stock is False and X negative stock is True, the system 10 creates a block with X negative expansion (step 550), applies 12 mm level templates (step 552) and resets the leads and links (step 554). The system 10 then determines whether X positive stock is True and X negative stock is True (step 556). The system 10 also determines whether X positive stock is True and X negative stock is True (step 556) if at step 548, it determines that X positive stock is not False or X negative stock is not True. If X positive stock is True and X negative stock is True, the system 10 creates a block with X negative and X positive expansions (step 558), applies 12 mm level templates (step 560), and resets the leads and links (step 562). The system 10 then determines whether machineZ and Z negative stock are both True (step 564, FIG. 2W). The system 10 also determines whether machineZ and Z negative stock are both True (step 564) if at step 556 (FIG. 2V) it determines that X positive stock is not True or X negative stock is not True. If machineZ and Z negative stock are both True, the system 10 creates and activates a "Bottom" toolpath folder (step 566), and activates the "Bottom" workplane (step 568). The system 10 creates a PowerMill block (step 570) and applies a 12 mm pocketing template and resets the leads and links (step 572). The system 10 then determines whether Y negative stock is True (step 574). The system 10 also determines whether Y negative stock is True (step 574) if at step 564, it determines that either machineZ or Z negative stock is not True. If Y negative stock is True, the system 10 creates and activates a "Front" toolpath folder (step 576) and activates the "Front" workplane (step 578). The system 10 creates a PowerMill block (step 580) and applies a 12 mm pocketing template and resets the leads and links (step 582). The system 10 then determines whether Y positive stock is True (step 584, FIG. 2X). The system 10 also determines whether Y positive stock is True (step 584) if at step 574 (FIG. 2W) it determines that Y negative stock is not True. If Y positive stock is True, the system 10 creates and activates a "Back" toolpath folder (step 586) and activates the "Back" workplane (step 588). The system 10 creates a PowerMill block (step 590) and applies a 12 mm pocketing template and resets the leads and links (step 592). The system 10 then deletes the capped holes (step 594). The system 10 also deletes the capped holes (step 594) if at step 584, it determines that Y positive stock is not True. The system 10 then runs the method to process 2d templates, shown in FIGS. 10A-10B, on the top and bottom of the stock block (step 596). The system 10 deletes the empty folders (step 598) and runs the method to process 2d templates on the front and back of the stock block (step 600). The system 10 again deletes the empty folders (step 602), runs the method to process 2d templates on the right and left of the stock block (step 604), and sets programsMade to True (step 606). The system 10 then proceeds to step 396 in FIG. 2P.

Figure 2Y:
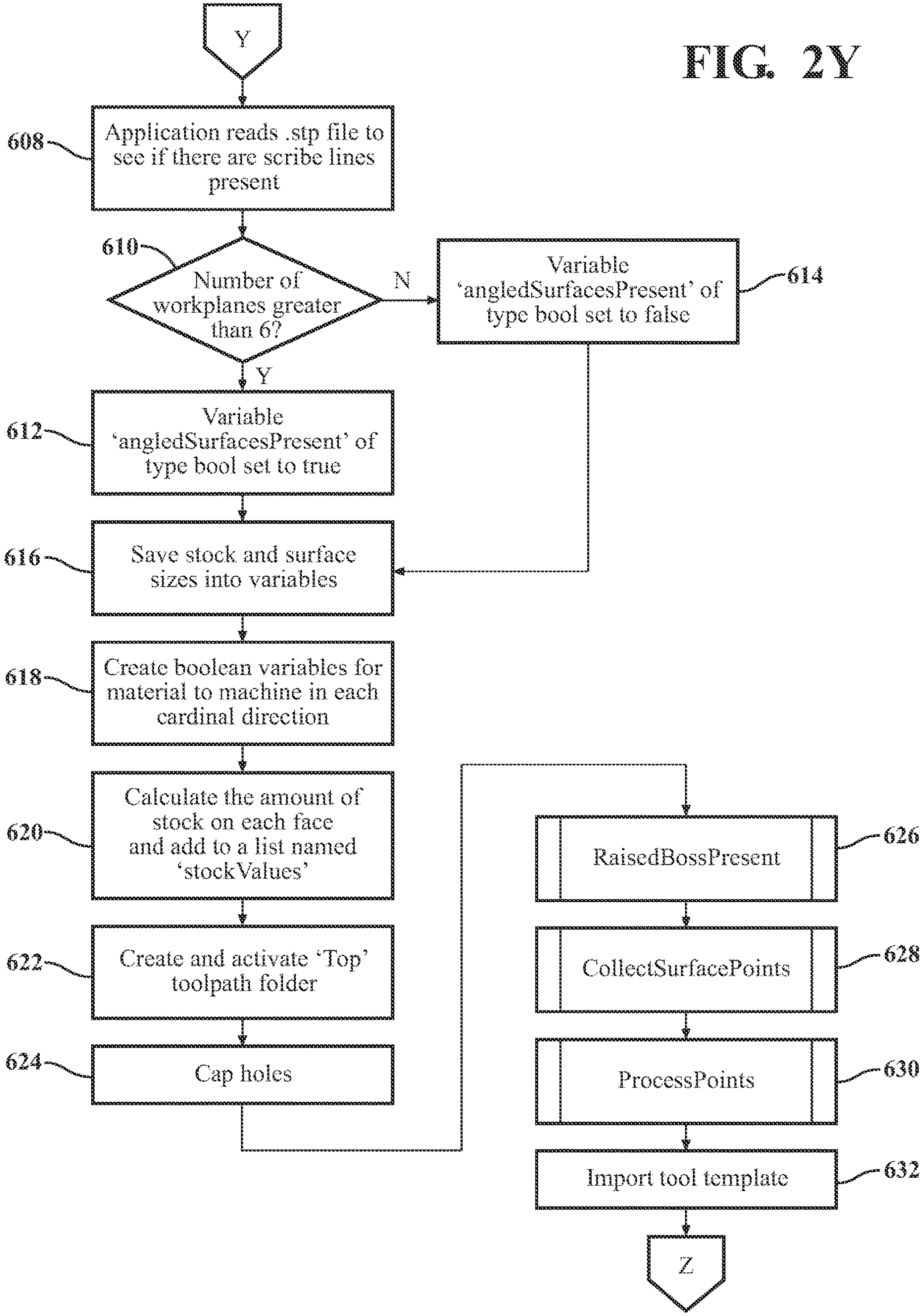
Figure 2Z:
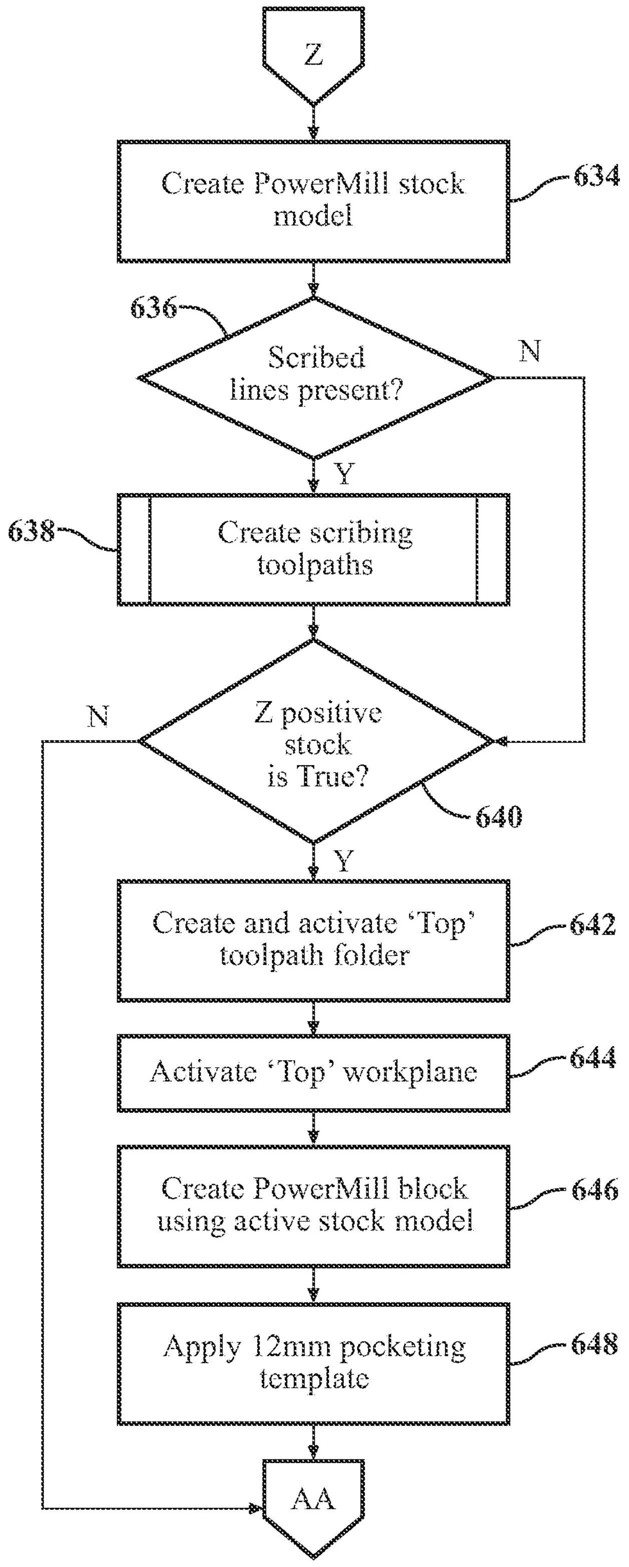
Figure 2A:
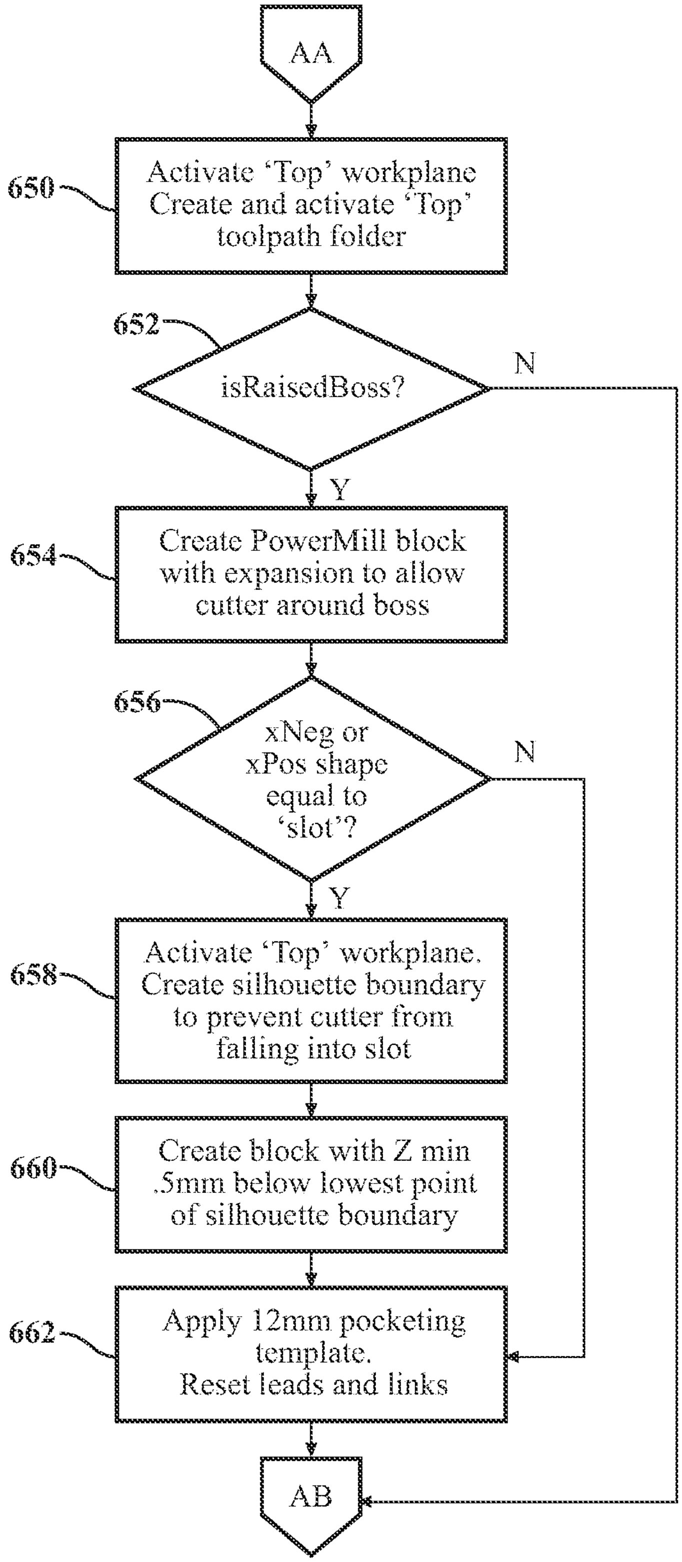
Figure 2A:
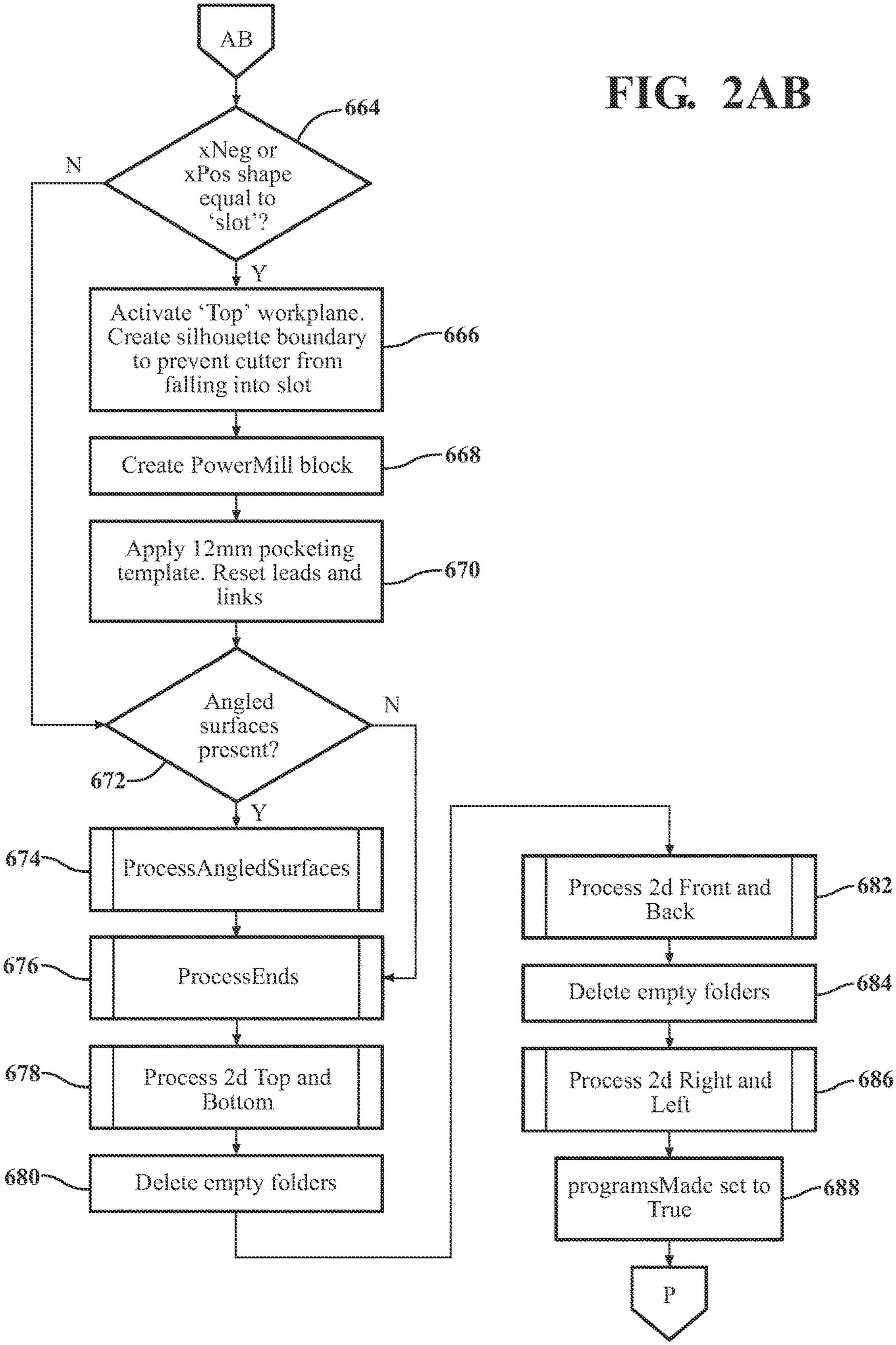
Figure 15:
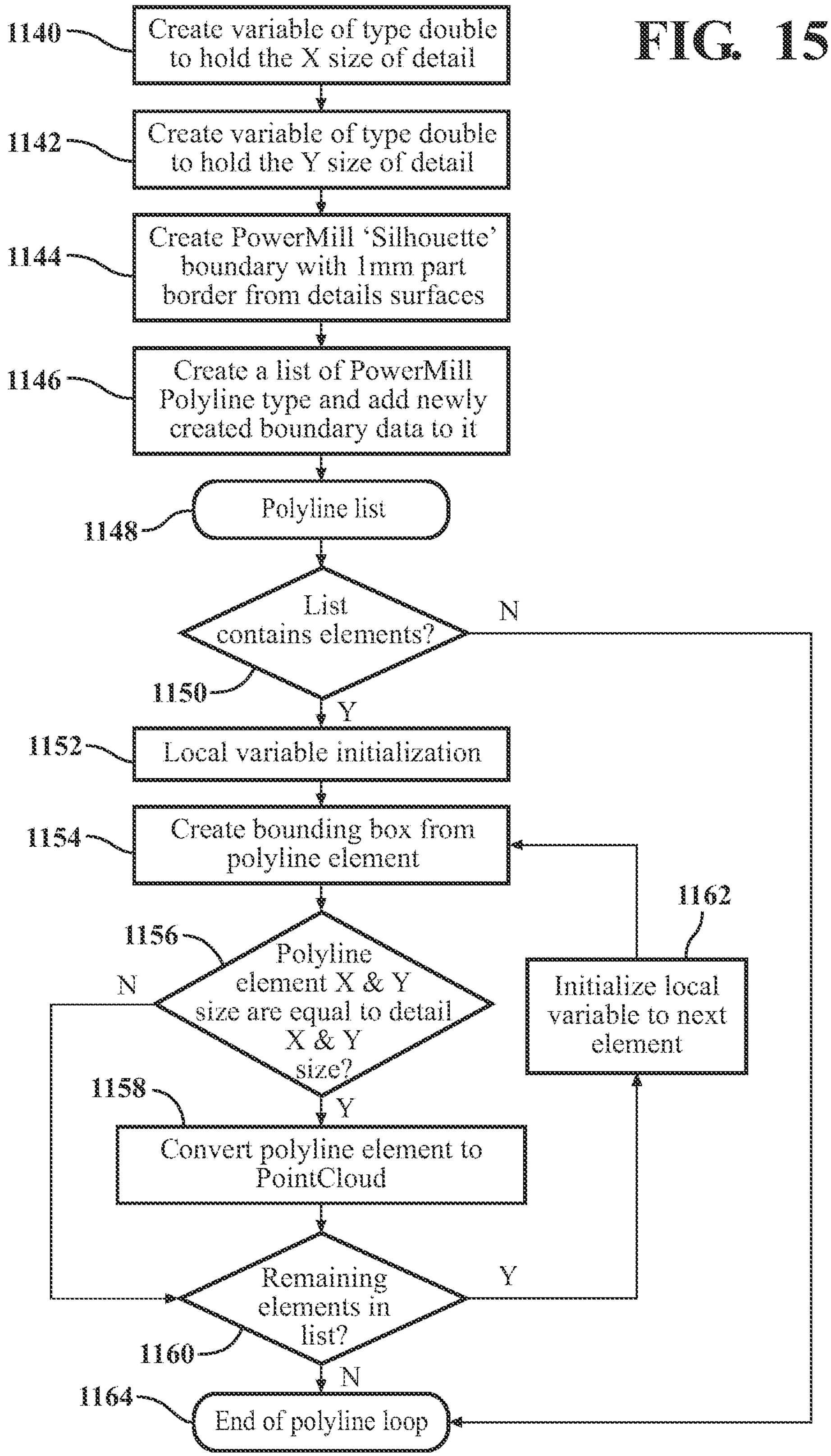
FIG. 15 shows an exemplary method to collect the points to begin identifying features on the ends of the detail.
Figure 16A:
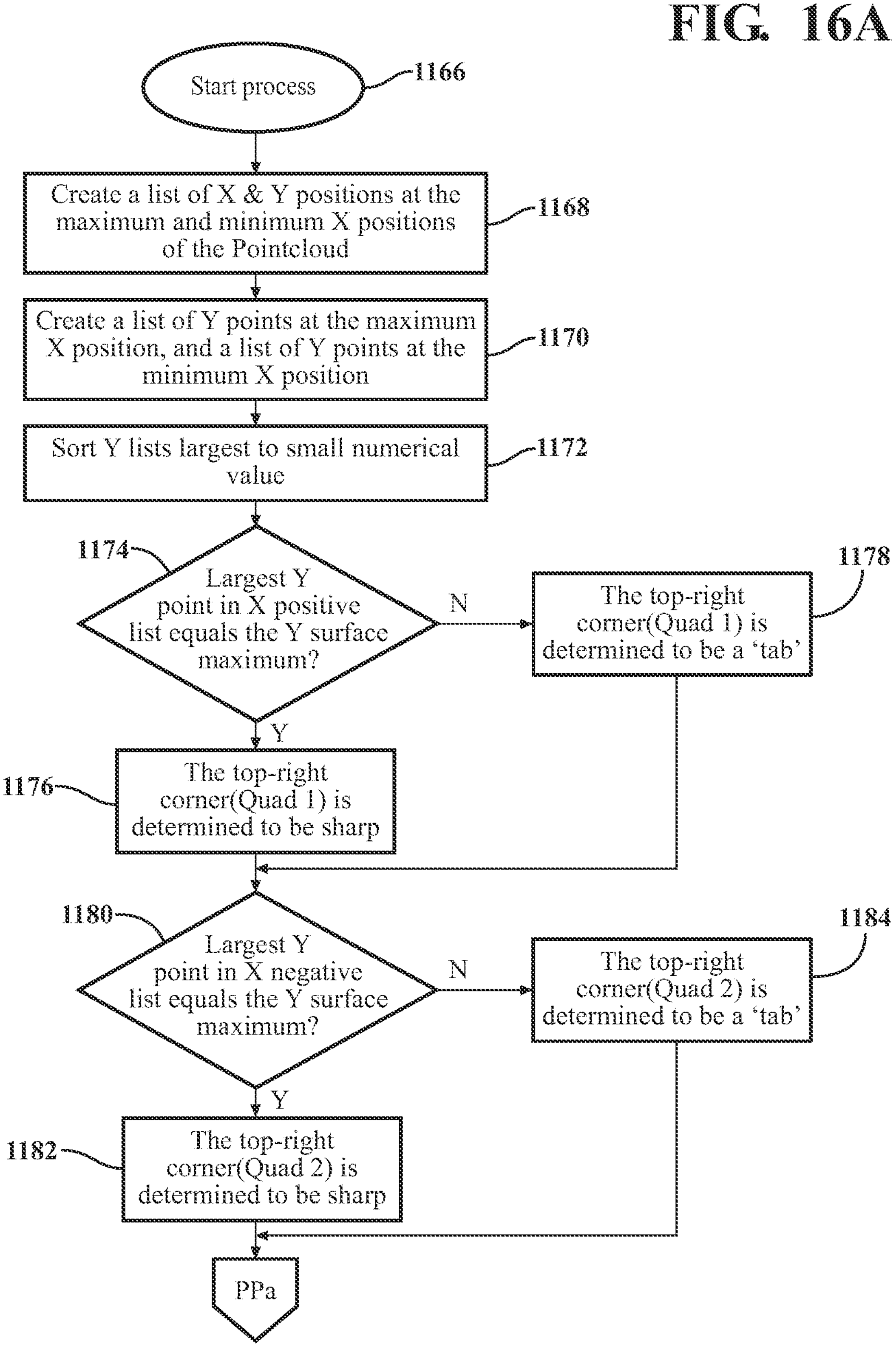
FIGS. 16A-16D show an exemplary method to identify features on the ends of the detail.
Figure 16B:
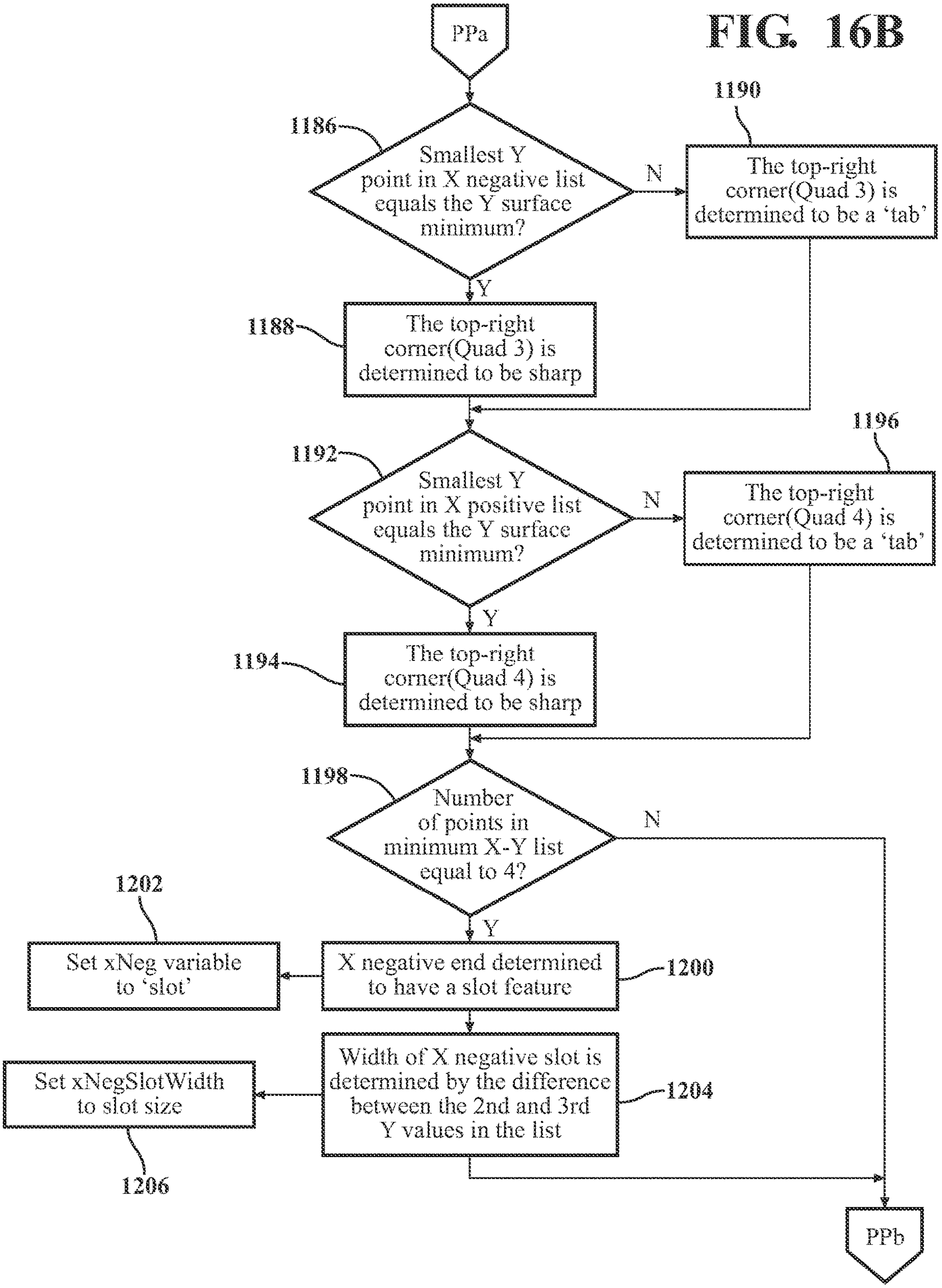
Figure 16C:
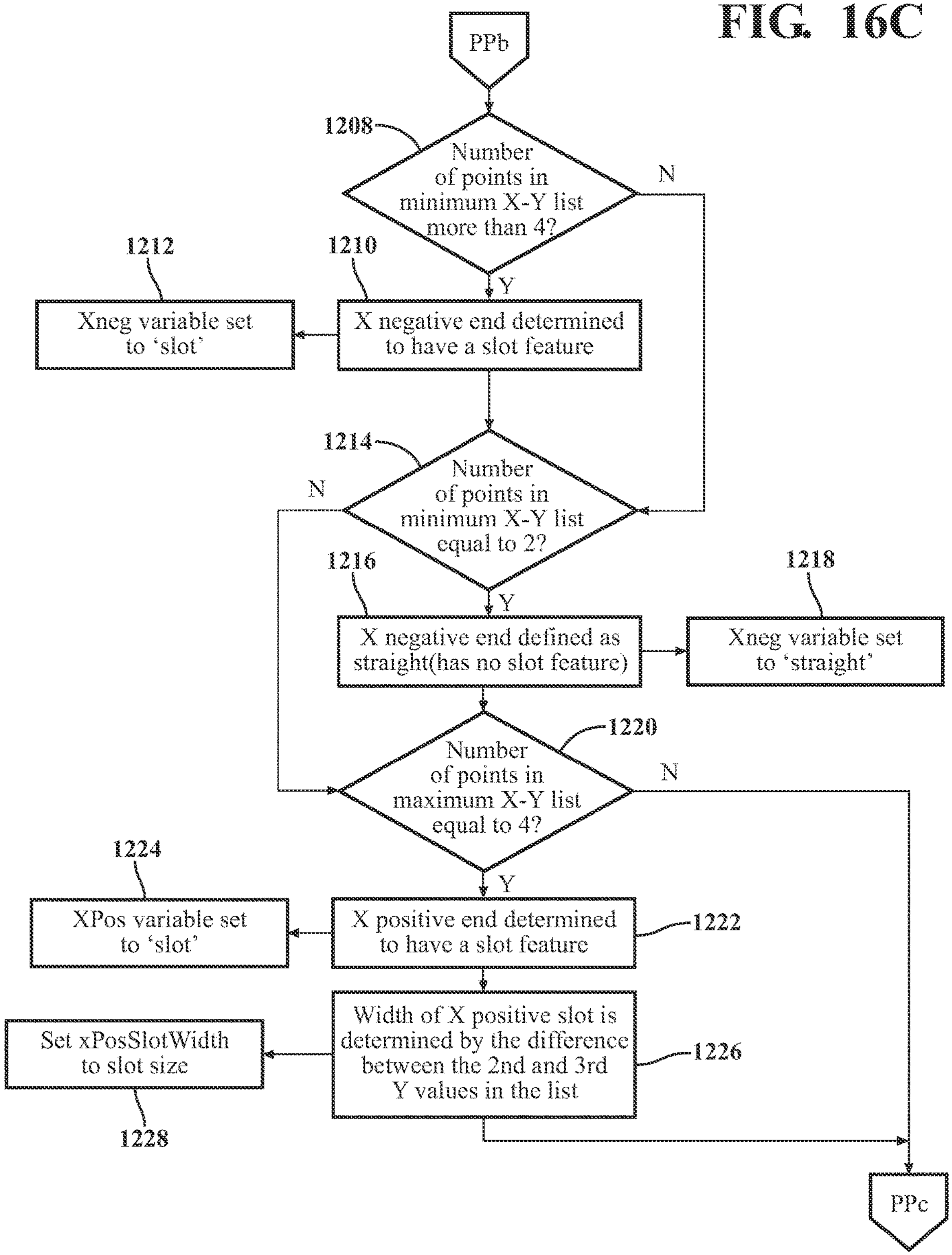
Figure 16D:
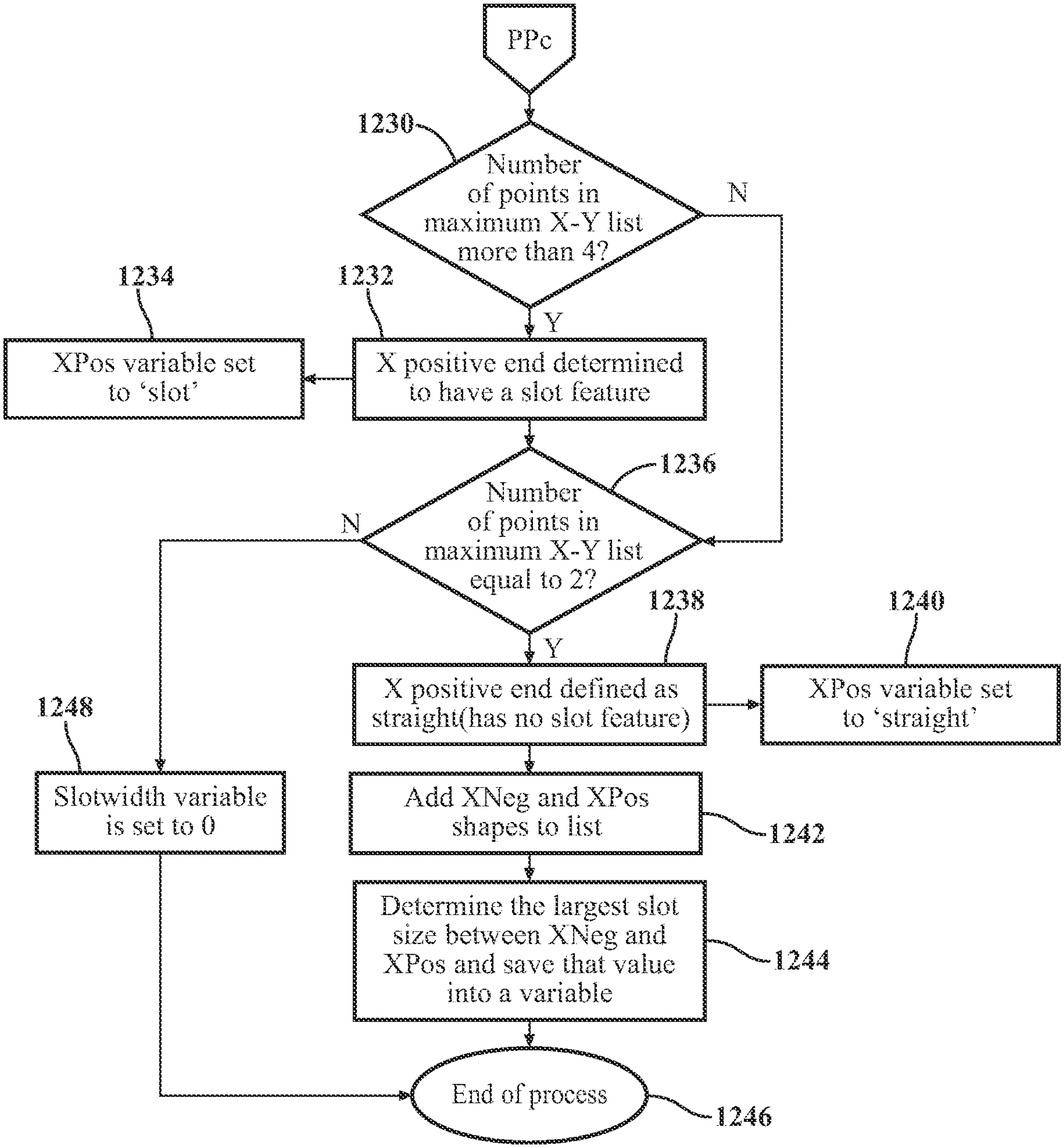
Figure 17:
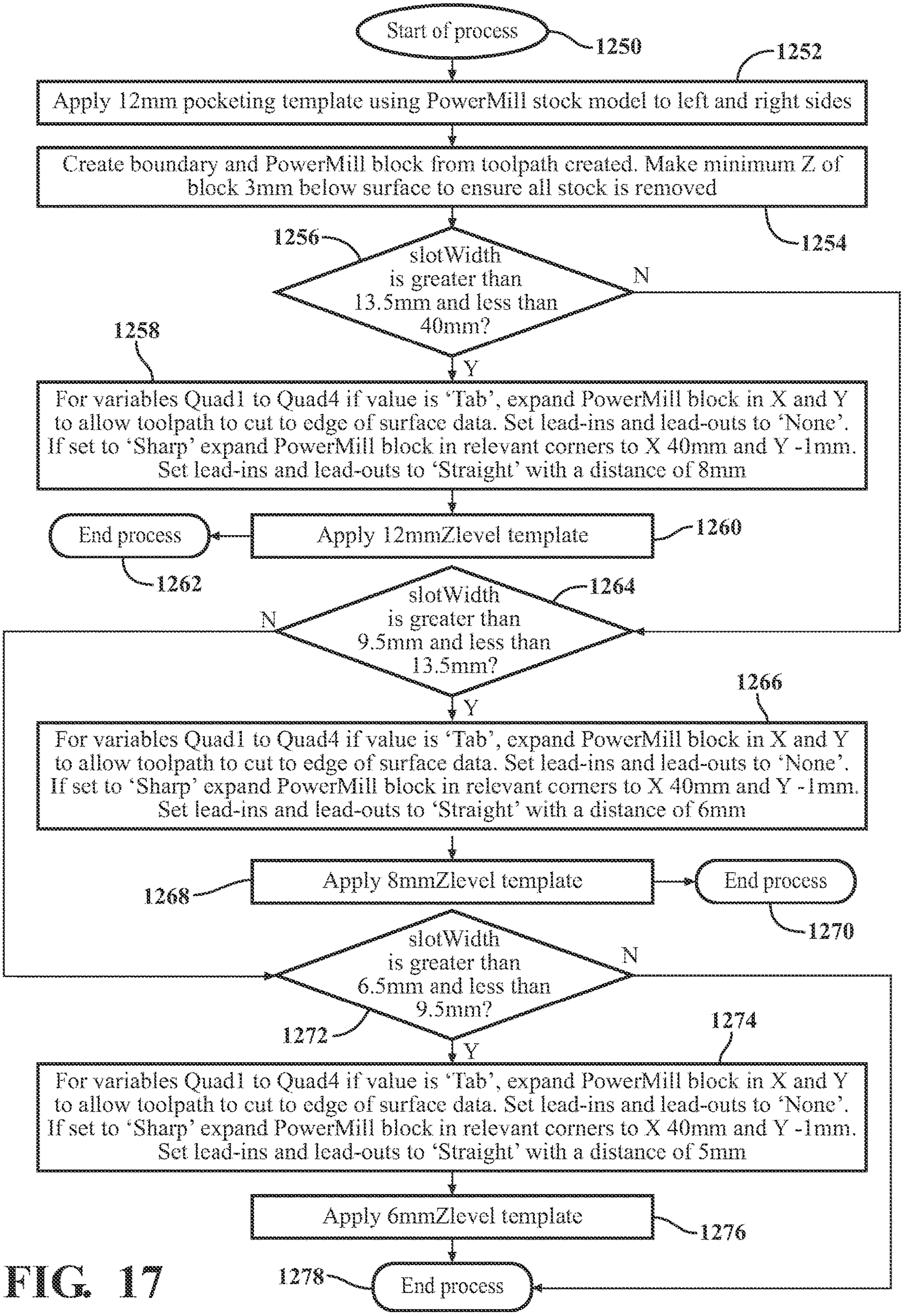
FIG. 17 shows an exemplary method to process features on the ends of the detail.

Returning to FIG. 2C, if at step 64, the system 10 creates a rating of 2 (step 70), the system 10 reads the .stp file to see if there are any scribe lines present (step 608, FIG. 2Y). The system 10 then determine whether the number of workplanes is greater than 6 (step 610). If the number of workplanes is greater than 6, the system 10 sets the Boolean variable angledSurfacesPresent to True (step 612). Otherwise, the system 10 sets angledSurfacesPresent to False (step 614). The system 10 then saves the stock and surface sizes into variables (step 616), and creates Boolean variables for the material to machine in each cardinal direction (step 618). The system 10 calculates the amount of stock on each face and add it to a list named "stockValues" (step 620). The system 10 creates and activates a "Top" toolpath folder (step 622) and caps the holes (step 624). The system 10 then runs the RaisedBossPresent method shown in FIG. 13 (step 626). The system 10 then runs a CollectSurfacePoints method (step 628). The CollectSurfacePoints method collects points at the end of the detail to begin identifying features, and is illustrated in FIG. 15. The system 10 also runs a ProcessPoints method (step 630). The ProcessPoints method identifies the features on the end of the detail, and is illustrated in FIGS. 16A-16D. The system 10 then imports the tool template (step 632). The system 10 creates a PowerMill stock model (step 634, FIG. 2Z), and determines whether any scribed lines are present (step 636). If any scribed lines are present, the system 10 runs the method to create scribing toolpaths shown in FIGS. 9A-9B (step 638). After creating scribing toolpaths or if at step 636 no scribe line are present, the system 10 determines whether Z positive stock is True (step 640). If Z positive stock is True, the system 10 creates and activates a "Top" toolpath folder (step 642) and activates the "Top" workplane (step 644). The system 10 creates a PowerMill block using the active stock model (step 646) and applies a 12 mm pocketing template (step 648). The system 10 then activates the "Top" workplane, and creates and activates the "Top" toolpath folder (step 650, FIG. 2AA). The system 10 also activates the "Top" workplane, and creates and activates the "Top" toolpath folder (step 650) if at step 640 (FIG. 2Z) it determines that Z positive stock is not True. The system 10 determines whether RaisedBoss is True (step 652). If RaisedBoss is True, the system 10 creates a PowerMill block with expansion to allow the cutter around the boss (step 654). The system 10 determines whether xNeg or xPos shape is equal to "slot" (step 656). If xNeg or xPos shape is equal to "slot," the system 10 activates the "Top" workplane and creates a silhouette boundary to prevent the cutter from falling into the slot (step 658). The system 10 creates a block with Z min 0.5 mm below the lowest point of the silhouette boundary (step 660). The system 10 applies a 12 mm pocketing template and resets the leads and links (step 662). The system 10 also applies the 12 mm pocketing template and resets the leads and links (step 662) if at step 656 it determines that neither xNeg nor xPos shape is equal to "slot." The system 10 then determines whether xNeg or zPos shape is equal to "slot" (step 664, FIG. 2AB). The system 10 also determines whether xNeg or zPos shape is equal to "slot" (step 664) if at step 652 (FIG. 2AA) it determined that RaisedBoss was not True. If xNeg or xPos shape is equal to "slot," the system 10 activates the "Top" workplane and creates a silhouette boundary to prevent the cutter from falling into the slot (step 666). The system 10 creates a PowerMill block (step 668). The system 10 applies a 12 mm pocketing template and resets the leads and links (step 670). The system 10 then determines whether any angled surfaces are present (step 672). The system 10 also determines whether any angled surfaces are present (step 672) if at step 664 it determined that neither xNeg nor xPos shape is equal to "slot." If any angled surfaces are present, the system 10 runs the method ProcessAngledSurfaces shown in FIG. 14 (step 674). The system 10 then runs a ProcessEnds method (step 676). The ProcessEnds method is illustrated in FIG. 17. The system 10 also runs the ProcessEnds method (step 676) if at step 672 it determined that no angled surfaces were present. The system 10 then runs the method to process 2d templates, shown in FIGS. 10A-10B, on the top and bottom of the stock block (step 678). The system 10 deletes the empty folders (step 680) and runs the method to process 2d templates on the front and back of the stock block (step 682). The system 10 again deletes the empty folders (step 684), runs the method to process 2d templates on the right and left of the stock block (step 686), and sets programsMade to True (step 688). The system 10 then proceeds to step 396 in FIG. 2P.

FIG. 8 shows a flow chart illustrating the macro to create featuresets. Initially, the system 10 creates the featuresets for the holes that are going down from the top of the detail and groups them into Setup 1 (step 760). The system 10 identifies these holes from the design specifications for the detail. The system 10 also determines whether any holes will be drilled from the bottom of the stock (step 762). If the system 10 determines that holes will be drilled from the bottom of the stock, the system 10 creates the featuresets for those holes and groups them into Setup 2 (step 764). The system 10 also sets holesIn2nd (a flag indicating whether holes need to be drilled from the bottom of the stock) to True (step 766). If at step 762, the system 10 determines that no holes need to be drilled from the bottom of the stock, it sets holesIn2nd to False (step 768). After the holesIn2nd flag is set, the system 10 places caps over the holes in the design specifications (step 770) to ensure that the holes in the detail are processed after the rest of the stock has been machined.

FIGS. 9A-9B show a flow chart illustrating a method to create a scribing toolpath. In the method, the system 10 creates an integer variable for use in naming non-mirrored only toolpaths (step 772), creates an integer variable for use in naming mirrored only toolpaths (step 774), and creates an integer variable for use in naming mirrored and non-mirrored toolpaths (step 776). The system 10 creates scribe lines in PowerMill according to their layer name (step 778), and renames the scribe lines to filter naming to 3 sorting options: scribe, shown text and opposite text (step 780). The system 10 creates empty patterns in PowerMill and refreshes the project to update data to the API (step 782). The system 10 creates a list of variable type PMPattern (step 784), creates PMPatterns Collection of all PMPattern entities in the project (step 786), creates a list of all PMWorkplane entities in the project (step 788), and adds all PMPattern entities from PMCollection to the pattern list (step 790). The system 10 then activates the "Top" workplane (step 792).

The system 10 begins a loop for the pattern list (step 794) and determines whether any elements are in the list (step 796) If there are elements in the pattern list, the system 10 initializes the local variable to the first element (step 798) and merges all segments of the pattern (step 800). The system 10 creates a list of the type of Polyline from the pattern (step 802), and creates a bounding box from the surfaces using a global transform (step 804). The system 10 begins a loop for the polyline list (step 806) and determines whether any elements are in the list (step 808). If there are any elements in the polyline list, the system 10 initializes the local variable to the first element (step 810), and gets a Z value from the polyline element (step 812). The system 10 determines whether the Z value is equal to the surface maximum Z (step 814). If the Z value is equal to the surface maximum Z, the system 10 writes the polyline segment to the harddrive (step 816), and reads the segment from the harddrive into the relevant PMPattern (step 818). The system 10 determines whether there are any additional elements in the polyline list (step 820). The system 10 also determines whether there are any additional elements in the polyline list (step 820) if at step 814 the Z value was not equal to the surface maximum Z. If there are additional elements in the polyline list, the system 10 initializes the local variable to the next element (step 822) and returns to step 812 to get the Z value from the polyline element. If at step 808, there were no elements in the polyline list, or if at step 820, there are no additional elements in the polyline list, the polyline loop ends (step 824), and the system 10 determines whether there are additional elements in the pattern list (step 826). If there are additional elements in the pattern list, the system 10 initializes the local variable to the next element in the pattern list (step 828), and returns to step 800 to merge all segments of the pattern. If at step 796, there were no elements in the pattern list, or if at step 826, there are no additional elements in the pattern list, the pattern loop ends (step 830), and the system 10 deletes all unused patterns (step 832, FIG. 9B).

The system 10 then refreshes PowerMill to update the API with the latest PowerMill project data (step 834), creates PMPatternsCollection that includes all patterns in the project (step 836), and creates and activates a folder inside the toolpaths folder to hold the scribe toolpaths (step 838). The system 10 begins a loop for the PMPatternsCollection list (step 840) and determines whether there are any elements in the PMPatternsCollection list (step 842). If there are elements in the PMPatternsCollection list, the system 10 initializes the local variable to the first element (step 844), and merges the pattern segments (step 846).

The system 10 begins a loop for the PMWorkplanesCollection list (step 848), and determines whether there are any elements in the PMWorkplanesCollection list (step 850). If there are elements in the PMWorkplanesCollection list, the system 10 initializes the local variable to the first element (step 852), and activates a workplane element (step 854). The system 10 then activates and selects a pattern element (step 856), creates a bounding box around the active pattern (step 858), creates a bounding box around the surfaces (step 860), creates a variable to hold the Z depth of the active pattern (step 862), creates a variable to hold the location of the maximum Z height of the pattern (step 864), and creates a variable to hold the location of the maximum Z height of the surfaces (step 866). The system 10 then determines whether the Z depth of the pattern is 0, and whether the maximum Z of the pattern and surfaces are equal (step 868). If the Z depth of the pattern is 0 and the maximum Z of the pattern and surfaces are equal, the system 10 creates a PowerMill block around the surfaces with a 1 mm expansion (step 870) and determines whether the pattern contains text of any of the 3 sorting options (step 872). If the pattern contains the text of any of the 3 sorting options, the system 10 sets the name of the toolpath to the active workplane name, the relevant sorting option and the scribe count from the integer variable (step 874), and determines whether any elements remain in the PMWorkplanesCollection (step 876). If any elements remain in the collection, the system 10 initializes the local variable to the next element (step 878), and returns to step 854 to activate the workplane element. If at step 850, there are no elements in the PMWorkplanesCollection or if at step 876 there are no remaining elements in the PMWorkplanesCollection, the system 10 ends the workplane loop (step 880), and determines whether there are any remaining elements in the PMPatternsCollection (step 882). If there are elements in the PMPatternsCollection, the system 10 initializes the local variable to the next element (step 884), and returns to step 846 to merge the pattern segments.

If at step 842, there are no elements in the PMPatternsCollection or if at step 882, there are no elements remaining in PMPatternsCollection, the system 10 ends the pattern loop (step 886). If at step 868, the Z depth of the pattern is not 0 or the maximum Z of the pattern and surfaces are not equal, the system 10 returns to step 850 to determine whether there are any elements in the PMWorkplanesCollection. The system 10 also returns to step 850 to determine whether there are any elements in the PMWorkplanesCollection if at step 872 it determines that the pattern does not contain the text of any of the 3 sorting options.

FIGS. 10A-10B show a flow chart illustrating a method to process a 2d templates. In the method, the system 10 declares and initializes a Boolean variable "holesIn2nd" as False, and activates workplane 1 (step 888). The system 10 creates a PowerMill block to the surfaces (step 890) and creates a bounding box from the surface data (step 892). The system 10 then determines whether the maximum Y location equals 0 (step 894). If the maximum Y location does not equal 0, the system 10 rotates the detail 180 degrees along the Z axis, and recalculates the block (step 896). The system 10 then deletes the capped holes (step 898). The system 10 also deletes the capped holes (step 898) if at step 894 it determines that the maximum Y location does equal 0.

Figure 18:
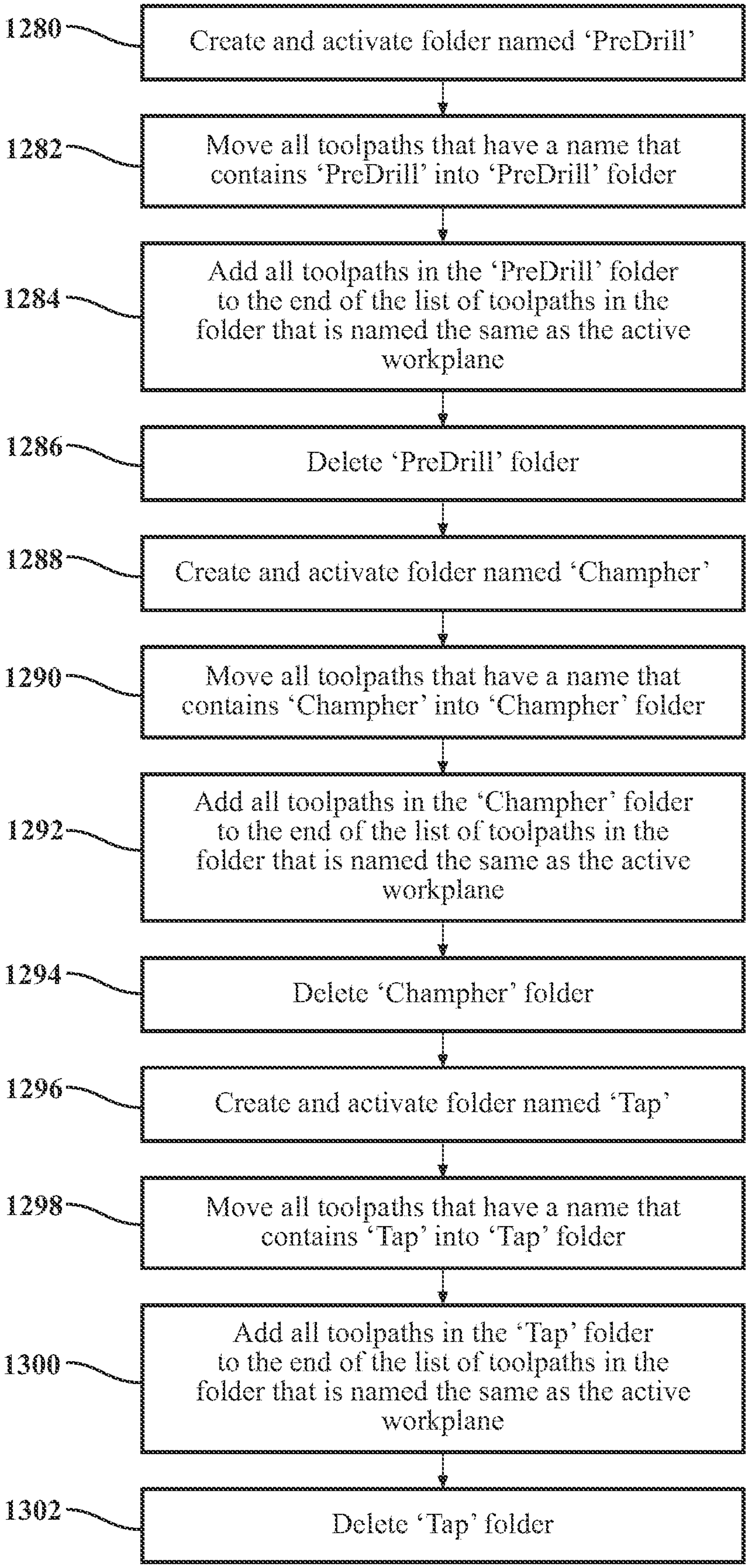
FIG. 18 shows an exemplary method to organize the 2d toolpaths.

The system 10 then runs a macro to create feature sets (step 900), creates and activates a folder with the name of workplane 1 in the toolpaths folder of PowerMill (step 902), deletes the capped holes (step 904), creates and activates "2d" folder in the toolpaths folder of PowerMill (step 906), creates a list of diameters from the list written out during the creation of the featuresets (step 908), creates a PowerMill block from the surfaces (step 910), and applies 2d templates to each diameter in the list (step 912). The system 10 then deletes all uncalculated toolpaths (step 914), and runs a ReOrder2dToolpath3Axis macro (step 916). The ReOrder2dToolpath3Axis macro is illustrated in FIG. 18. The system 10 then runs a Bottom Work Feature Find (BWFF) macro (step 918). The BWFF macro is illustrated in FIGS. 11A-11B.

The system 10 then refreshes PowerMill to update the API (step 920), and creates PMFeatureSetCollection from the featuresets in the project (step 922). The system 10 determines whether the collection count is more than 0 (step 924). If the collection counts is more than 0, the system 10 activates the "Bottom Setup" featureset, and sets holesIn2nd to "True" (step 926). The system 10 then determines whether holesIn2nd is True (step 928). The system 10 also determines whether holesIn2nd is True (step 928) if at step 924 it determined that the collection count was not more than 0. If holesIn2nd is not True, the process ends (step 930). Otherwise, the system 10 activates workplane 2 (step 932, FIG. 10B), creates a PowerMill block to the surfaces (step 934), creates a bounding box from the surface data (step 936), and determines whether the maximum Y location equals 0 (step 938). If the maximum Y location does not equal 0, the system 10 rotates the detail 180 degrees along the Z axis, and recalculates the block (step 940). The system 10 then creates and activates a folder with the name of workplane 2 in the toolpaths folder of PowerMill (step 942). The system 10 also creates and activates a folder with the name of workplane 2 in the toolpaths folder of PowerMill (step 942) if at step 938 it determines that the maximum Y location does equals 0. The system 10 then runs a macro to create feature sets for setup 2 (step 944), creates a PowerMill block (step 946), resets the leads and links according to the new active datum (step 948), deletes the capped holes (step 950), creates and activates the "2d" folder in the toolpaths folder of PowerMill (step 952), creates a list of diameters from the list written out during creation of the featuresets (step 954), creates a PowerMill block from the surfaces (step 956), and applies a 2d template to each diameter in the list (step 958). The system 10 deletes all uncalculated toolpaths (step 960), and runs the ReOrder2dToolpaths3Axis macro shown in FIG. 18 (step 962). The system 10 deletes all featuresets (step 964) before process 2d templates ends (step 966).

Figure 11A:
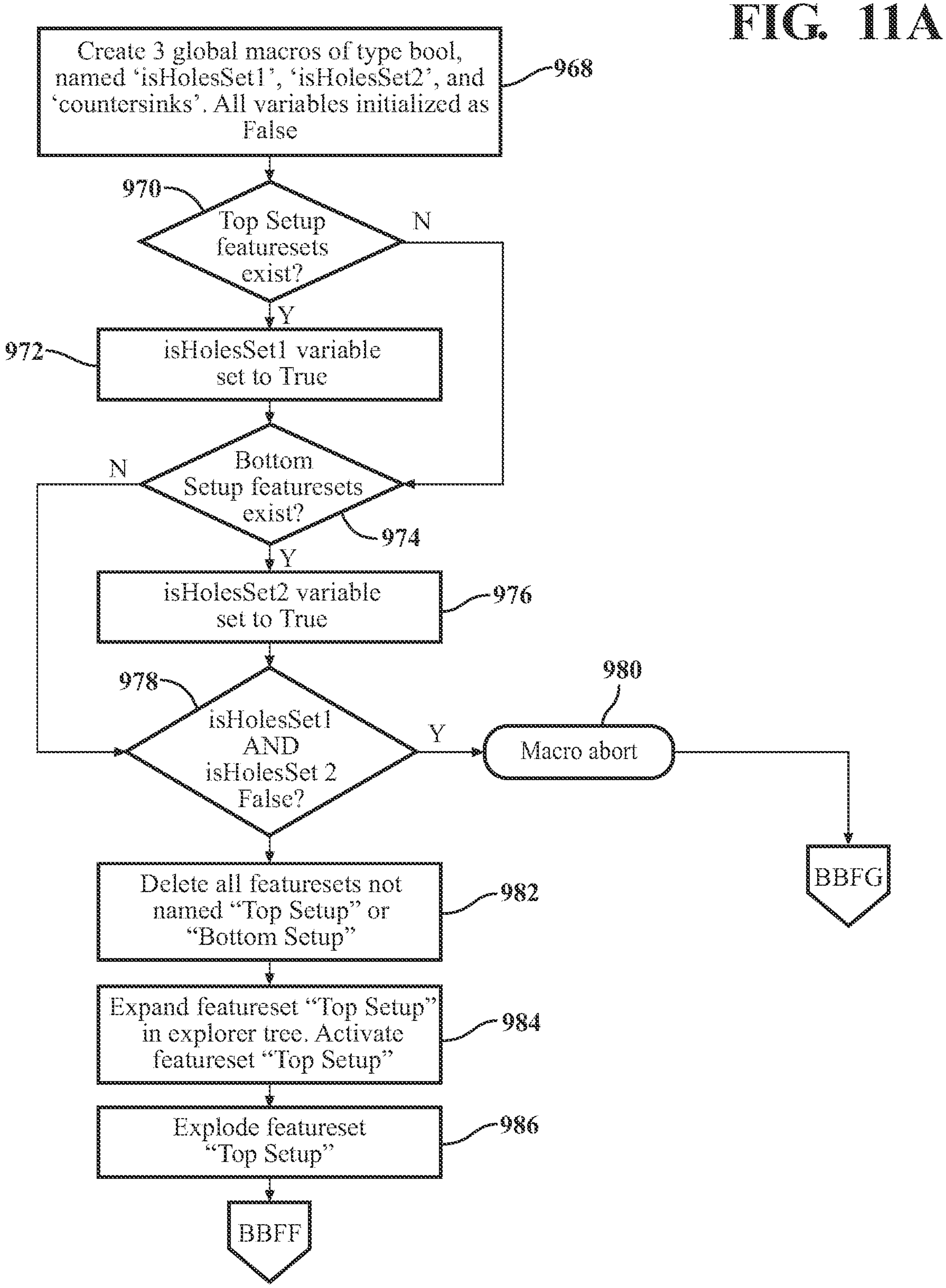
FIGS. 11A-11B show an exemplary macro to create countersinks that are required from the bottom of the detail.
Figure 11B:
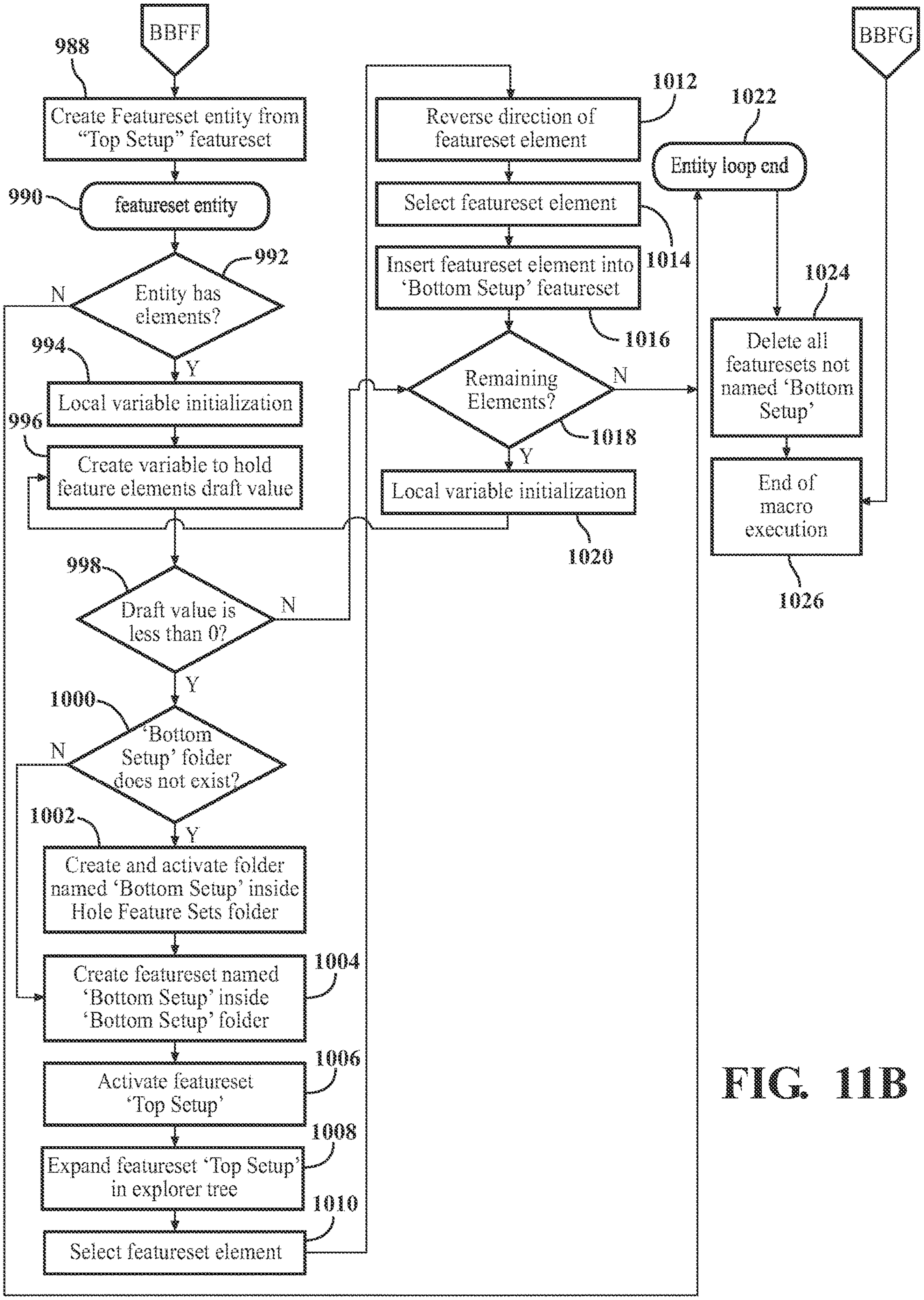

FIGS. 11A-11B show a flow chart illustrating the Bottom Work Feature Find (BWFF) macro, which creates countersinks that are required from the bottom of the stock. Initially, the system 10 creates three global Boolean type macros named "isHolesSet1," "isHolesSet2," and "countersinks" and initializes all variables as False (step 968). The system 10 determines whether the top setup featuresets exist (step 970). If the top setup featuresets exist, the system 10 sets the isHolesSet1 variable to True (step 972). The system 10 then determines whether the bottom setup featuresets exist (step 974). The system 10 also determines whether the bottom setup featuresets exist (step 974) if at step 970, it determines that the top setup featuresets does not exist. If the bottom setup featuresets exist, the system 10 sets the isHolesSet2 variable to True (step 976). The system 10 then determines whether isHolesSet1 and isHolesSet2 are False (step 978). The system 10 also determines whether isHolesSet1 and isHolesSet2 are False (step 978) if at step 974 it determines that bottom setup featuresets does not exist. If isHolesSet1 and isHolesSet2 are False, the BWFF macro is aborted (step 980) and the execution of the BWFF macro is ended (step 1026, FIG. 11B). Otherwise, the system 10 deletes all featuresets not named "Top Setup" or "Bottom Setup" (step 982), expands the featureset "Top Setup" in the explorer tree and activates the featureset "Top Setup" (step 984), and explodes the featureset "Top Setup" (step 986). The system 10 then creates a Featureset entity from the "Top Setup" featureset (step 988, FIG. 11B), and begins a loop for the featureset entity (step 990). The system 10 determines whether the featureset entity has elements (step 992). If the entity has elements, the system 10 initializes the local variable to the first element (step 994), creates a variable to hold the feature elements draft value (step 996), and determines whether the draft value is less than 0 (step 998). If the draft value is less than 0, the system 10 determines whether the "Bottom Setup" folder does not exist (step 1000). If the "Bottom Setup" folder does not exist, the system 10 creates and activates a folder named "Bottom Setup" inside the Hole Feature Sets folder (step 1002), and creates a featureset named "Bottom Setup" inside the "Bottom Setup" folder (step 1004). The system 10 also creates a featureset named "Bottom Setup" inside the "Bottom Setup" folder (step 1004) if at step 1000 it determines that the "Bottom Setup" folder does exist. The system 10 activates the featureset "Top Setup" (step 1006), expands the featureset "Top Setup" in the explorer tree (step 1008), selects the featureset element (step 1010), reverses the direction of the featureset element (step 1012), selects a featureset element (step 1014), inserts the featureset element into the "Bottom Setup" featureset (step 1016), and determines if there are any remaining elements in the featureset entity (step 1018). The system 10 also determines if there are any remaining elements in the featureset entity (step 1018) if at step 998 it determines that the draft value is not less than 0. If there are remaining elements in the featureset entity, the system 10 initializes the local variable to the next element (step 1020), and returns to step 996 to create a variable to hold the feature elements draft value. If at step 992 the featureset entity has no elements or if at step 1018, there are no remaining elements in the featureset entity, the system 10 ends the featureset entity loop (step 1022), deletes all featuresets not named "Bottom Setup" (step 1024), and ends the execution of the BWFF macro (step 1026).

FIG. 12 shows a flow chart illustrating the OrganizeScribing3Axis macro. Initially, the system 10 creates 6 toolpath folders according to the cardinal workplane names (step 1028), and creates 6 toolpath folders according to the cardinal workplane names post-fixed with "_Mirror" (step 1030). The system 10 begins a loop for the toolpaths in the scribe folder (step 1032), and determines whether there are any elements in the scribe folder (step 1034). If there are elements in the scribe folder, the system 10 initializes the local variable to the first element (step 1036), creates a string variable to hold the element's name (step 1038), creates a string variable to hold the element's workplane (step 1040), and determines whether the file name contains "_Scribe" (step 1042). If the file name contains "_Scribe," the system 10 activates the "_Mirror" folder that contains the toolpath element's workplane name (step 1044), activates the toolpath element's workplane (step 1046), copies and mirrors the toolpath element into the active folder around the Y axis (step 1048), moves the toolpath element into a folder with the element's workplane name (step 1050), and determines if the file name contains "shScribe" (step 1052). The system 10 also determines if the file name contains "shScribe" (step 1052) if at step 1042 it determined that the file name does not contain "_Scribe." If the file name contains "shScribe," the system 10 moves the toolpath element into a folder with the element's workplane name (step 1054), and determines whether the file name contains "oppScribe" (step 1056). The system 10 also determines whether the file name contains "oppScribe" (step 1056) if at step 1052, it determined that the file name did not contain "shScribe." If the file name contains "oppScribe," the system 10 activates the "_Mirror" folder that contains the toolpath element's workplane name (step 1058), activates the toolpath element's workplane (step 1060), mirrors the toolpath element into an active folder around the Y axis (step 1062), and determines whether any elements remain in the scribe folder (step 1064). The system 10 also determines whether any elements remain in the scribe folder (step 1064) if at step 1056, it determined that the file name did not contain "oppScribe." If any elements remain in the scribe folder, the system 10 returns to step 1036 to initialize the local variable to the next element. Otherwise, the system 10 ends the scribe loop (step 1066). The system 10 also ends the scribe loop (step 1066) if at step 1034, it determined that there were no elements in the scribe folder.

FIG. 13 shows a flow chart illustrating the RaisedBossPresent method. Initially, the system 10 activates the "Top" workplane and creates a PowerMill block (step 1068). The system 10 creates a "shallow" type PowerMill boundary on the surfaces (step 1070), converts the boundary linework to PowerMill Polylines (step 1072), creates variables of type double to hold the X, Y size of surfaces (step 1074), creates a variable of type double to hold the Z maximum of the surfaces (step 1076), and removes the polyline that has the same size as the surfaces (step 1078). The system 10 begins a loop for the boundary polylines (step 1080), and determines whether there are any polyline elements present (step 1082). If any polyline elements are present, the system 10 initializes the local variable to the first element (step 1084) and determines whether the polyline element Y size is smaller than the surface Y size (step 1086). If the polyline element Y size is smaller than the surface Y size, the system 10 sets the RaisedBossPresent flag to True (step 1088) and ends the polyline loop (step 1090). Otherwise, the system 10 determines whether there are any polyline elements remaining (step 1092). If there are any polyline elements remaining, the system 10 returns to step 1084 to initialize the local variable to the next element. If there are no polyline elements remaining at step 1092 or if no polyline elements were present at step 1082, the system 10 ends the polyline loop (step 1090).

Figure 19:
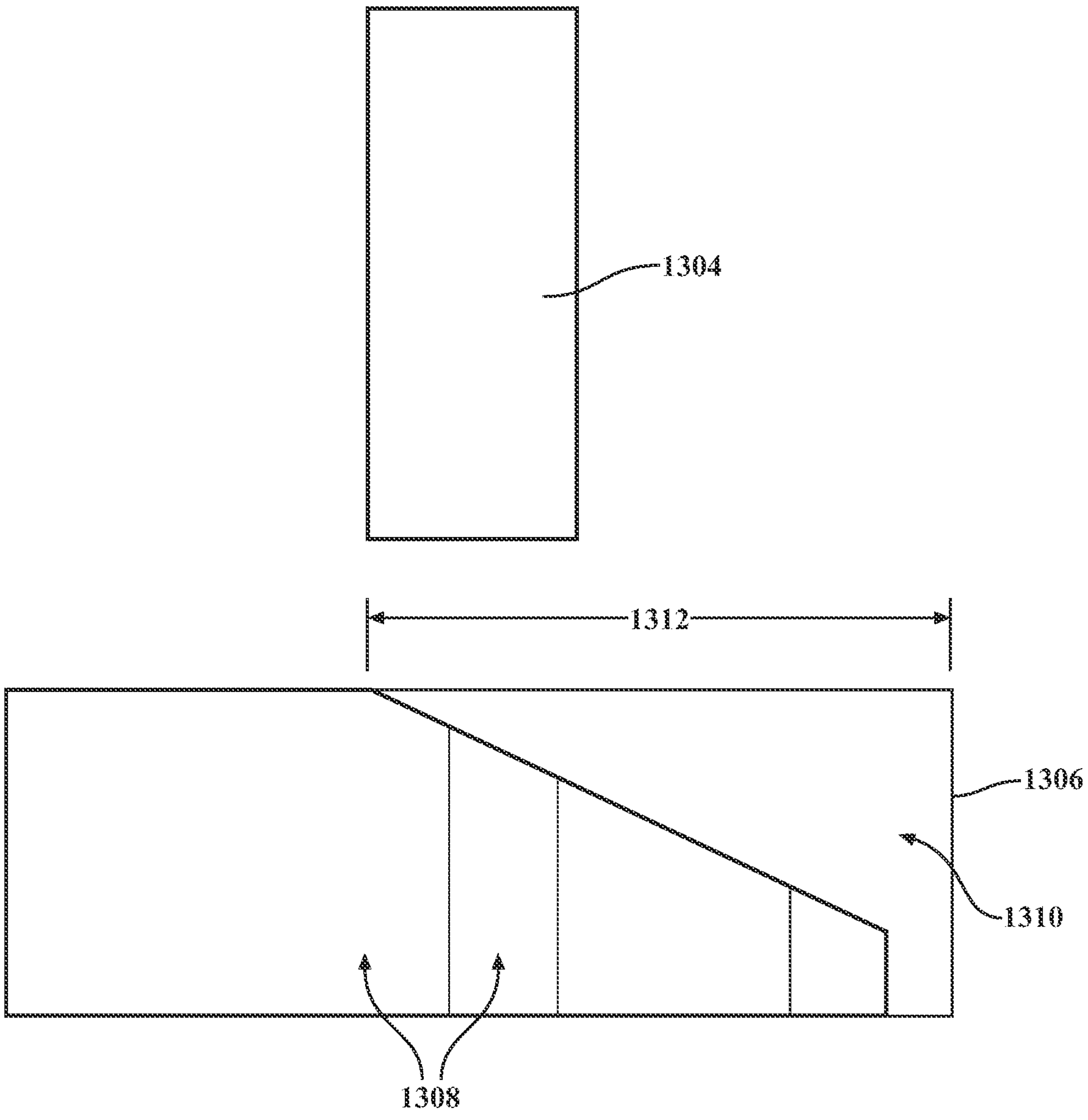
FIG. 19 shows a stock block before and after applying the method to process angled surfaces.

FIG. 14 shows a flow chart illustrating the ProcessAngledSurfaces method. Initially, the system 10 creates a list of workplanes excluding all cardinal workplanes (step 1094). The system 10 begins a loop for the workplane list (step 1096), and determines whether there are any elements in the workplane list (step 1098). If there are any elements in the workplane list, the system 10 initializes the local variable to the first element (step 1100), extracts the workplane element's Z axis vector (step 1102), and creates variables of type double to hold the Z vectors I, J and K values (step 1104). The system 10 then determines whether the K value is greater than 0 (step 1106). If the K value is greater than 0, the system 10 caps the holes (step 1108), activates the element workplane (step 1110), creates a PowerMill block (step 1112), selects all flat surfaces (step 1114), creates and activates the PowerMill "Contact Point" boundary (step 1116), activates the "Top" workplane (step 1118), creates a bounding box from the PowerMill block around the active boundary (step 1120), and determines whether the J value is equal to 0 (step 1122). If the J value is equal to 0, the system 10 creates a "coverage" variable of type double from the bounding box X size (step 1124), and determines whether the "coverage" value is greater than 9 (step 1126). The "coverage" value represents the amount of material that needs to be removed at an angle from the end of the stock. For example, FIG. 19 illustrates the original stock block 1306, the material to be removed 1310 from the end of the original stock block, and the resulting stock block 1308. The "coverage" value 1312 reflects the horizontal movement required by the cutter 1304 to remove the material from the end of the original stock 1306. If the stock to be removed 1310 has a coverage value 1312 larger than the diameter of the cutter 1304, extra horizontal toolpath movements will need to be created in order to remove all of the material. Thus, for a 12 mm diameter cutter 1304, if the coverage value 1312 is less than 9 mm, the cutter 1304 will be able to remove all necessary material 1310 with a single horizontal movement.

Returning to FIG. 14, if at step 1122 the J value is not equal to 0, the system 10 determines whether the I value is equal to 0 (step 1128). If the I value is equal to 0, the system 10 creates a "coverage" variable of type double from the bounding box Y size (step 1130), and determines whether the "coverage" value is greater than 9 (step 1126). The system 10 also determines whether the "coverage" value is greater than 9 (step 1126) if at step 1128 it determines that the I value is not equal to 0.

If at step 1126 the "coverage" value is greater than 9, the system 10 applies a 12 mm area clearance template and a 12 mm Z level template to the surface (step 1132). Otherwise, the system 10 applies a 12 mm Z level template to the surface (step 1134). The system 10 then determines whether any elements are remaining in the workplane list (step 1136). The system 10 also determines whether any elements are remaining in the workplane list (step 1136) if at step 1106 it determines that the K value is not greater than 0. If there are any elements remaining, the system 10 returns to step 1100 to initialize the local variable to the next element. If at step 1136 there are no elements remaining, or at step 1098 there are no elements in the workplane list, the system 10 ends the workplane loop (step 1138).

FIG. 15 shows a flow chart illustrating the CollectSurfacePoints method. Initially, the system 10 creates a variable of type double to hold the X size of the detail (step 1140), creates a variable of type double to hold the Y size of the detail (step 1142), creates a PowerMill "Silhouette" boundary with a 1 mm part border from the detail surfaces (step 1144), and creates a list of PowerMill polyline types and adds the newly created boundary data to it (step 1146). The system 10 then begins a loop for the polyline list (step 1148), and determines whether the polyline list contains any elements (step 1150). If the polyline list contains any elements, the system 10 initializes the local variable to the first element (step 1152), creates a bounding box from the polyline element (step 1154), and determines whether the polyline element X and Y sizes are equal to the detail X and Y sizes (step 1156). If they are equal, the system 10 converts the polyline element to a PointCloud (step 1158). The system 10 then determines whether there are any remaining elements in the list (step 1160). The system 10 also determines whether there are any remaining elements in the list (step 1160) if at step 1156, it determined that the polyline element X and Y sizes are not equal to the detail X and Y sizes. If there are any remaining elements in the list, the system 10 initializes the local variable to the next element (step 1162), and returns to step 1154 to create a bounding box from the polyline element. If there are no remaining elements in the list, or if at step 1150 the polyline list contained no elements, the system 10 ends the polyline loop (step 1164).

FIGS. 16A-16D shows a flow chart illustrating the ProcessPoints method. At the start of the process (step 1166), the system 10 creates a list of X and Y positions at the maximum and minimum X positions of the PointCloud (step 1168). The system 10 also creates a list of Y points at the maximum X position, and a list of Y points at the minimum X position (step 1170). The system 10 sorts the Y lists from largest to small numerical values (step 1172), and determines whether the largest Y point in the X positive list equals the Y surface maximum (step 1174). If the largest Y point in the X positive list equals the Y surface maximum, the top-right corner (Quad1) is determined to be sharp (i.e., a regular corner) (step 1176). Otherwise, the top-right corner (Quad1) is determined to be a "tab" (step 1178). If a corner is a "tab," it includes a feature that requires machining. For example, the corner could be rounded.

After categorizing Quad1, the system 10 then determines whether the largest Y point in the X negative list equals the Y surface maximum (step 1180). If the largest Y point in the X negative list equals the Y surface maximum, the top-left corner (Quad2) is determined to be sharp (step 1182). Otherwise, the top-left corner (Quad2) is determined to be a "tab" (step 1184). After categorizing Quad2, the system 10 determines whether the smallest Y point in the X negative list equals the Y surface minimum (step 1186, FIG. 16B). If the smallest Y point in the X negative list equals the Y surface minimum, the bottom-left corner (Quad3) is determined to be sharp (step 1188). Otherwise, the bottom-left corner (Quad3) is determined to be a "tab" (step 1190). After categorizing Quad3, the system 10 determines whether the smallest Y point in the X positive list equals the Y surface minimum (step 1192). If the smallest Y point in the X positive list equals the Y surface maximum, the bottom-right corner (Quad4) is determined to be sharp (step 1194). Otherwise, the bottom-right corner (Quad4) is determined to be a "tab" (step 1196).

After categorizing Quad4, the system 10 determines whether the number of points in the minimum X-Y list is equal to 4 (step 1198). If the number of points in the minimum X-Y list is equal to 4, the X negative end is determined to have a slot feature (step 1200), and the xNeg variable is set to "slot" (step 1202). Also, the width of the X negative slot is determined by the difference between the 2nd and 3rd Y values in the list (step 1204) and XNegSlotWidth is set to the slot size (step 1206). The system 10 then determines whether the number of points in the minimum X-Y list is more than 4 (step 1208, FIG. 16C). The system 10 also determines whether the number of points in the minimum X-Y list is more than 4 (step 1208) if at step 1198 (FIG. 16B) it determines that the number of points in the minimum X-Y list is not equal to 4. If the number of points in the minimum X-Y list is more than 4, the X negative end is determined to have a slot feature (step 1210), and the Xneg variable is set to "slot" (step 1212). The system 10 then determines whether the number of points in the minimum X-Y list is equal to 2 (step 1214). The system 10 also determines whether the number of points in the minimum X-Y list is equal to 2 (step 1214) if at step 1208 it determines that the number of points in the minimum X-Y list is not more than 4. If the number of points in the minimum X-Y list is equal to 2, the X negative end is defined as straight (i.e., it does not have a slot feature) (step 1216), and the Xneg variable is set to "straight" (step 1218). The system 10 then determines whether the number of points in the maximum X-Y list is equal to 4 (step 1220). The system 10 also determines whether the number of points in the maximum X-Y list is equal to 4 (step 1220) if at step 1214 it determines that the number of points in the minimum X-Y list is not equal to 2. If the number of points in the maximum X-Y list is equal to 4, the X positive end is determined to have a slot feature (step 1222) and the XPos variable is set to "slot" (step 1224). Also, the width of the X positive slot is determined by the difference between the 2nd and 3rd Y values in the list (step 1226), and xPosSlotWidth is set to the slot size (step 1228). The system 10 then determines whether the number of points in the maximum X-Y list is more than 4 (step 1230, FIG. 16D). The system 10 also determines whether the number of points in the maximum X-Y list is more than 4 (step 1230) if at step 1220 (FIG. 16C) it determines that that the number of points in the maximum X-Y list is not equal to 4. If the number of points in the maximum X-Y list is more than to 4, the X positive end is determined to have a slot feature (step 1232) and the XPos variable is set to "slot" (step 1234). The system 10 then determines whether the number of points in the maximum X-Y list is equal to 2 (step 1236). The system 10 also determines whether the number of points in the maximum X-Y list is equal to 2 (step 1236) if at step 1230 it determines that the number of points in the maximum X-Y list is not more than to 4. If the number of points in the maximum X-Y list is equal to 2, the X positive end is defined as straight (i.e., it does not have a slot feature) (step 1238) and the XPos variable is set to "straight" (step 1240). The system 10 then adds the XNeg and XPos shapes to a list (step 1242), determines the largest slot size between XNeg and XPos, and saves that value into a variable (step 1244) before the ending the ProcessPoints method (step 1246). If at step 1236, the system 10 determines that the number of points in the maximum X-Y list is not equal to 2, the slotWidth variable is set to 0 (step 1248) before ending the ProcessPoints method (step 1246).

FIG. 17 shows a flow chart illustrating the Process Ends method. At the start of the process (step 1250), the system 10 applies a 12 mm pocketing template using the PowerMill stock model to the left and right sides (step 1252). The system 10 creates a boundary and a PowerMill block from the toolpath created, and makes a minimum Z of block 3 mm below the surface to ensure all stock is removed (step 1254). The system 10 then determines whether slotWidth is greater than 13.5 mm and less than 40 mm (step 1256). If slotWidth is greater than 13.5 mm and less than 40 mm, for each of the variables Quad1 to Quad4, if the value is "Tab," the system 10 expands the PowerMill block in the X and Y to allow the toolpath to cut to the edge of the surface data and sets the lead-ins and lead-outs to "None" (step 1258). Otherwise, for each of the variables Quad1 to Quad4, if the value is set to "Sharp," the system 10 expands the PowerMill block in the relevant corners to X 40 mm and Y −1 mm and sets the lead-ins and lead-outs to "Straight" with a distance of 8 mm (step 1258). The system 10 then applies a 12 mmZlevel template (step 1260) before the process ends (step 1262).

If at step 1256 slotWidth is not greater than 13.5 mm and less than 40 mm, the system 10 determines whether slotWidth is greater than 9.5 mm and less than 13.5 mm (step 1264). If slotWidth is greater than 9.5 mm and less than 13.5 mm, for each of the variables Quad1 to Quad4, if the value is "Tab," the system 10 expands the PowerMill block in the X and Y to allow the toolpath to cut to the edge of the surface data and sets the lead-ins and lead-outs to "None" (step 1266). Otherwise, for each of the variables Quad1 to Quad4, if the value is set to "Sharp," the system 10 expands the PowerMill block in the relevant corners to X 40 mm and Y −1 mm and sets the lead-ins and lead-outs to "Straight" with a distance of 6 mm (step 1266). The system 10 then applies an 8 mmZlevel template (step 1268) before the process ends (step 1270).

If at step 1264 slotWidth is not greater than 9.5 mm and less than 13.5 mm, the system 10 determines whether slotWidth is greater than 6.5 mm and less than 9.5 mm (step 1272). If slotWidth is greater than 6.5 mm and less than 9.5 mm, for each of the variables Quad1 to Quad4, if the value is "Tab," the system 10 expands the PowerMill block in the X and Y to allow the toolpath to cut to the edge of the surface data and sets the lead-ins and lead-outs to "None" (step 1274). Otherwise, for each of the variables Quad1 to Quad4, if the value is set to "Sharp," the system 10 expands the PowerMill block in the relevant corners to X 40 mm and Y −1 mm and sets the lead-ins and lead-outs to "Straight" with a distance of 5 mm (step 1274). The system 10 then applies a 6 mmZlevel template (step 1276) before the process ends (step 1278).

FIG. 18 shows a flow chart illustrating the ReOrder2dToolpaths3Axis method. Initially the system 10 creates and activates a folder named "PreDrill" (step 1280) and moves all toolpaths that have a name that contains "PreDrill" into the "PreDrill" folder. (step 1282). The system 10 adds all toolpaths in the "PreDrill" folder to the end of the list of toolpaths in the folder that is named the same as the active workplane (step 1284), and deletes the "PreDrill" folder (step 1286).

The system 10 creates and activates a folder named "Champher (step 1288) and moves all toolpaths that have a name that contains "Champher" into the "Champher" folder (step 1290). The system 10 adds all toolpaths in the "Champher" folder to the end of the list of toolpaths in the folder that is named the same as the active workplane (step 1292) and deletes the "Champher" folder (step 1294).

The system 10 creates and activates a folder named "Tap" (step 1296) and moves all toolpaths that have a name that contains "Tap" into the "Tap" folder (step 1298). The system 10 adds all toolpaths in the "Tap" folder to the end of the list of toolpaths in the folder that is named the same as the active workplane (step 1300), and deletes the "Tap" folder (step 1302).

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

What is claimed is:

1. A method executed by a processor in a data processing system to program and control a computer numerical control machine to create a detail from a stock block based on design specifications for the detail, wherein the stock block includes a plurality of sides including a left side, a right side, a front, a back, a top and a bottom, the method comprising:
- retrieving the design specifications from memory;
- creating a stock model from the design specifications;
- setting leads and links to active datum on the stock model;
- determining from the design specifications what material will be used to create the detail;
- importing tool templates for the machine and the material that will be used to create the detail;
- activating a top workplane;
- activating a top toolpath folder;
- creating a PowerMill block with a Z minimum set to a maximum surface Z;
- determining whether stock needs to be removed from the top of the stock block;
  - if it is determined that stock needs to be removed from the top of the stock block, applying a 12 mm pocketing template;
- determining whether a raised boss is present;
  - if it is determined that a raised boss is present, creating the PowerMill block with a boss expansion;
  - if it is determined that a raised boss is not present, creating the PowerMill block without the boss expansion;
- applying a 12 mm pocketing template;
- generating numerical control programs corresponding to a generated tool path;
- processing the numerical control programs into G code executable by the computer numerical control machine;
- providing the G code to the computer numerical control machine;
- controlling operation of a cutting tool of the computer numerical control machine based on the G code to physically remove material from the stock block to produce the detail; and
- resetting the leads and links.

2. The method of claim 1, wherein the step of determining whether a raised boss is present comprises:
- activating the top workplane;
- creating the PowerMill block;
- creating a shallow-type PowerMill boundary on the surfaces;
- converting the boundary to PowerMill polylines; and
- for each polyline:
  - determining whether the polyline Y size is smaller than the surface Y size; and
  - if it is determined that the polyline Y size is smaller than the surface Y size, determining that a raised boss is present.

3. The method of claim 1, further comprising:
- creating cardinal workplanes;
- identifying planar surfaces on the detail;
- for each planar surface:
  - determining an IJK value;
  - determining whether the IJK value is a cardinal value; and
  - if it is determined that the IJK value is a cardinal value, creating a new angled workplane;
- determining a total number of workplanes;
- determining whether the total number of workplanes is greater than 6; and
- if it is determined that the total number of workplanes is greater than 6:
  - for each workplane:
    - extracting a Z vector from the workplane;
    - determining I, J and K values for the Z vector;
    - determining whether the K value is greater than 0; and
    - if it is determined that the K value is greater than 0:
      - activating the workplane;

creating the PowerMill block;

selecting all flat surfaces;

activating a PowerMill contact point boundary for each flat surface;

activating the top workplane;

creating a bounding box from a PowerMill block around the active boundary;

determining whether the J value is equal to 0;

if it is determined that the J value is equal to 0:

determining whether a bounding box X size is greater than 9;

if it is determined that the bounding box X size is greater than 9, applying a 12 mm Area Clearance and 12 mm Z level templates; and if it is determined that the bounding box X size is not greater than 9, applying a 12 mm Z level template; and if it is determined that the J value is not equal to 0:

determining whether the I value is equal to 0; and if it is determined that the I value is equal to 0:

determining whether a bounding box Y size is greater than 9;

if it is determined that the bounding box Y size is greater than 9, applying the 12 mm Area Clearance and 12 mm Z level templates; and if it is determined that the bounding box Y size is not greater than 9, applying the 12 mm Z level template.

4. The method of claim 3, further comprising for each side of the stock block:

activating a workplane for the side;

creating the PowerMill block to surfaces of the stock model;

creating the bounding box from surface data;

creating featuresets for holes on the side of the detail;

creating a list of hole diameters for the holes on the side of the detail;

activating a toolpath folder for the side;

activating a 2d toolpath folder;

creating the PowerMill block from the surfaces on the stock model;

for each diameter in the list of hole diameters, applying a 2d templates; and deleting all uncalculated toolpaths.

5. The method of claim 1, further comprising:

determining whether scribe lines are present in the design specifications; and if it is determined that scribe lines are present, creating scribing toolpaths.

6. The method of claim 5, further comprising organizing the scribe toolpaths based on workplanes.

7. The method of claim 1, further comprising creating countersinks required from the bottom of the stock.

8. The method of claim 1, further comprising:

determining whether stock needs to be removed from the left and right sides of the stock block; and if it is determined that stock needs to be removed from the left and right sides of the stock block:

creating the PowerMill block around the stock model, wherein the PowerMill block has an X negative and an X positive expanded;

applying the 12 mmZLevel template; and resetting the leads and links to the active datum.

9. The method of claim 8, wherein if it is determined that stock does not need to be removed from the left and right sides of the stock block:

determining whether stock needs to be removed from the left side of the stock block; and if it is determined that stock needs to be removed from the left side of the stock block:

creating the PowerMill block around the stock model, wherein the PowerMill block has the X negative expanded;

applying the 12 mmZLevel template; and resetting the leads and links to the active datum.

10. The method of claim 8, wherein if it is determined that stock does not need to be removed from the left and right sides of the stock block:

determining whether stock needs to be removed from the right side of the stock block; and if it is determined that stock needs to be removed from the right side of the stock block:

creating the PowerMill block around the stock model, wherein the PowerMill block has the X positive expanded;

applying the 12 mmZLevel template; and resetting the leads and links to the active datum.

11. The method of claim 1, further comprising:

determining whether stock needs to be removed from one side of the stock block, wherein the one side comprises the bottom, the front or the back of the stock block; and if it is determined that stock needs to be removed from the one side of the stock block:

activating the workplane for the one side;

activating the toolpath folder for the one side;

creating the PowerMill block around the stock model;

applying the 12 mm pocketing template; and resetting the leads and links to the active datum.

12. The method of claim 1, further comprising:

determining whether a mirror image of the detail is required; and if it is determined that a mirror image of the detail is required:

creating a mirror toolpath folder;

activating the mirror toolpath folder; and for each toolpath folder:

mirroring all toolpaths in the toolpath folder about the Y axis; and storing the mirrored toolpaths into the mirror toolpath folder.

13. The method of claim 1, further comprising:

for each toolpath folder:

determining whether the toolpath folder is empty; and if it is determined that the toolpath folder is empty, deleting the toolpath folder;

creating numeric control programs from the toolpath folders;

writing tool information to a text file;

compiling the numeric control programs into G code; and saving the PowerMill project.

14. A data processing system for programming and control of a computer numerical control machine to create a detail from a stock block based on design specifications for the detail, wherein the stock block includes a plurality of sides including a left side, a right side, a front, a back, a top and a bottom, the system comprising:

a memory configured to store the design specifications for the detail; and a processor configured to:

retrieve the design specifications from the memory;

create a stock model from the design specifications;
set leads and links to active datum on the stock model;
determine from the design specifications what machine will be used to create the detail;
determine from the design specifications what material will be used to create the detail;
import tool templates for the machine and the material that will be used to create the detail;
activate a top workplane;
activate a top toolpath folder;
create a PowerMill block with a Z minimum set to a maximum surface Z;
determine whether stock needs to be removed from the top of the stock block;
if the processor determines that stock needs to be removed from the top of the stock block, the processor is configured to apply a 12 mm pocketing template;
the processor is further configured to determine whether a raised boss is present;
if the processor determines that a raised boss is present, the processor is configured to create the PowerMill block with a boss expansion;
if the processor determines that a raised boss is not present, the processor is configured to create the PowerMill block without the boss expansion;
the processor is further configured to apply a 12 mm pocketing template;
generating numerical control programs corresponding to a generated tool path;
processing the numerical control programs into G code executable by the computer numerical control machine;
providing the G code to the computer numerical control machine;
controlling operation of a cutting tool of the computer numerical control machine based on the G code to physically remove material from the stock block to produce the detail; and
reset the leads and links.

15. The data processing system of claim 14 wherein the processor is further configured to:
activate the top workplane;
create the PowerMill block;
create a shallow-type PowerMill boundary on the surfaces;
convert the boundary to PowerMill polylines; and
for each polyline, the processor is further configured to:
determine whether the polyline Y size is smaller than the surface Y size; and
if the processor determines that the polyline Y size is smaller than the surface Y size, the processor is configured to determine that a raised boss is present.

16. The data processing system of claim 14 wherein the processor is further configured to:
create cardinal workplanes;
identify planar surfaces on the detail;
for each planar surface, the processor is configured to:
determine an IJK value;
determine whether the IJK value is a cardinal value; and
if the processor determines that the IJK value is a cardinal value, the processor is configured to create a new angled workplane;
the processor is further configured to determine a total number of workplanes;
determine whether the total number of workplanes is greater than 6; and
if the processor determines that the total number of workplanes is greater than 6, the processor is configured to, for each workplane:
extract a Z vector from the workplane;
determine I, J and K values for the Z vector;
determine whether the K value is greater than 0; and
if the processor determines that the K value is greater than 0, the processor is configured to:
activate the workplane;
create the PowerMill block;
select all flat surfaces;
activate a PowerMill contact point boundary for each flat surface;
activate the top workplane;
create a bounding box from a PowerMill block around the active boundary;
determine whether the J value is equal to 0;
if the processor determines that the J value is equal to 0, the processor is configured to:
determine whether a bounding box X size is greater than 9;
if the processor determines that the bounding box X size is greater than 9, the processor is configured to apply a 12 mm Area Clearance and 12 Z level templates; and
if the processor determines that the bounding box X size is not greater than 9, the processor is configured to apply a 12 mm Z level template; and
if the processor determines that the J value is not equal to 0, the processor is configured to:
determine whether the I value is equal to 0; and
if the processor determines that the I value is equal to 0, the processor is configured to:
determine whether a bounding box Y size is greater than 9;
if the processor determines that the bounding box Y size is greater than 9, the processor is configured to apply the 12 mm Area Clearance and 12 Z level templates; and
if the processor determines that the bounding box Y size is not greater than 9, the processor is configured to apply the 12 mm Z level template.

17. The data processing system of claim 16 wherein the processor is further configured to:
activate a workplane for the side;
create the PowerMill block to surfaces of the stock model;
create the bounding box from surface data;
create featuresets for holes on the side of the detail;
create a list of hole diameters for the holes on the side of the detail;
activate a toolpath folder for the side;
activate a 2d toolpath folder;
create the PowerMill block from the surfaces on the stock model;
for each diameter in the list of hole diameters, the processor is configured to apply a 2d templates; and
the processor is further configured to delete all uncalculated toolpaths.

18. The data processing system of claim 14 wherein the processor is further configured to:
determine whether scribe lines are present in the design specifications; and
if the processor determines that scribe lines are present, the processor is configured to create scribing toolpaths.

19. The data processing system of claim 18 wherein the processor is further configured to organize the scribe toolpaths based on workplanes.

20. The data processing system of claim 14 wherein the processor is further configured to create countersinks required from the bottom of the stock.

21. The data processing system of claim 14 wherein the processor is further configured to:
determine whether stock needs to be removed from the left and right sides of the stock block; and
if the processor determines that stock needs to be removed from the left and right sides of the stock block, the processor is further configured to:
create the PowerMill block around the stock model, wherein the PowerMill block has an X negative and an X positive expanded;
apply the 12 mmZLevel template; and
reset the leads and links to the active datum.

22. The data processing system of claim 21 wherein if the processor determines that stock does not need to be removed from the left and right sides of the stock block, the processor is further configured to:
determine whether stock needs to be removed from the left side of the stock block; and
if the processor determines that stock needs to be removed from the left side of the stock block, the processor is further configured to:
create the PowerMill block around the stock model, wherein the PowerMill block has the X negative expanded;
apply the 12 mmZLevel template; and
reset the leads and links to the active datum.

23. The data processing system of claim 21 wherein if the processor determines that stock does not need to be removed from the left and right sides of the stock block, the processor is further configured to:
determine whether stock needs to be removed from the right side of the stock block; and
if the processor determines that stock needs to be removed from the right side of the stock block, the processor is further configured to:
create the PowerMill block around the stock model, wherein the PowerMill block has the X positive expanded;
apply the 12 mmZLevel template; and
reset the leads and links to the active datum.

24. The data processing system of claim 14 wherein the processor is further configured to:
determine whether stock needs to be removed from one side of the stock block, wherein the one side comprises the bottom, the front or the back of the stock block; and
if the processor determines that stock needs to be removed from the one side of the stock block, the processor is further configured to:
activate the workplane for the one side;
activate the toolpath folder for the one side;
create the PowerMill block around the stock model;
apply the 12 mm pocketing template; and
reset the leads and links to the active datum.

25. The data processing system of claim 14 wherein the processor is further configured to:
determine whether a mirror image of the detail is required; and
if the processor determines that a mirror image of the detail is required, the processor is further configured to:
create a mirror toolpath folder;
activate the mirror toolpath folder; and
for each toolpath folder, the processor is further configured to:
mirror all toolpaths in the toolpath folder about the Y axis; and
store the mirrored toolpaths into the mirror toolpath folder.

26. The data processing system of claim 14 wherein the processor is further configured to:
for each toolpath folder:
determine whether the toolpath folder is empty; and
if the processor determines that the toolpath folder is empty, the processor is configured to delete the toolpath folder;
the processor is further configured to create numeric control programs from the toolpath folders;
write tool information to a text file;
compile the numeric control programs into G code; and
save the PowerMill project.

* * * * *